United States Patent
Yamakawa et al.

[11] Patent Number: 5,844,741
[45] Date of Patent: Dec. 1, 1998

[54] SYSTEM FOR REPRODUCING HIGH-DENSITY MAGNETIC RECORD DATA WITH VITERBI DETECTOR FOR GENERATING QUADRIPARTITE REPRODUCTION DATA

[75] Inventors: Hideyuki Yamakawa, Fujisawa; Takushi Nishiya, Tokyo; Takashi Nara, Takasaki; Terumi Takashi, Chigasaki, all of Japan

[73] Assignee: Hitachi, Ltd., Tokyo, Japan

[21] Appl. No.: 548,956

[22] Filed: Oct. 27, 1995

[30] Foreign Application Priority Data

| | | | |
|---|---|---|---|
| Oct. 27, 1994 | [JP] | Japan | 6-263435 |
| Mar. 30, 1995 | [JP] | Japan | 7-074063 |
| Aug. 8, 1995 | [JP] | Japan | 7-202377 |

[51] Int. Cl.$^6$ ............................. G11B 5/035; G11B 5/09
[52] U.S. Cl. ................................. 360/65; 360/40; 360/46; 360/53; 375/262; 375/263; 375/290; 375/264
[58] Field of Search ................................. 360/40, 46, 65, 360/53; 375/262–264, 290, 341

[56] References Cited

U.S. PATENT DOCUMENTS

| | | | |
|---|---|---|---|
| 5,113,400 | 5/1992 | Gould et al. | 371/43 |
| 5,142,551 | 8/1992 | Borth et al. | 375/219 |
| 5,144,644 | 9/1992 | Borth | 375/341 |
| 5,255,128 | 10/1993 | Inoue et al. | 360/46 |
| 5,260,876 | 11/1993 | Inoue et al. | 360/65 |
| 5,263,052 | 11/1993 | Borth et al. | 375/262 |
| 5,270,876 | 12/1993 | Inoue et al. | 360/65 |
| 5,271,042 | 12/1993 | Borth et al. | 375/348 |
| 5,331,645 | 7/1994 | Miller et al. | 371/37.1 |
| 5,576,904 | 11/1996 | Behrens | 360/51 |

FOREIGN PATENT DOCUMENTS 5-325433  12/1993  Japan.
6-68614   3/1994   Japan.

OTHER PUBLICATIONS

US application #08/524,040, filed Sep. 6, 1995.
"Vitebri Detection of Class IV Partial Response on a Magnetic Recording Channel", R. Wood et al, IEEE Transactions on Communications, vol. COM–34, No. 5, May 1986.
"Viterbi Detector Including PRML and EPRML", T. Sugawara, et al, IEEE Transactions on Magnetics, vol. 29, No. 6, Nov. 1993.
"Turbo–PRML: A Compromise PRML Detector", IEEE Transactions on Magnetics, vol. 29, No. 6, May 1993.

*Primary Examiner*—Aristotelis M. Psitos
*Assistant Examiner*—Regina Y. Neal
*Attorney, Agent, or Firm*—Antonelli, Terry, Stout & Kraus, LLP

[57] ABSTRACT

A system for reproducing data recorded on a magnetic recording medium at high density is provided as a simple configuration. Quadripartite reproduction data is output from a Viterbi detection circuit to an adder, which then subtracts the quadripartite reproduction data from a signal before PR4-ML method data determination. An adder is used to perform a (1+D) process for the result. An error signal pattern detection circuit performs maximum likelihood estimation for an PR4-ML method detection error. Further, when a detected determination error matches an actual reproduction data string, a data correction circuit corrects the reproduction data string.

18 Claims, 37 Drawing Sheets

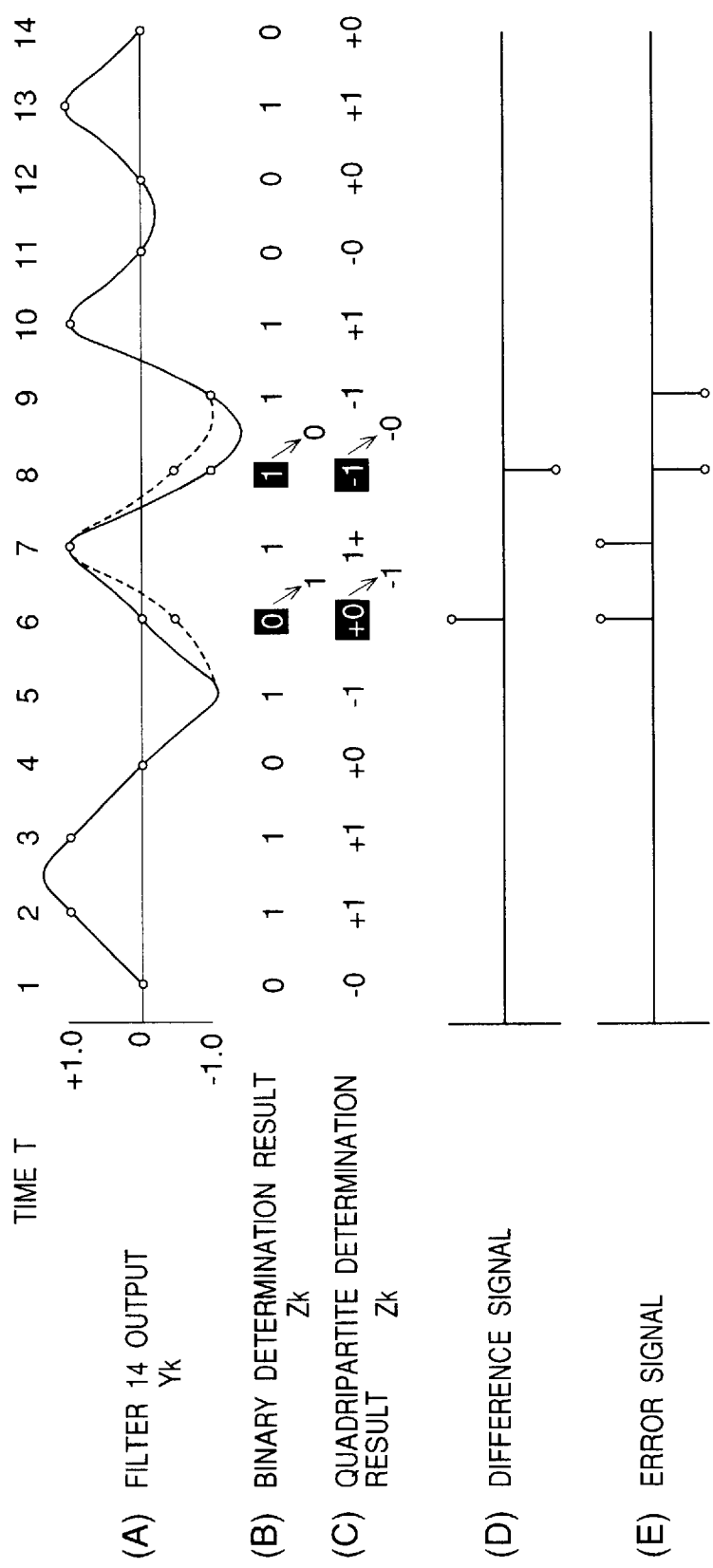

FIG.8A error2P

| CORRECT DATA | ERRONEOUS DETERMINATION DATA |
|---|---|
| +0 x +0 x | −1 x +1 x |
| +0 x −1 x | −1 x −0 x |
| +1 x +0 x | −0 x +1 x |
| +1 x −1 x | −0 x −0 x |

ERROR SIGNAL PATTERN a₁ a₂ y(1) y(2) y(3) y(4)

FIG.8B error2N

| CORRECT DATA | ERRONEOUS DETERMINATION DATA |
|---|---|
| −0 x −0 x | +1 x −1 x |
| −0 x +1 x | +1 x +0 x |
| −1 x −0 x | +0 x −1 x |
| −1 x +1 x | +0 x +0 x |

ERROR SIGNAL PATTERN y(1) y(2) y(3) y(4)

FIG.8C error4P

| CORRECT DATA | ERRONEOUS DETERMINATION DATA |
|---|---|
| +0x +0x +0x | −1x −0x +1x |
| +0x +0x −1x | −1x −0x −0x |
| +1x +0x +0x | −0x −0x +1x |
| +1x +0x −1x | −0x −0x −0x |

ERROR SIGNAL PATTERN y(0) y(1) y(2) y(3) y(4) y(5)

FIG.8D error4N

| CORRECT DATA | ERRONEOUS DETERMINATION DATA |
|---|---|
| −0x −0x −0x | +1x +0x −1x |
| −0x −0x +1x | +1x +0x +0x |
| −1x −0x −0x | +0x +0x −1x |
| −1x −0x +1x | +0x +0x +0x |

ERROR SIGNAL PATTERN y(0) y(1) y(2) y(3) y(4) y(5)

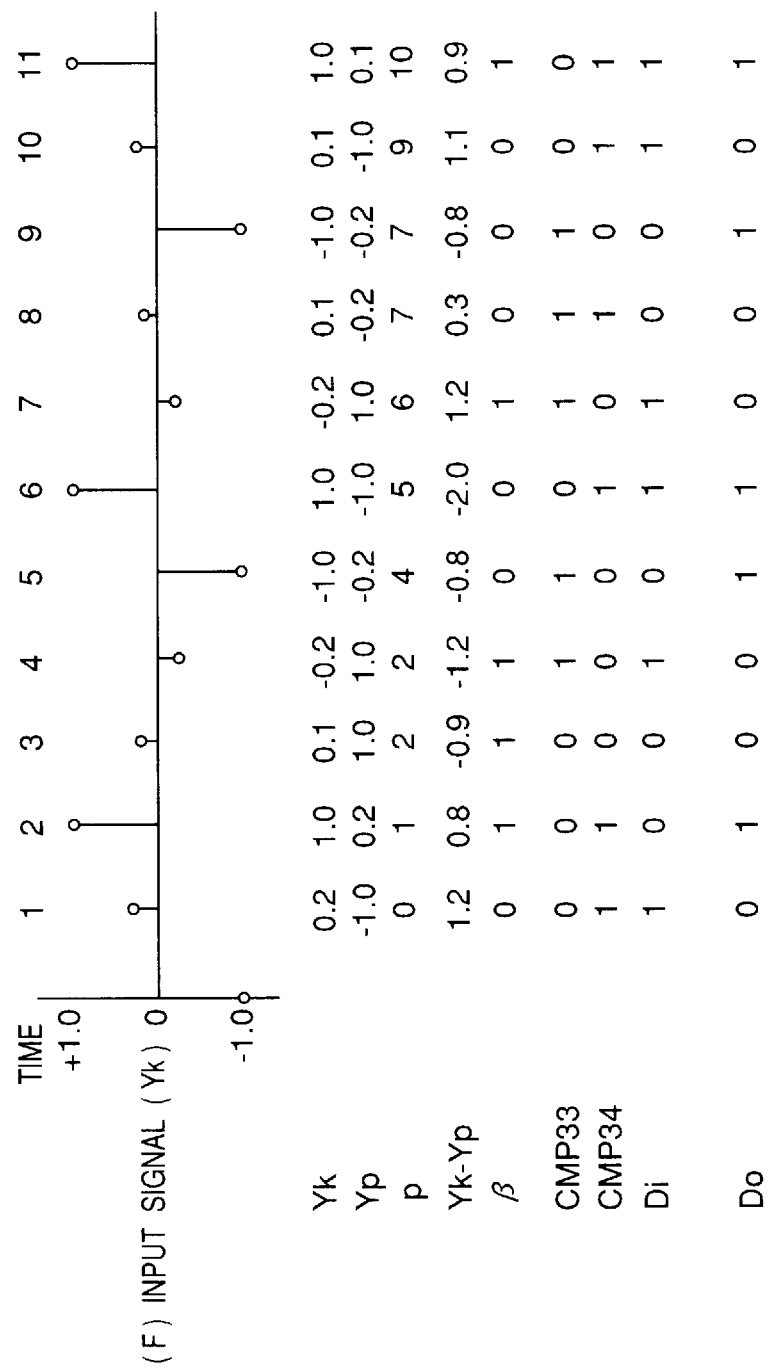

FIG.21A error2P

| CORRECT DATA | ERRONEOUS DETERMINATION DATA |
|---|---|
| +0 x +0 x | -1 x +1 x |
| +0 x -1 x | -1 x -0 x |
| +1 x +0 x | -0 x +1 x |
| +1 x -1 x | -0 x -0 x |

ERROR SIGNAL PATTERN y(1) y(2) y(3) y(4) y(5)

FIG.21B error2N

| CORRECT DATA | ERRONEOUS DETERMINATION DATA |
|---|---|
| -0 x -0 x | +1 x -1 x |
| -0 x +1 x | +1 x +0 x |
| -1 x -0 x | +0 x -1 x |
| -1 x +1 x | +0 x +0 x |

ERROR SIGNAL PATTERN y(1) y(2) y(3) y(4) y(5)

FIG.21C error4P

| CORRECT DATA | ERRONEOUS DETERMINATION DATA |
|---|---|
| +0x +0x +0x | -1x -0x +1x |
| +0x +0x -1x | -1x -0x -0x |
| +1x +0x +0x | -0x -0x +1x |
| +1x +0x -1x | -0x -0x -0x |

ERROR SIGNAL PATTERN y(0) y(1) y(2) y(3) y(4) y(5) y(6)

FIG.21D error4N

| CORRECT DATA | ERRONEOUS DETERMINATION DATA |
|---|---|
| -0x -0x -0x | +1x +0x -1x |
| -0x -0x +1x | +1x +0x +0x |
| -1x -0x -0x | +0x +0x -1x |
| -1x -0x +1x | +0x +0x +0x |

ERROR SIGNAL PATTERN y(0) y(1) y(2) y(3) y(4) y(5) y(6)

error6P

| CORRECT DATA | ERRONEOUS DETERMINATION DATA |
|---|---|
| +0x +0x +0x +0x | −1x −0x −0x +1x |
| +0x +0x +0x −1x | −1x −0x −0x −0x |
| +1x +0x +0x +0x | −0x −0x −0x +1x |
| +1x +0x +0x −1x | −0x −0x −0x −0x |

ERROR SIGNAL PATTERN y(−1) y(0) y(1) y(2) y(3) y(4) y(5) y(6)

error6N

| CORRECT DATA | ERRONEOUS DETERMINATION DATA |
|---|---|
| −0x −0x −0x −0x | +1x +0x +0x −1x |
| −0x −0x −0x +1x | +1x +0x +0x +0x |
| −1x −0x −0x −0x | +0x +0x +0x −1x |
| −1x −0x −0x +1x | +0x +0x +0x +0x |

ERROR SIGNAL PATTERN y(−1) y(0) y(1) y(2) y(3) y(4) y(5) y(6)

DETECTOR 265

DETECTOR 265

FIG.36

| TIME | Zk (ODD) | Zk (EVEN) | MAXIMUM VALUE IN EVEN SEQUENCE | MINIMUM VALUE IN EVEN SEQUENCE | EVEN (MAXIMUM - MINIMUM) | ODD (MAXIMUM - MINIMUM) | Mg(k) | Mh(k) |
|---|---|---|---|---|---|---|---|---|
| 1 | -0.5136 | | | | | 0.6285 | 0.4086 | 0.4633 |
| 2 | | -0.6295 | 0.2825 | -0.6295 | 0.9120 | | 0.7333 | 0.3520 |
| 3 | -0.0245 | | | | | 0.6285 | 0.4891 | 0.0805 |
| 4 | | 0.0943 | 0.2825 | -0.6295 | 0.9120 | | 0.7238 | 0.0095 |
| 5 | 0.0193 | | | | | 0.6285 | 0.0437 | 0.5328 |
| 6 | | 0.1001 | 0.2825 | -0.6295 | 0.9120 | | 0.0058 | 0.7296 |
| 7 | -0.2804 | | | | | 0.6285 | 0.2997 | 0.2559 |
| 8 | | -0.0269 | 0.2825 | -0.6295 | 0.9120 | | 0.1270 | 0.1212 |
| 9 | 0.9688 | | | | | 1.4824 | 1.2492 | 0.9495 |
| 10 | | 1.1186 | 1.1186 | -0.6295 | 1.7481 | | 1.1455 | 1.0185 |
| 11 | -0.0505 | | | | | 1.4824 | 1.0193 | 0.2299 |
| 12 | | -1.6120 | 1.1186 | -1.6120 | 2.7306 | | 2.7306 | 1.5851 |
| 13 | -1.4196 | | | | | 2.3884 | 1.3691 | 2.3884 |
| 14 | | 0.0396 | 1.1186 | -1.6120 | 2.7306 | | 1.6517 | 1.0789 |
| 15 | 0.2990 | | | | | 2.3884 | 1.7186 | 0.3495 |
| 16 | | -0.1840 | 1.1186 | -1.6120 | 2.7306 | | 0.2237 | 1.4280 |
| 17 | -0.0002 | | | | | 2.3884 | 0.2992 | 1.4194 |
| 18 | | 0.1317 | 1.1186 | -1.6120 | 2.7306 | | 0.3158 | 0.0921 |
| 19 | -0.4174 | | | | | 2.3884 | 0.4172 | 0.7164 |
| 20 | | -0.4262 | 1.1186 | -1.6120 | 2.7306 | | 0.5579 | 0.2422 |
| 21 | 0.1811 | | | | | 2.3884 | 0.5986 | 0.1814 |

( $Z_k = Y_k + Y_{k-1}$, $M_g(k) = Z_{k-2} \cdot Z_k$, $M_h(k) = Z_{k-4} \cdot Z_k$ )

FIG.37

| MAXIMUM COUNT VALUE | MAXIMUM COUNT VALUE | ERROR PATTERN |
|---|---|---|
| 4 | 3 | error2P |
| 3 | 4 | error2N |
| 5 | 3 | error4P |
| 3 | 5 | error4N |

SYSTEM FOR REPRODUCING HIGH-DENSITY MAGNETIC RECORD DATA WITH VITERBI DETECTOR FOR GENERATING QUADRIPARTITE REPRODUCTION DATA

BACKGROUND OF THE INVENTION

1. Field of the Invention

This invention relates to a data reproducing system for providing digital signals by reproducing record signals recorded on recording media and in particular to a system using a partial response class 4 and Viterbi detection method (Partial Response class IV—Maximum Likelihood detection: PR4-ML) to reproduce record signals recorded on recording media at high density for providing digital signals.

2. Description of Related Art

Hitherto, the partial response class IV and Viterbi detection method, which will be hereinafter referred to as PR4-ML, has often been used as a data reproducing method for reproducing record signals recorded on recording media at high density in magnetic recording/reproducing systems such as magnetic disk drives. The art contents of PR4-ML are described in detail in Roger W. Wood et al. "Viterbi Detection of class IV Partial Response on a Magnetic Recording Channel," IEEE Transactions on communications, Vol.COM-34, No.5 May 1986. The PR4-ML is a known, public art concerning data reproducing methods, and therefore it will not be discussed in detail here, but briefly described for better understanding of the later part of the present specification.

The partial response (PR) is a method for reproducing data by constructively using intersymbol interference (interference of corresponding reproduction signals between adjacent bits stored). In this method, first the data subjected to processing containing a precoding process is recorded on a recording medium. Then, the data is reproduced by a reproducing system having a transfer characteristic reverse to the processing containing the preceding process. The method is a known art and therefore will not be discussed in detail. It can provide a system in which data reproduction errors are unlikely to occur even if intersymbol interference occurs owing to the processing as described above. Thus, it can also handle reproduction of record signals recorded at high density. The partial response can be classified into several types depending on the type of processing performed, etc.,; the mainstream is "PR4" which is class IV partial response.

The Viterbi detection method is one type of so-called maximum likelihood detection (ML) method; it uses past sample data for adopting the most probable data sequence as reproduction data.

The partial response class IV (PR4) and the Viterbi detection method (ML) are combined into the PR4-ML method for recording/reproducing data.

A method called "extended partial response class IV and Viterbi detection method" (Extended PR4-ML (EPR4-ML)) is also often used as a data reproducing method used when the recording density of record signals on recording media is improved. The art contents of the method are described in detail T. Sugawara et al. "Viterbi Detector Including PRML and EPRML," IEEE Transactions on Magnetics, Vol.29, No.6, Nov. 1993. The EPR4-ML is also a known, public art concerning data reproducing methods and will not be discussed here.

Further, a data reproducing method called "Turbo-PRML method" is also proposed by Roger W. Wood as a method more compatible with record signals recorded at high recording density than the PR4-ML method using a data reproducer having a comparatively simple hardware configuration. The art contents of the Turbo-PRML method are disclosed, for example, in Roger W. Wood "Turbo-PRML: A Compromise PRML Detector," IEEE Transactions on Magnetics, Vol.29, No.6, Nov. 1993. In the Turbo-PRML method, first the PR4-ML method is used to reproduce data and whether or not the reproduction data is erroneous is determined for detection data having a high probability of being erroneously reproduced by the PR4-ML method, and the detected data is then corrected with a predetermined correction data pattern.

By the way, the current market demands for storage systems such as magnetic disk drives include small size and large recording capacity (high recording density), high-speed data write/read into/from storages, low product prices, etc. The form of improving the data discrimination performance of a data reproducer like the PR4-ML method is mentioned as one method for raising the recording density. Data reproducing methods compatible with data recorded at higher recording density are developed and studied, one of which is the EPR4-ML method.

On the other hand, it is also important to enable high-speed data write/read into/from storages as the market demand increases for storage systems, as described above, for processing moving picture data being large-capacity data using computers with the widespread use of multimedia. It is becoming necessary to record and reproduce large-capacity data at a rate exceeding several tens of megabytes (M bytes) per second in a storage system.

Although a data transfer speed of 100 M bytes or more per second is provided in computers such as workstations and personal computers, even a magnetic disk drive having comparatively fast reproducing speed among storage systems has a reproducing speed of about 10 Mbytes per second at most. Thus, the recording/reproducing speed for magnetic disk drives poses a barrier to the overall computer processing speed, hindering high-definition image processing, etc.

The program size has tended to become enormous in recent operating systems (OS) and application programs (AP). Therefore, the time required from reproducing the programs from a storage till their actual execution is increasing. Thus, it often takes several minutes from providing a program with a start instruction to starting its actual program execution. To shorten this time, it is desired to provide faster data reproducing speed of storages such as magnetic disks.

However, since very complicated processing is required to use data reproducing methods compatible with high-density recording like the EPR4-ML method, a data reproducing speed is limited to about half of the conventional PR4-ML method even in the state of the art.

Therefore, to meet the market demands, it is necessary to develop a data reproducing method compatible with high-density recording and further capable of speeding up the reproducing speed comparatively easily.

The Turbo-PRML method is compatible with high-density recording, but takes a long time in detecting data having a high probability of being erroneously reproduced by the PR4-ML method and correcting the detected data with a correction data pattern; it cannot be said that the Turbo-PRML is a satisfactory data reproducing method from the viewpoint of improving the data reproducing speed.

Thus, if data is reproduced using any of the data reproducing methods formerly proposed, it is extremely difficult to accurately and quickly reproduce signals recorded on recording media at high density from points of complicated processing, etc.

SUMMARY OF THE INVENTION

It is therefore an object of the invention to provide a data reproducing method more compatible with high-density recording than the conventional PR4-ML method by hardware having a simpler configuration than hardware providing the EPR4-ML method, and also provide data reproduction system capable of reproducing record data at high speed.

To the end, according to one aspect of the invention, there is provided a data reproducing method using a partial response method for reproducing data recorded on a recording medium, the method comprising the steps of reading data recorded on the recording medium through a head, converting the read analog signal into a corresponding digital signal, filtering the digital signal according to an equalization characteristic corresponding to the partial response method, performing Viterbi detection of the filtered signal for generating quadripartite reproduction data, detecting one of a limited number of predetermined reproduction data patterns having a high probability of being erroneously reproduced from among data patterns contained in the quadripartite reproduction data, correcting the detected reproduction data pattern to a correct reproduction data pattern predetermined corresponding to the reproduction data pattern, and providing final binary reproduction data from the reproduction data containing the corrected reproduction data pattern.

According to another aspect of the invention, there is provided a data reproducing system using a partial response method for reproducing data recorded on a recording medium, the system comprising a head for reading data recorded on the recording medium and outputting an analog signal, analog-to-digital conversion means for converting the analog signal into a corresponding digital signal at given time intervals, means for equalizing the digital signal provided by the analog-to-digital conversion means according to an equalization characteristic corresponding to the partial response method. Viterbi detection means for performing Viterbi detection of an output signal received from the equalization means for generating quadripartite reproduction data, and data conversion means for converting the quadripartite reproduction data output from the Viterbi detection means into binary reproduction data according to a predetermined rule.

The data conversion means may comprise means for assuming both "+0" and "−0" of the quadripartite reproduction data output from the Viterbi detection means to be "0" to regard the quadripartite data as ternary data of "1," "0," and "−1" and generating a difference signal between the ternary data and output of the equalization means, means for performing a (1+D) process of adding a delayed signal resulting from delaying the difference signal and the difference signal, thereby generating an error signal, error signal pattern detection means for determining whether or not a pattern of the error signals matches any of a limited number of predetermined error signal patterns, and data correction means, when a match is found by the error signal pattern detection means, for correcting an erroneous bit pattern of the quadripartite reproduction data output from the Viterbi detection means, corresponding to the error signal pattern, to a predetermined correct bit pattern in response to the error signal pattern, and converting the corrected reproduction data into binary reproduction data for output.

The data conversion means may further include bit pattern detection means for determining whether or not the quadripartite reproduction data output from the Viterbi detection means matches any of bit patterns of the quadripartite reproduction data predetermined in response to the error signal patterns detected by the error signal pattern detection means, and the data correction means may perform the reproduction data correction under a condition of detection of a match by the bit pattern detection means in addition to a match detection by the error signal pattern detection means.

In the data reproducing system using the partial response method for reproducing data recorded on a recording medium, first the recorded data is read through the head, next the read analog data is converted into a corresponding digital signal by the analog-to-digital conversion means. The equalization means equalizes the digital signal according to a predetermined equalization characteristic. The Viterbi detection means performs Viterbi detection of the output signal received from the equalization means. Further, the data conversion means converts the quadripartite reproduction data output from the Viterbi detection means into binary reproduction data according to a predetermined rule.

According to the invention, since the number of fallible data patterns to be evaluated is reduced, the finally correct data reproducing performance is slightly lower than the Turbo-PRML performance, but most of PR4-ML detection errors are based on erroneously detected patterns evaluated in the invention, and the substantial performance (recording density) little lowers.

BRIEF DESCRIPTION OF THE DRAWINGS

In the accompanying drawings:

FIG. 7 is an illustration showing signal waveforms of parts according to the first embodiment of the invention;

FIGS. 8A–8D are illustrations showing the relationship between determination errors and error signals according to the first embodiment of the invention;

FIG. 9 is an illustration showing the operation of the Viterbi detection circuit shown in FIG. 2;

FIGS. 21A–21D are illustrations showing the relationship between determination errors and error signals according to a sixth embodiment of the invention;

FIG. 36 is an illustration of the operation of the error signal pattern detection circuit according to the eighth embodiment of the invention; and FIG. 37 is a table to explain the operation of an error pattern determination circuit according to the eighth embodiment of the invention.

DESCRIPTION OF THE PREFERRED EMBODIMENTS

Referring now to the accompanying drawings, there are shown preferred embodiments of the invention. For easy understanding, first the PR4-ML method, a reproducing method on which the invention is based will be discussed, followed by embodiments representing the features of the invention. The PR4-ML method is described as prior art in documents such as Japanese Patent Laid-Open (KOKAI) Nos. Hei 5-325433 and 6-68614.

Figure 28:
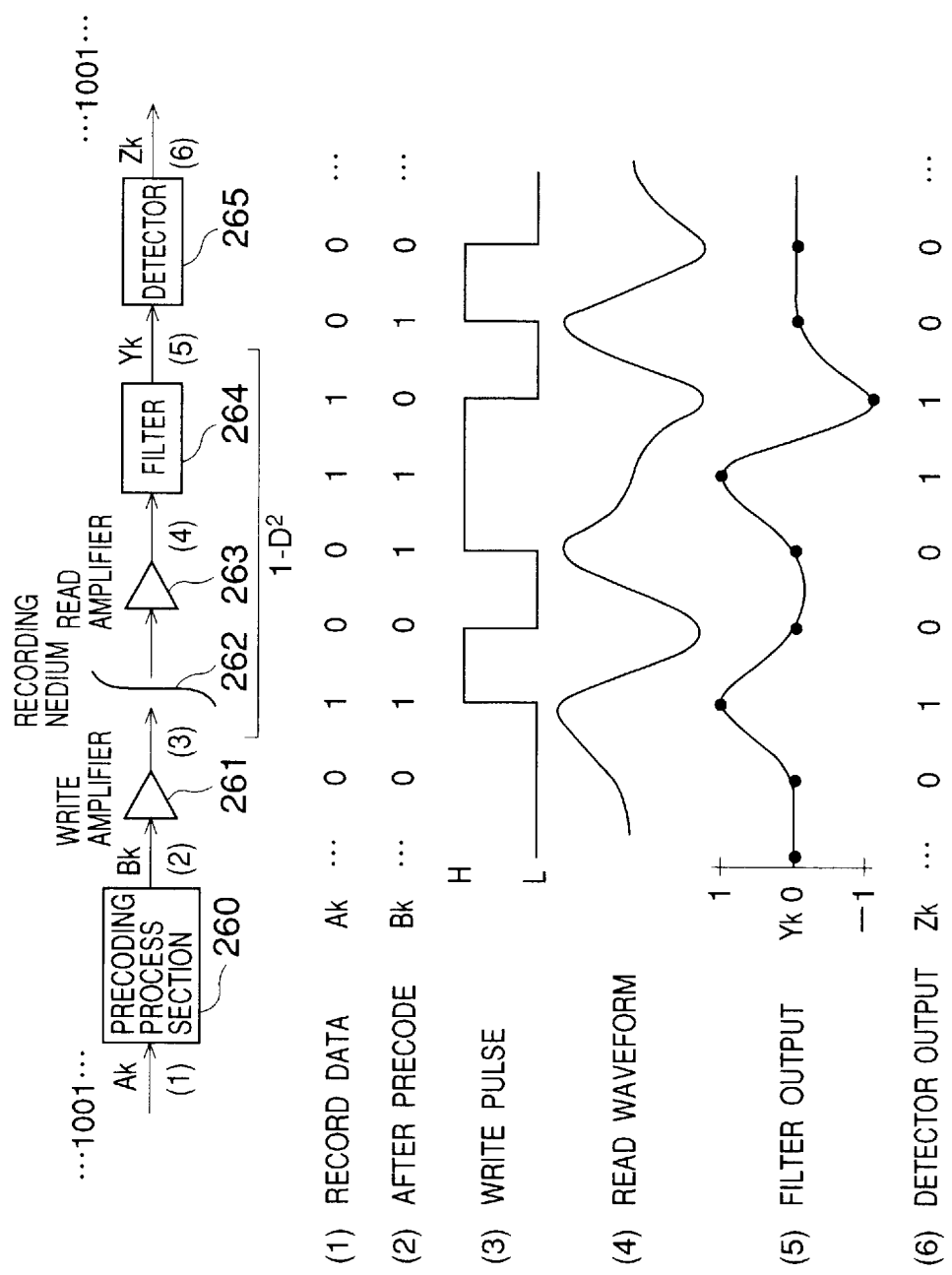
FIG. 28 is an illustration of a PR4-ML recording/reproducing system.

FIG. 28 is a block diagram showing one configuration example of a recording/reproducing system using the PR4-ML method and shows data and waveform examples of signals in the system, wherein record data is represented as "Ak", which is binary data (namely, corresponding to a digital signal) and specifically is serial data of "0" or "1." The suffix "k" denotes the record data order corresponding to the time sequence; record data Ak will be recorded on a recording medium in the order of k=0, 1, 2, 3, . . . A precoding process section 260 modulates data for recording it. Letting its output be "Bk", the Bk is calculated by:

$$Bk=(Ak+Bk-2)MOD2 \qquad (1)$$

The "MOD 2" means an operation of finding a remainder when one number is divided by 2.

A write amplifier 261 generates a write pulse which goes high when the preceding process section 260 outputs "1" and goes low when "0", for recording data on a recording medium 262.

When data is reproduced, a read waveform from the recording medium 262 is amplified by a read amplifier 263 and is equalized through a filter 264 so as to provide a PR4 response waveform (namely, the input signal is equalized according to an equalization characteristic predetermined for the filter 264). When the amplitude of an output signal of the filter 264 is assumed to be Yk, the PR4 response waveform refers to a waveform Yk given by the following relationship:

$$Yk=(Bk-Bk-2) \qquad (2)$$

The process from Bk to Yk described above is generally referred to as a "channel."

Here, consider an input signal (impulse input) with B0=1, Bk =0 (k=1, 2, 3, . . . ). Referring to expression (2), an impulse response waveform with Y0=1, Y1=0, Y2=−1, Yk=0 (k=3, 4, 5, . . . ) is provided. From the nature of this impulse response, PR4 is also called a PR (1, 0, −1) method or PR (1, 0, −1) channel. That is, the output waveform of the filter 264 (PR4 response waveform) can be represented by the convolution operation of the impulse response (1, 0, −1) and Bk.

Since the value of Bk determined by expression (1) is "0" or "1," Yk takes any one of three values "1," "0," or "−1" from expression (2). In fact, however, noise in the system is superposed on Yk and, hence, Yk can also become any value other than the three values.

Since the relation, in which Zk ="1" when PR4 output is "1" or "−1" and Zk ="0" when PR4 output is "0," holds from the nature of PR4 , detected data (detected result) Zk can be found by the following expression (3):

$$Zk= \text{"1" when } abs(Yk) \geq 0.5$$

$$Zk= \text{"0" when } abs(Yk) < 0.5 \qquad (3)$$

where "abs (Yk)" means an absolute value of Yk.

However, according to the method using the expression (3), if large noise is superposed, a determination error will occur. Thus, normally Zk is found by the Viterbi detection method having excellent performance with respect to resistance to noise. A detector 265 is a detector using the Viterbi detection method. The Viterbi detection method, also called a maximum likelihood detection method, is a method wherein the convolution operation result of impulse response and record data estimated by the detector is compared with actual filter output Yk, and the record data having the minimum difference therebetween is output as detected data.

Figure 29A:
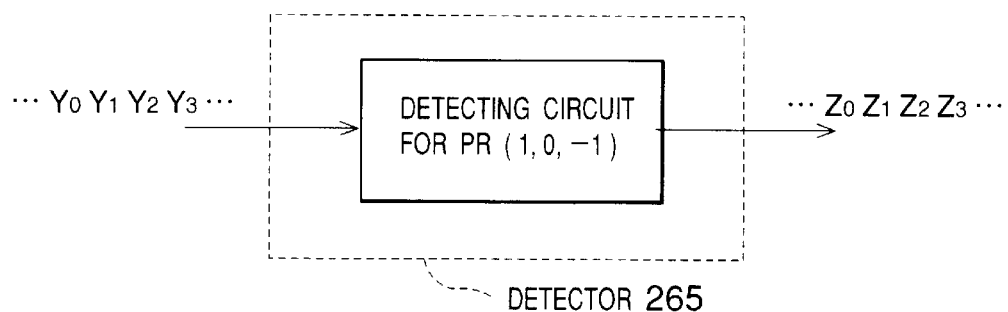
FIGS. 29A and 29B are block diagrams of Viterbi detector circuits for PR (1, 0, −1)

A Viterbi detector for PR (1, 0, −1) is used as the detector 265, as shown in FIG. 29A. Assuming that the input signals are "Y0, Y1, Y2, Y3, . . . " in order, the detected data is output as "Z0, Z1, Z2, Z3, . . . " in order.

Figure 29B:
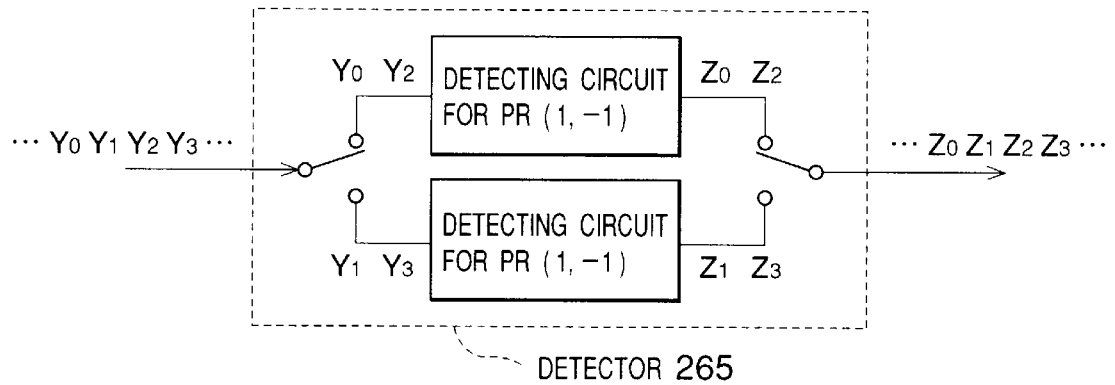

The same operation is also performed in the configuration shown in FIG. 29B, wherein two Viterbi detectors for PR (1, −1) (detection circuits for PR (1, −1)) are provided for parallel operation. That is, assuming that input signals of the detector 265 are "Y0, Y1, Y2, Y3, . . . " in order, even-sequence signals "Y0, Y2, Y4, . . . " are input to one detector and odd-sequence signals "Y1, Y3, Y5, . . . " are input to the other detector.

If the expression (2) is shown by the substitution "j=k/2", the expression becomes as follows:

$$Yj=(Bj-Bj-1) \quad (4)$$

If impulse response of the expression (4) is calculated as for the expression (2), (1, −1) is returned, which is represented as PR (1, −1). The input signals input to the detection circuits for PR (1, −1) can be assumed to be PR (1, −1) response waveforms. The detection circuits for PR (1, −1) operate independently and output detected data of "Z0, Z2, Z4, . . . " and "Z1, Z3, Z5, . . . "

Thus, if two detection circuits for PR (1, −1) are provided as in the configuration shown in FIG. 29B, each detection circuit may operate at half the speed of the data reproducing speed, so that the entire data reproducing speed can be made high compared with the configuration shown in FIG. 29A. Since the configuration of the detection circuit itself shown in FIG. 29B is also simpler than that shown in FIG. 29A, the Viterbi detection circuit having the configuration shown in FIG. 29B is normally adopted.

Figure 30:
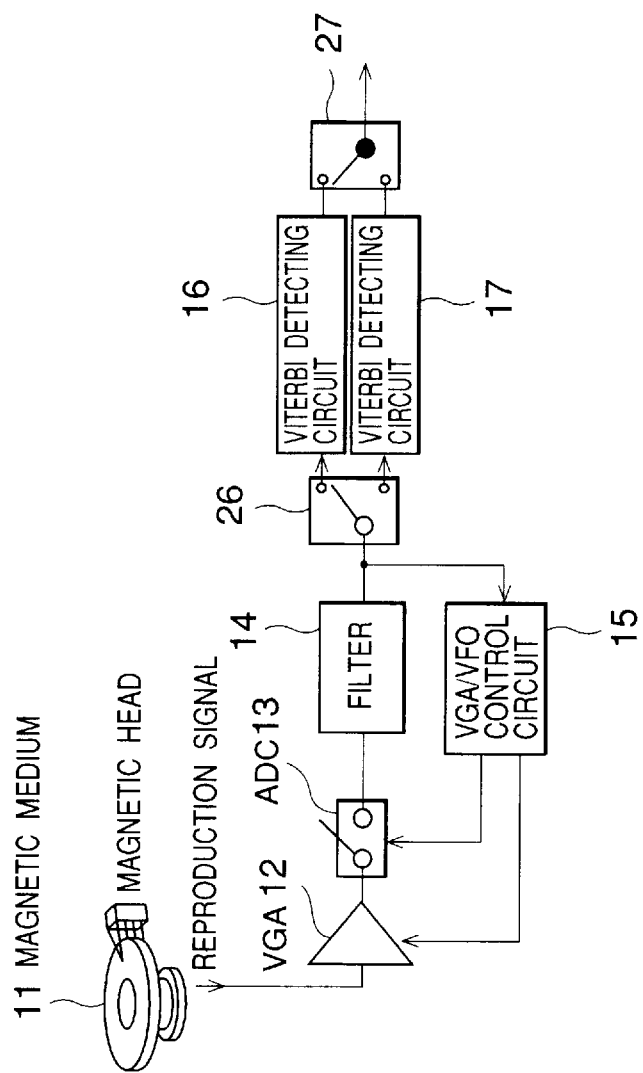
FIG. 30 is a block diagram of a data reproducing circuit for magnetic disk using a PR4-ML method.

FIG. 30 is a block diagram showing the configuration of a data reproducing circuit for magnetic disk adopting the PR4-ML method as a data reproducing method.

In FIG. 30, a magnetic medium 11 is a recording medium (magnetic disk) on which signals are actually recorded. A signal read via a magnetic head from the magnetic medium 11 is input to a variable gain amplifier (VGA) 12 for amplification. The amplification gain is adjusted by a VGA/ADC control circuit 15 so that the dynamic range of an analog-to-digital converter (ADC) 13 at the following stage can be used efficiently. The signal amplified by the VGA 12 is converted into a digital signal by the ADC 13.

A filter 14 equalizes the waveform of the digitalized reproduction signal so as to provide a PR4 response waveform. It can input a digital signal, equalize the input signal according to a predetermined signal equalization characteristic, and output the resultant signal as an output signal. If the output signal of the filter 14 differs from the PR4 response waveform, the VGA/VFO control circuit 15 adjusts the amplification gain of the VGA 12 and the sampling timing of the ADC 13 so as to provide the PR4 response waveform; it generates a sampling clock for giving the sampling timing of the ADC 13.

The sampling clock generated by the VGA/VFO control circuit 15 is also used as a system clock required for the data reproducing circuitry to operate.

The filter 14 output whose waveform is equalized so as to provide the PR4 response waveform is restored to the original record data by two Viterbi detection circuits for PR (1, −1) 16 and 17 as shown in FIG. 29B.

Elements 26 and 27 are, for example, ganged analog switches for switching the input signal supplying and the output signal exiting so that the two Viterbi detection circuits can operate alternately. For this purpose, a switch drive circuit, etc., (not shown) may be provided.

Next, the configuration of a Viterbi detection circuit for PR (1, −1) of binary output type will be discussed in detail.

Figure 2:
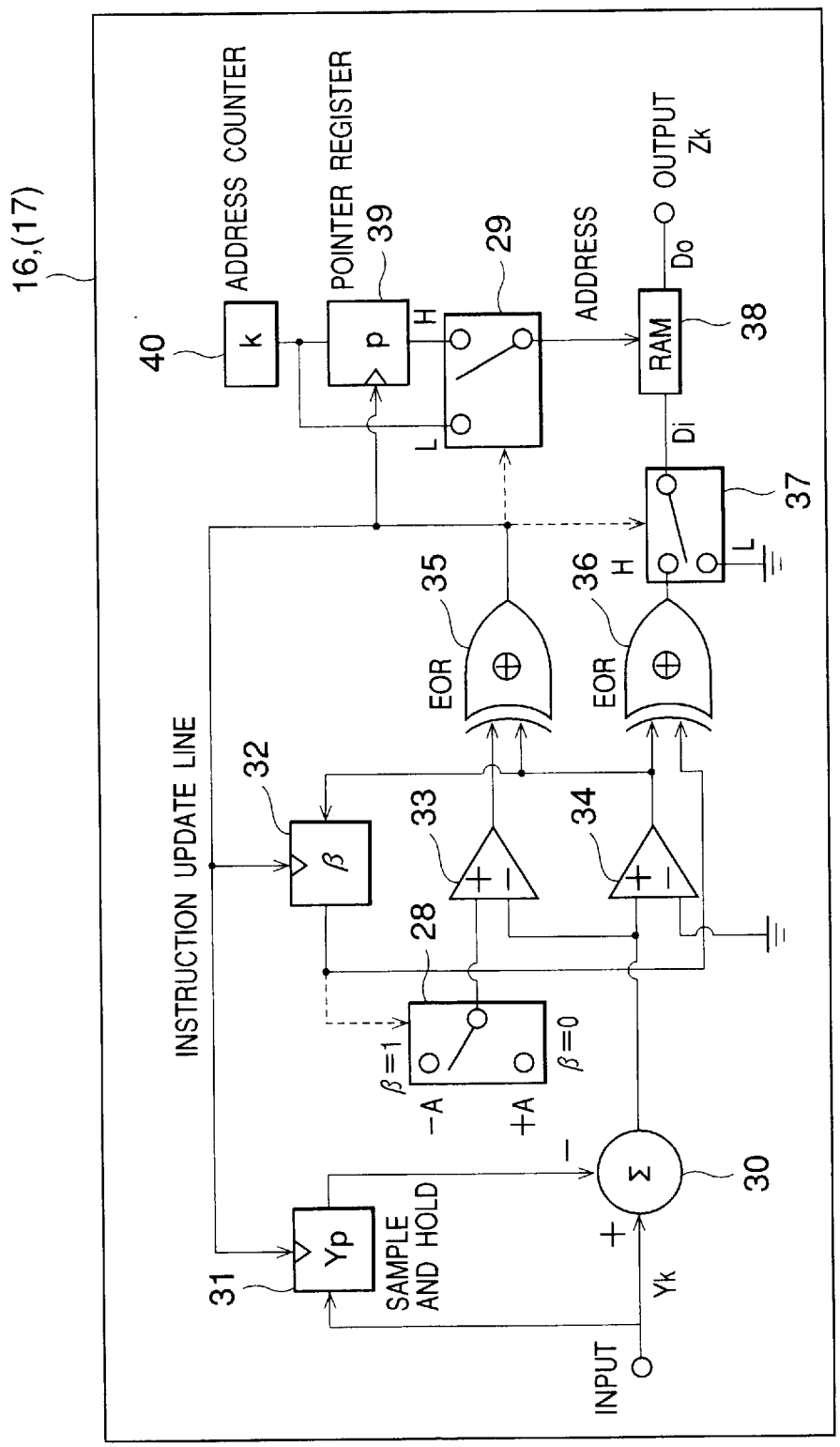
FIG. 2 is a block diagram of a Viterbi detection circuit for a PR (1, −1) method of binary output type.

FIG. 2 is a block diagram showing the configuration of the Viterbi detection circuit for PR (1, −1) of binary output type. This circuit is a circuit as shown in the paper "Viterbi Detection of class IV Partial Response on a Magnetic Recording Channel" by Wood et al. The circuit shown in FIG. 2 corresponds to the Viterbi detection circuit 16 or 17, which operates as an even-sequence or odd-sequence data detection circuit. In FIG. 2, an input signal is represented as "Yk" and output data as "Zk", where the suffix "k" denotes the point of time.

A sample and hold 31 is a sample and hold circuit for sampling and holding input signal Yk; it holds the value of the input signal Yk as Yp in response to a given update instruction.

An adder 30 is a circuit for finding a difference between the input signal "Yk" and "Yp" held by the sample and hold 31, "Yk−Yp."

Comparators 33 and 34 can compare the operation result of the adder 30 with a threshold value set in the Viterbi detection circuit. The comparator 34, which has a negative input terminal set to ground voltage "0", has a function of always comparing an output of the adder 30, which is input to a positive input terminal of the comparator 34 with, "0."

When the adder 30 outputs a positive value, the comparator 34 outputs "1;" when the adder 30 outputs a negative value, the comparator 34 outputs "0."

A sample and hold 32 is a sample and hold circuit for sampling and holding a given signal.

By the way, the value with which the comparator 33 is to compare an output of the adder 30 varies depending on the value β held by the sample and hold 32. That is, when β=1, a switch 28 is switched to the upper position in FIG. 2 and "−A" becomes an input signal to a positive input terminal of the comparator 33. When β=0, the switch 28 is switched to the lower position in FIG. 2 and "+A" becomes an input signal to the positive input terminal of the comparator 33. When the output value of the adder 30 is less than the value selected by the switch 28, the comparator 33 outputs "1;" when the output value of the adder 30 is greater than the value selected by the switch 28, the comparator 33 outputs "0."

"+A" is an actual signal amplitude when PR4 output is "1;" "−A" is an actual signal amplitude when the PR4 output is "−1."

The sample and hold 32 updates the held value β in response to an update instruction described below. When the update instruction is given, if the comparator 34 outputs "1", β is set to 1; when the update instruction comes, if the comparator 34 outputs "0", β is set to 0; otherwise, the sample and hold 32 holds the value of β intact. Such an operation is also understood from the configuration in which the output of the comparator 34 is input to the sample and hold 32.

EOR 35 and EOR 36 are each a 2-input exclusive OR circuit. Signals input to the EOR 35 are output signals from the comparators 33 and 34. When the EOR 35 outputs "1," the high signal is output on an instruction update line as an update instruction to the sample and hold 31 and 32 and a pointer register 39 described below.

Signals input to the EOR 36 are output signals from the comparator 34 and the sample and hold 32. Output of the EOR 36 becomes a temporary detector output, which is input to a RAM 38 as input signal (Di). The RAM 38 is a buffer memory for holding the detected data Zk.

A switch 37 is provided for switching input data to the RAM 38. When the EOR 35 outputs "1," the switch 37 is set to the upper position ("H"); when the EOR 35 outputs "0," the switch 37 is set to the lower position ("L").

An address counter 40 is a counter for holding an address used when the detected data is written into the RAM 38. A value k held by the address counter 40 is a value corresponding to the suffix k of the input signal Yk; as new Yk is input, the held value is incremented.

The point register 39 is a register for storing a memory address when the value of the detected data Zk is "pending" at the time k, as described below.

When the EOR 35 outputs "1" and an update instruction is given on the instruction update line, the value of the address counter 40 is held in the pointer register 39. Further, a switch 29 switches the address value to the RAM 38. When the EOR 35 outputs "1," the switch 29 is connected to the right position ("H"), setting the value of the pointer register 39 in the address of the RAM 38; when the EOR 35 outputs "0," the switch 29 is connected to the left position ("L"), setting the value of the address counter 40 in the address of the RAM 38.

For example, the RAM 38 has a capacity of storing 10-bit data. When 11th-bit data is input as Di, the RAM 38 outputs the oldest data as Do (=Zk) for performing an FIFO operation.

For example, according to the paper "Viterbi Detection of class IV Partial Response on a Magnetic Recording Channel" written by Wood, the Viterbi detection circuit shown in FIG. 2 reproduces record data according to the following processing algorithm:

(1) First, (Yk–Yp) is calculated.

(2) If the value of (Yk–Yp) is less than "–A" with $\beta$=1, "1" is written into the address p of the RAM 38. The value of $\beta$ is updated as $\beta$=0.

Next, the value Yp held in the sample and hold 31 is updated to new Yk value. Further, the value p of the pointer register 39 is updated to the value k of the address counter 40.

(3) If the value of (Yk–Yp) is greater than "+A" with $\beta$=0, "1" is written into the address p of the RAM 38. The value of $\beta$ is updated as $\beta$=1.

Next, the value Yp held in the sample and hold 31 is updated to Yk value. Further, the value p of the pointer register 39 is updated to the value k of the address counter 40.

(4) If the value of (Yk–Yp) is a value between "–A" and "0" with $\beta$=1 or is a value between "A" and "0" with $\beta$=0, "0" is written into the address k of the RAM 38.

(5) If the value of (Yk–Yp) is greater than "0" with $\beta$=1, "0" is written into the address p of the RAM 38. Next, the value Yp held in the sample and hold 31 is updated to Yk value. Further, the value p of the pointer register 39 is updated to the value k of the address counter 40.

(6) If the value of (Yk–Yp) is less than "0" with $\beta$=0, "0" is written into the address p of the RAM 38. Next, the value Yp held in the sample and hold 31 is updated to Yk value. Further, the value p of the pointer register 39 is updated to the value k of the address counter 40.

(7) The value of "k" is updated as "k+1".

Steps (1) to (7) are repeated each time a signal is input.

Considering the processing algorithm described above, the operation of the Viterbi detection circuit shown in FIG. 2 will be briefly discussed with reference to FIG. 9.

In FIG. 9, (F) is input signal Yk. Let the maximum and minimum values of signal amplitude at the time be "±1.0".

Therefore, the threshold values "+A" and "–A" corresponding to the two connection states of the switch 28 shown in FIG. 2 are "+1.0" and "–1.0".

The suffix of Yk, "k", is a suffix for denoting the point of time at which the input signal is input, as before. Yp is a value held in the sample and hold 31. p is a value held in the pointer register 39. The operation will be discussed in order starting at time 3.

Input Yk at time 3 is "0.1" and Yp at this time is "1.0," Yk at time 2. The current value of the pointer register 39, p, is "2." Therefore, the value of (Yk–Yp) output by the adder 30 is "–0.9." At this time, $\beta$=1 and the switch 28 is connected to the upper position ("–A," namely, "–1.0" ). Then, the comparator 33 outputs "0" and the comparator 34 outputs "0." Therefore, the EOR 36 outputs "1." The EOR 35 outputs "0," outputting no update instruction.

Thus, the switch 29 is connected to the L position (side of the address counter 40) and the switch 37 is connected to the L position (zero level). As a result, the input data of the RAM 38, Di, becomes "0." Then, "0" is written into address 3 of the RAM 38. Since no update instruction is output at this time, the values of $\beta$ and Yp remain unchanged. The value of the address counter 40 is counted up to "4" and the process for the input signal at time 3 is completed.

Next, input Yk at time 4 is "–0.2" and Yp is the same value as at time 3, namely, "0.1." The value of the pointer register 39, p, is "2." Therefore, the value of (Yk–Yp) output by the adder 30 is "–1.2." At this time, $\beta$=1 and the switch 28 is connected to the upper position ("–A," namely, "–1.0"). Then, the comparator 33 outputs "1" and the comparator 34 outputs "0". Therefore, the EOR 36 outputs "1." The EOR 35 outputs "1," outputting an update instruction on the instruction update line.

Thus, the switch 29 is connected to the H position (side of the pointer register 39) and the switch 37 is connected to the H position (side of the EOR 36). As a result, input to the RAM 38, Di, is "1." Since the value of the pointer register 39, p, is "2," "1" is written into address 2 of the RAM 38. The point to be noted is that the data at time 2 is determined at time 4 as in the example. That is, the detected data at time 2 and before is defined at last at this point in time.

Since the comparator 34 outputs "0," the value of $\beta$ is updated to "0." The value of Yp is changed to "–0.2." Further, the value of the pointer register 39, p, is updated to "4." The value of the address counter 40 is counted up to "5" for executing a process at the next time.

As compared to the data reproduction by the PR4-ML method as described above, data reproduction according to the invention has the following features:

(a) Basically, data reproduction adopting the PR4-ML method is also performed in the invention; although reproduction output is binary data (1 or 0) in the PR4-ML method, quadripartite data is output in the PR4-ML method according to the invention.

(b) A process of detecting a detection error in the PR4-ML method using the detected data by the PR4-ML method and an input signal to a Viterbi detector, namely, error signal pattern detection is performed.

(c) The detected data by the PR4-ML method is used to make data correction according to a predetermined rule. That is, there is a relation between a detection error (error signal pattern) detected in the process in (b) and the detected data at the time. When their relation is examined, if a predetermined relation is found, the detected data by the PR4-ML method is corrected.

Figure 1:
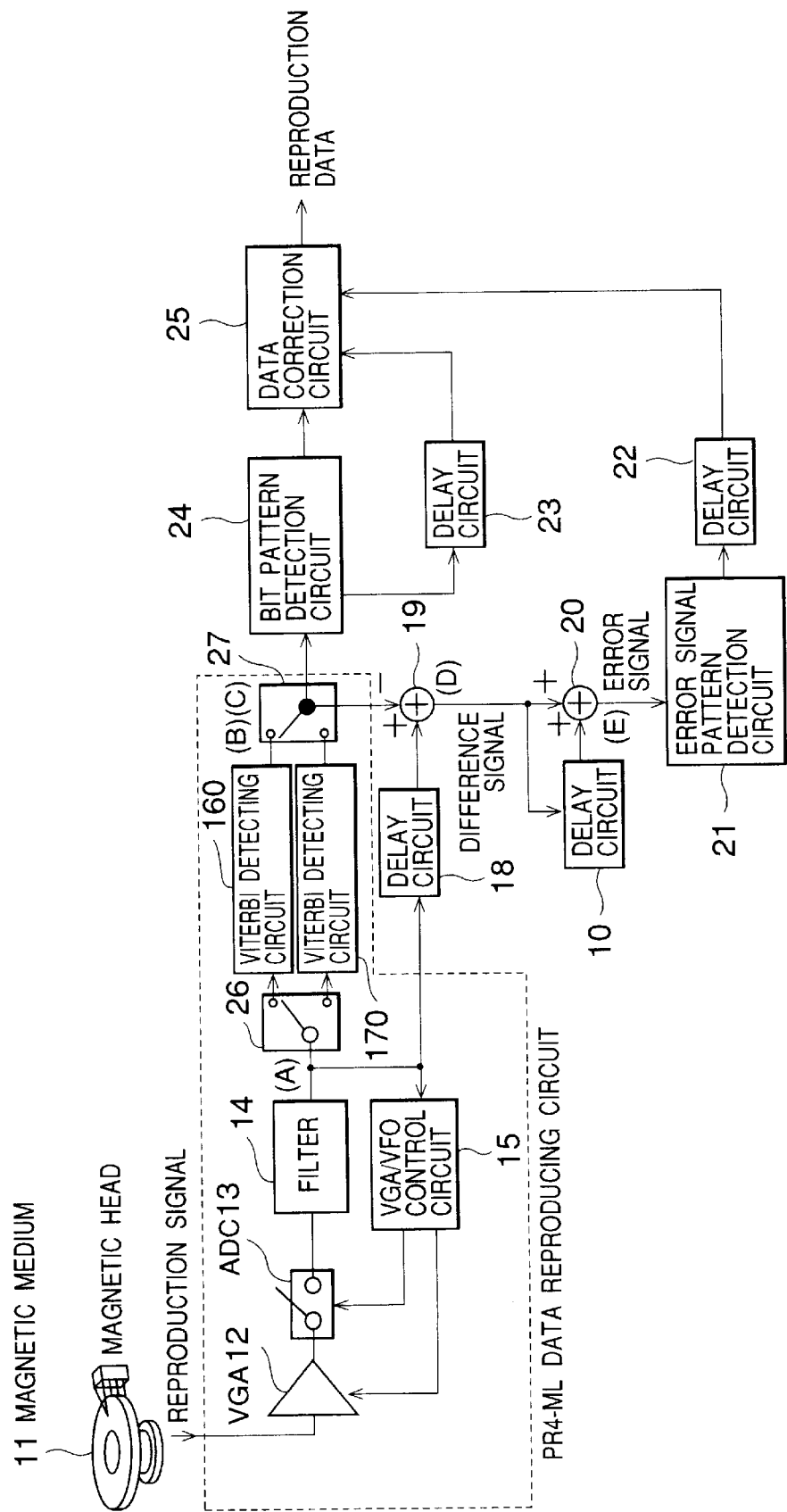
FIG. 1 is a block diagram of a data reproducing circuit of a first embodiment of the invention.

These features will be discussed with specific embodiments:

First, FIG. 1 shows a configuration example of a data reproducing circuit of a first embodiment of the invention.

In FIG. 1, the portion surrounded by the dotted line is similar to the PR4-ML method data reproducing circuit adopting the PR4-ML method shown in FIG. 30 and therefore will not be discussed again. However, Viterbi detection circuits 160 and 170 in FIG. 1, which are detection circuits of quadripartite output type, differ from the Viterbi detection circuits 16 and 17 shown in FIGS. 30 and 2, which will be discussed later with reference to FIG. 3.

Other components of the data reproducing circuit in FIG. 1 are as follows:

First, an error signal pattern detection circuit 21 is a circuit for performing the process described above in (b).

A bit pattern detection circuit 24 and a data correction circuit 25 are circuits for performing the process described above in (c).

Adders 19 and 20 are circuits for adding input signals.

Delay circuits 10, 18, 22, and 23 are circuits for delaying input signals a predetermined time for output; for example, each circuit is made of D-type flip flop. How long a signal is delayed may be determined so that the timings of signals become proper at system construction considering the configuration of the Viterbi detection circuits 160 and 170, the bit pattern detection circuit 24, etc. As one example, the delay circuit 10 normally is configured as a circuit for delaying a signal by one system clock.

The data reproducing operation according to the embodiment will be outlined with reference to FIGS. 1 and 7.

FIG. 7 shows output signals or output values from main components of the components shown in FIG. 1. In FIG. 7, time T denotes the time at which an input signal is input.

Filter 14 output shown in (A) of FIG. 7 denotes an output signal from a filter 14 shown in FIG. 1, and becomes output of PR (1, 0, −1) described above. In the filter 14 output, the signal indicated by the solid line is the original PR (1, 0, −1) output signal and the part indicated by the dotted line denotes a signal on which noise is superposed.

Binary determination result shown in (B) of FIG. 7 is the detected result when data is reproduced by the Viterbi detection circuit shown in FIG. 2 from the normal filter 14 output indicated by the solid line. However, the correct detected results at time 6 and time 8 are "0" and "1" respectively, and "1" and "0" pointed by arrows are detected results when noise is superposed on filter 14 output and erroneous detected results are output.

Quadripartite determination result shown in (C) of FIG. 7 is the detected result when detection is performed by the Viterbi detection circuit of quadripartite output type 160, 170 according to the invention. The Viterbi detection of quadripartite output type will be discussed later in detail. As in the binary determination result, the correct detected results output at time 6 and time 8 in the quadripartite determination result are "+0" and "−1" respectively and "−1" and "−0" pointed by arrows are erroneous determination results.

"Difference signal" shown in (D) of FIG. 7 is output by the adder 19. The adder 19 subtracts output of the Viterbi detection circuit 160, 170 from output of the filter 14 provided through the adder 18, and outputs an operation result as the difference signal (D).

"Error signal" shown in (E) of FIG. 7 is output by the adder 20. The adder 20 adds the difference signal and a signal resulting from delaying the difference signal by the delay circuit 10, and outputs the operation result as the error signal (E). As seen in (E) of FIG. 7, the error signal shown in (E) of FIG. 7 is generated by adding a signal resulting from delaying the difference signal shown in (D) of FIG. 7 a predetermined time to the difference signal.

As described above, the filter 14 output shown in (A) of FIG. 7 is a PR4 output and the normal amplitude value containing no noise is any one of the three values "1.0," "0," and "−1.0."

Then, quadripartite detected result Zk is defined as follows:

$Z_k=+1$ when $Y_k=+1.0$;

$Z_k=-1$ when $Y_k=-1.0$;

$Z_k=+0$ when $Y_k=0$ and ($Z_{k-2}=+1$ or $Z_{k-2}=+0$); and $Z_k=-0$ when $Y_k=0$ and ($Z_{k-2}=-1$ or $Z_{k-2}=-0$)

Both "$Z_k=+0$" and "$Z_k=-0$" of the quadripartite output Viterbi detected results are assumed to be 0 and the detected result Zk is considered with three values "1, 0, and −1." At this time, assuming that Yk does not contain noise and that all values of Zk are correct values, the following expression holds for all values of "k":

$$Y_k - Z_k = 0 \qquad (5)$$

Of course, actual filter 14 output contains noise. Letting the noise be Nk, filter output containing noise, Y'k, is defined as the following expression (6):

$$Y'_k = Y_k + N_k \qquad (6)$$

From expressions (5) and (6), the following relation is obtained:

$$Y'_k - Z_k = N_k \qquad (7)$$

The difference signal shown in (D) of FIG. 7 corresponds to Nk in expression (7).

Generally, noise Nk can be approximated as a signal having a Gaussian distribution of average value 0. Further, letting the difference signal in (D) of FIG. 7 be "diff(k)" and the error signal in (E) of FIG. 7 be "err(k)," the following relational expression is true:

$$\mathrm{err}(k) = \mathrm{diff}(k) + \mathrm{diff}(k-1) \qquad (8)$$

Let's consider an example in which the quadripartite determination results at time 6 and time 8 shown in (C) of FIG. 7 are output as erroneous determination results as indicated by the arrows. This example is a case where $N_k \neq 0$ and $Y_k \neq Z_k$.

The difference signals at each time from time 5 to time 9 are:

$\mathrm{diff}(5) = Y_5 - Z_5 = -1 - (-1) = 0$;

$\mathrm{diff}(6) = Y_6 - Z_6 = 0 - (-1) = +1$;

$\mathrm{diff}(7) = Y_7 - Z_7 = 1 - 1 = 0$;

$\mathrm{diff}(8) = Y_8 - Z_8 = -1 - 0 = -1$;

and $\mathrm{diff}(9) = Y_9 - Z_9 = -1 - (-1) = 0$

Further, the error signals at each time from time 6 to time 9 are:

$\mathrm{err}(6) = \mathrm{diff}(6) + \mathrm{diff}(5) = +1$;

$\mathrm{err}(7) = \mathrm{diff}(7) + \mathrm{diff}(6) = +1$;

$\mathrm{err}(8) = \mathrm{diff}(8) + \mathrm{diff}(7) = -1$;

and $$err(9)=diff(9)+diff(8)=-1$$

The difference signals can be assumed to be PR4 response waveform and the error signals can be assumed to be EPR4 response waveform. This fact is described in the above-mentioned paper of Wood, "Turbo-PRML: A Compromise EPRML Detector."

Then, an error signal caused by a PR4-ML determination error is detected and the PR4-ML determination result is corrected. A specific detection method will be described later.

By the way, the types of occurring error signal patterns depends on the determination error form in the PR4-ML method; nine types of error signal patterns exist according to the paper of Wood "Turbo-PRML: A Compromise EPRML Detector." However, most of actually occurring PR4-ML method determination errors correspond to any of four types of error signal pattern occurrences shown in FIGS. 8A–8D ("two types" if positive and negative signs are not distinguished from each other). Then, in the invention, the four types of error signal patterns shown in FIGS. 8A–8D are limited for detection of error signal patterns, and the erroneous determination is detected.

Referring to FIGS. 8A–8D, response waveforms to the error signal patterns are as follows:

FIG. 8A "error2P," (1,1,−1,−1)        (9)

FIG. 8B "error2N," (−1,−1,1,1)        (10)

FIG. 8C "error4P," (1,1,0,0,−1,−1)     (11)

FIG. 8D "error4N," (−1,−1,0,0,1,1)     (12)

FIGS. 8A and 8B; 8C and 8D have signs only inverted and can be said to be substantially the same type of error signal pattern.

The "error2P," "error2N," "error4P," and "error4N" are names given to those error signal patterns for convenience, and the (1, 1, −1, −1), (−1, −1, 1, 1), (1, 1, 0, 0, −1, −1), and (−1, −1, 0, 0, 1, 1) are digit patterns denoting response waveforms with respect to error signals in the time sequence. The error signal patterns are shown on the right of FIGS. 8A–8D.

For convenience, the amplitudes of error signals shown in FIGS. 8A and 8B are represented as y(1), y(2), y(3), and y(4) and further those shown in FIGS. 8C and 8D as y(0), y(1), y(2), y(3), y(4), and y(5).

Tables on the left of FIGS. 8A–8D denote the relationship between correct determination data of PR4-ML and erroneous determination data for the error signal patterns, wherein "+1," "−1," "+0," and "−0" are quadripartite PR4-ML values described above and "x" is arbitrary 1-bit reproduced data.

For example, the first row of the table in FIG. 8A represents that the normal signal to be determined to be "+0, x, +0, x" is erroneously determined to be "−1, x, +1, x." Likewise, the second row of the table represents that the normal signal to be determined to be "+0, x, −1, x" is erroneously determined to be "−1, x, −0, x." The error signals observed in all of the four rows shown in FIG. 8A form the error signal pattern shown on the right of FIG. 8A. When the error signal pattern shown in FIG. 8A is detected, a determination error in PR4-ML can occur in detected data corresponding to y(1), y(3).

The first row of the table in FIG. 8B represents that the normal signal to be determined to be "−0, x, −0, x" is erroneously determined to be "+1, x, −1, x." Likewise, the second row of the table represents that the normal signal to be determined to be "−0, x, +1, x" is erroneously determined to be "+1, x, +0, x." The error signals observed in all of the four rows shown in FIG. 8B form the error signal pattern shown on the right of FIG. 8B. When the error signal pattern shown in FIG. 8B is detected, a PR4-ML method determination error occurs in detected data corresponding to y(1), y(3).

The first row of the table in FIG. 8C represents that the normal signal to be determined to be "+0, x, +0, x, +0, x" is erroneously determined to be "−1, x, −0, x, +1, x." Likewise, the second row of the table represents that the normal signal to be determined to be "+0, x, +0, x, −1, x" is erroneously determined to be "−1, x, −0, x, −0, x". The error signals observed in all of the four rows shown in FIG. 8C form the error signal pattern shown on the right of FIG. 8C. When the error signal pattern shown in FIG. 8C is detected, a PR4-ML method determination error occurs in detected data corresponding to y(0), y(4).

The first row of the table in FIG. 8D represents that the normal signal to be determined to be "−0, x, −0, x, −0, x" is erroneously determined to be "+1, x, +0, x, −1, x." Likewise, the second row of the table represents that the normal signal to be determined to be "−0, x, −0, x, +1, x" is erroneously determined to be "+1, x, +0, x, +0, x." The error signals observed in all of the four rows shown in FIG. 8D form the error signal pattern shown on the right of FIG. 8D. When the error signal pattern shown in FIG. 8D is detected, a PR4-ML method determination error occurs in detected data corresponding to y(0), y(4).

To detect the error signal patterns, square errors between actually observed error signal pattern "y(0), y(1), y(2), y(3), y(4), y(5)" (containing "y(1), y(2), y(3), y(4)") and error signal patterns shown on the right of FIGS. 8A–8D are used as evaluation functions, called "metrics."

For example, metric Ma for the error signal pattern shown in FIG. 8A is represented by the following expression:

$$Ma=y(0)^2+(y(1)-1)^2+(y(2)-1)^2+(y(3)+1)^2+(y(4)+1)^2+y(5)^2$$

Likewise, metrics Mb, Mc, and Md for the error signal patterns shown in FIGS. 8B–8D are represented as follows:

$$Mb=y(0)^2+(y(1)+1)^2+(y(2)+1)^2+(y(3)-1)^2+(y(4)-1)^2+y(5)^2,$$

$$Mc=(y(0)-1)^2+(y(1)-1)^2+y(2)^2+y(3)^2+(y(4)+1)^2+(y(5)+1)^2,$$

$$Md=(y(0)+1)^2+(y(1)+1)^2+y(2)^2+y(3)^2+(y(4)-1)^2+(y(5)-1)^2$$

Further, square error M0 between an actually observed error signal and an error signal with no PR4-ML determination error is found as shown below:

$$M0=y(0)^2+y(1)^2+y(2)^2+y(3)^2+y(4)^2+y(5)^2$$

Since the metric is an error representing value, it is determined that the error signal pattern corresponding to the metric of the minimum value among Ma, Mb, Mc, Md, and M0 is an actually observed error signal pattern.

However, since a process for strictly finding the minimum value is complicated, the following simplified conditional expressions are used to detect the error signal patterns in the invention:

The conditional expression for detecting the error signal pattern shown in FIG. 8A is as follows:

(Ma<M0) AND (Ma<Mc)

where "AND" denotes an AND operation.

When this inequality is calculated according to the definition of each metric, $$y(1)+y(2)-y(3)-y(4)>2.0$$

and $$y(0)-y(2)+y(3)-y(5)<0.0 \qquad (13)$$

Likewise, the conditional expression for detecting the error signal pattern shown in FIG. 8B is as follows:

$$(Mb<M0) \text{ AND } (Mb<Md)$$

When this inequality is calculated according to the definition of each metric, $$y(1)+y(2)-y(3)-y(4)<-2.0$$

and $$y(0)-y(2)+y(3)-y(5)>0.0 \text{Figure} \qquad (14)$$

Likewise, the conditional expression for detecting the error signal pattern shown in FIG. 8C is as follows:

$$(Mc<M0) \text{ AND } (Mc<Ma)$$

When this inequality is calculated according to the definition of each metric, $$y(0)+y(1)-y(4)-y(5)>2.0$$

and $$y(0)-y(2)+y(3)-y(5)>0.0 \qquad (15)$$

Likewise, the conditional expression for detecting the error signal pattern shown in FIG. 8D is as follows:

$$(Md<M0) \text{ AND } (Md<Mb)$$

When this inequality is calculated according to the definition of each metric, $$y(0)+y(1)-y(4)-y(5)<-2.0$$

and $$y(0)-y(2)+y(3)-y(5)<0.0 \qquad (16)$$

Expressions (13), (14), (15), and (16) mentioned above become conditional expressions for detecting error signal patterns. Therefore, these expressions are used to detect error signal patterns.

Next, classification of the PR4-ML detected results (bit pattern detection) will be discussed.

As already described with reference to FIGS. 8A–8D, for example, when the error signal pattern shown on the right of FIG. 8A is detected, the PR4-ML output data (quadripartite) must be any of the four data strings shown as erroneous determination data on the left of FIG. 8A.

When expression (13) holds and the error signal pattern shown on the right of FIG. 8A is detected, if the PR4-ML output is not any of the four data strings shown as "erroneous determination data" on the left of FIG. 8A, it is considered that an error signal is erroneously detected.

Then, PR4-ML method output patterns are classified and a comparison with the error signal pattern detection result is made. As already described, quadripartite data of "+1, +0, −0, −1" is output in the PR4-ML method according to the invention. Further, PR4-ML output (quadripartite) is bin(0), bin(1), bin(2), bin(3), bin(4), bin(5) in the time sequence.

The condition under which PR4-ML reproduction output matches any string of the "erroneous determination data" shown on the left of FIG. 8A is as follows:

$$P2\text{bit}=(\text{bin}(1)=-1 \text{ OR bin}(1)=-0) \text{ AND } (\text{bin}(3)=+1 \text{ OR bin}(3)=-0) \qquad (17)$$

where OR denotes OR operation and AND denotes AND operation.

Likewise, the conditions under which PR4-ML reproduction output matches the erroneous determination data strings shown on the left of FIGS. 8B–8D are as follows:

$$N2\text{bit}=(\text{bin}(1)=+1 \text{ OR bin}(1)=+0) \text{ AND } (\text{bin}(3)=-1 \text{ OR bin}(3)=+0) \qquad (18)$$

$$P4\text{bit}=(\text{bin}(0)=-1 \text{ OR bin}(0)=-0) \text{ AND } (\text{bin}(2)=-0) \text{ AND } (\text{bin}(4)=+1 \text{ OR bin}(4)=-0) \qquad (19)$$

$$N4\text{bit}=(\text{bin}(0)=+1 \text{ OR bin}(0)=+0) \text{ AND } (\text{bin}(2)=+0) \text{ AND } (\text{bin}(4)=-1 \text{ OR bin}(4)=+0) \qquad (20)$$

When the P2bit shown in expression (17) is 1, PR4-ML reproduction output is any of the erroneous determination data shown in FIG. 8A. Likewise, when the N2bit shown in expression (18) is 1, PR4-ML reproduction output is any of the erroneous determination data shown in FIG. 8B. Likewise, when the P4bit shown in expression (19) is 1, PR4-ML reproduction output is any of the erroneous determination data shown in FIG. 8C. Likewise, when the N4bit shown in expression (20) is 1, PR4-ML reproduction output is any of the erroneous determination data shown in FIG. 8D. The PR4-ML reproduction output can be classified into four types corresponding to the error signal patterns by performing the logical operations.

The description is summarized as follows:

When expression (13) holds (i. e., the error signal pattern in FIG. 8A is detected) and the P2bit shown in expression (17) is 1 (PR4-ML reproduction output matches any of the erroneous determination data in FIG. 8A), it is determined that the determination error shown in FIG. 8A occurs, and the detected result corresponding to bin(1), bin(3) is inverted for correcting the determination error.

Likewise, when expression (14) holds (i. e., the error signal pattern in FIG. 8B is detected) and the N2bit shown in expression (18) is 1, it is determined that the determination error shown in FIG. 8B occurs, and the detected result corresponding to bin(1), bin(3) is inverted for correcting the determination error.

Likewise, when expression (15) holds (i. e., the error signal pattern in FIG. 8C is detected) and the P4bit shown in expression (19) is 1, it is determined that the determination error shown in FIG. 8C occurs, and the detected result corresponding to bin(0), bin(4) is inverted for correcting the determination error.

Likewise, when expression (16) holds (i. e., the error signal pattern in FIG. 8D is detected) and the N4bit shown in expression (20) is 1, it is determined that the determination error shown in FIG. 8D occurs, and the detected result corresponding to bin(0), bin(4) is inverted for correcting the determination error.

The inversion of the detected result means that data i inverted between "1" and "0" without changing the sign; specifically, "+1" is corrected to "+0," "+0" to "+1", "−1" to "−0," and "−0" to "−1." Although erroneous determination data may be completely corrected to correct data, a binary value of "1" or "0" is finally output and the signs need not be accurate. Then, actually, only data is corrected. Thus, the data reproducing method according to the invention can reduce the error rate at data reproduction more than the former PR4-ML method; if they provide a similar error rate at data reproduction, the data reproducing method according to the invention can improve the data recording density on recording media more than the former PR4-ML method.

Next, the parts of the data reproducing circuit of the first embodiment of the invention will be discussed in detail.

First, the Viterbi detection circuit for PR (1, −1) of quadripartite output type used for the data reproducing circuit according to the embodiment will be discussed with reference to FIG. 3.

Figure 3:
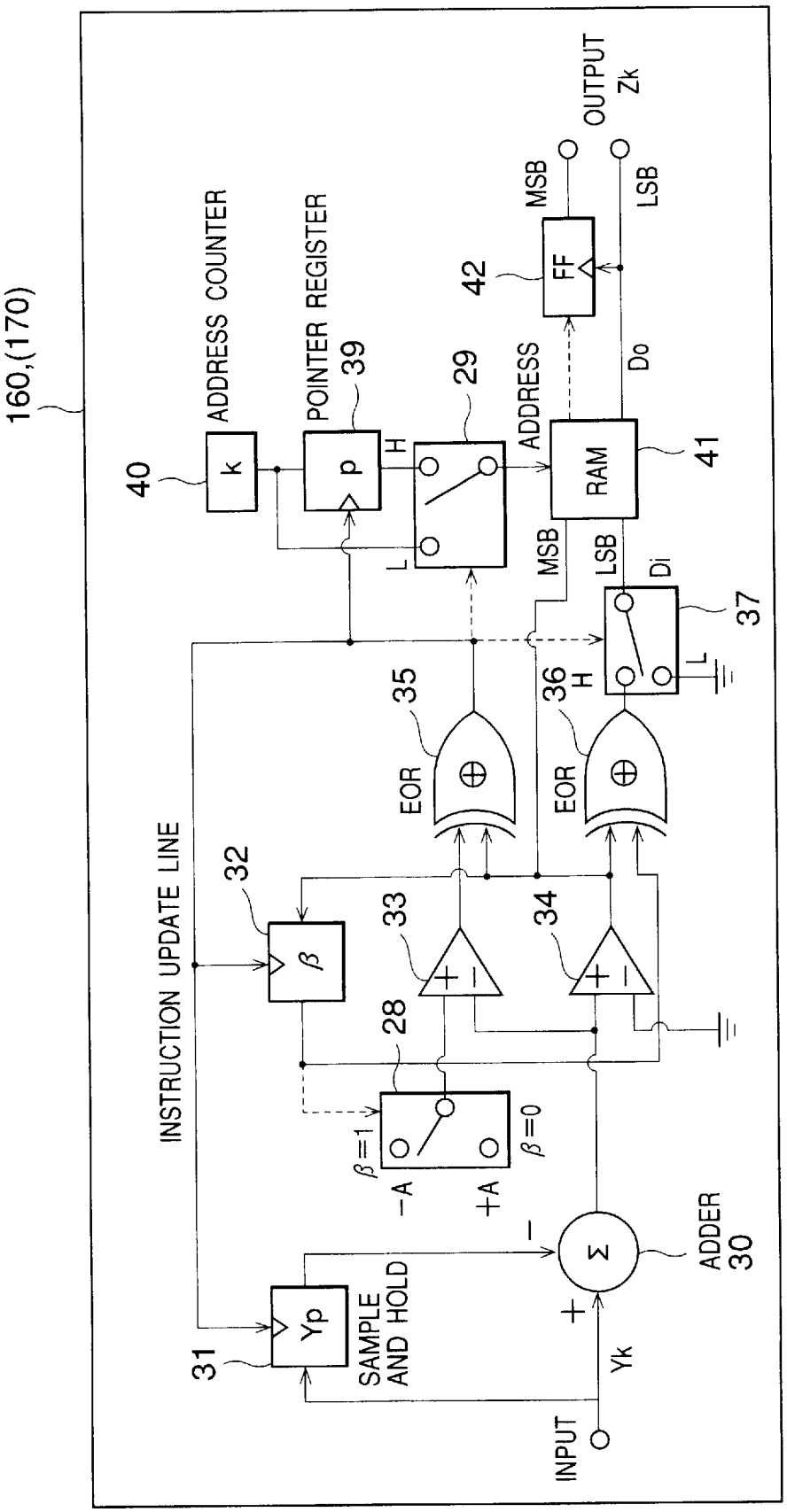
FIG. 3 is a block diagram of a Viterbi detection circuit for a PR (1, −1) method of quadripartite output type according to the invention.

FIG. 3 shows the configuration of the Viterbi detection circuit for PR (1, −1) of quadripartite output type. The circuit shown in FIG. 3 corresponds to the Viterbi detection circuit 160 or 170 shown in FIG. 1. As seen in FIG. 3, the circuit has the same basic configuration as the Viterbi detection circuit of binary output type shown in FIG. 2; circuit parts identical with those in FIG. 2 are denoted by the same reference numerals in FIG. 3. The circuit is characterized by the fact that an output terminal of a comparator 34 is connected to a RAM 41 and that a flip-flop (FF) 42 is connected to the RAM 41.

In FIG. 3, an input signal is represented as Yk, and output data is as Zk where the suffix "k" denotes the time at which the input signal is input. A sample and hold 31 is a sample and hold circuit for sampling and holding input signal Yk; it holds the value of the input signal Yk as "Yp" in response to an update instruction.

An adder 30 is a circuit for finding a difference between the input signal Yk and Yp held by the sample and hold 31, "Yk–Yp". Comparators 33 and 34 can compare the operation result of the adder 30 with a threshold value preset in the Viterbi detection circuit.

The comparator 34 has a function of always comparing an output of the adder 30, which is input to a positive input terminal of the comparator 34, with 0, an input value to a negative input terminal thereof (grounded as shown in the figure). When the adder 30 outputs a positive value, the comparator 34 outputs "1;" when the adder 30 outputs a negative value, the comparator 34 outputs "0."

A sample and hold 32 is a sample and hold circuit for sampling and holding output of the comparator 34.

The value with which the comparator 33 is to compare output of the adder 30 varies depending on the value held by the sample and hold 32, β. That is, when β=1, a switch 28 is switched to the upper position in FIG. 2 and −A becomes an input signal to a positive input terminal of the comparator 33. When β=0, the switch 28 is switched to the lower position in FIG. 2 and "+A" becomes an input signal to the positive input terminal of the comparator 33.

When the output value of the adder 30 is less than the value selected by the switch 28, the comparator 33 outputs "1;" when the output value of the adder 30 is greater than the value selected by the switch 28, the comparator 33 outputs "0." "+A" is actual signal amplitude when PR4 output is "1;" "−A" is actual signal amplitude when PR4 output is "−1."

The sample and hold 32 updates the held value β in response to a given update instruction.

When the update instruction is given, if the comparator 34 outputs "1," β is set to 1; when the update instruction comes, if the comparator 34 outputs "0," β is set to 0; otherwise, the sample and hold 32 holds the value of β intact.

EOR 35 and EOR 36 are each a 2-input exclusive OR circuit. Signals input to the EOR 35 are output signals of the comparators 33 and 34. When the EOR 35 outputs "1," an update instruction is output on an instruction update line. On the other hand, signals input to the EOR 36 are output signals of the comparator 34 and the sample and hold 32; output of the EOR 36 is input to the RAM 41 as input data so that it becomes a final detector output.

A switch 37 is provided for switching input data to the RAM 41. When the EOR 35 outputs "1," the switch 37 is set to the upper position ("H"); when the EOR 35 outputs "0," the switch 37 is set to the lower position ("L").

An address counter 40 is a counter for holding an address which is used when the detected data is written into the RAM 41. The count value of the address counter 40, k, is a value corresponding to the suffix k of the input signal Yk; as new Yk is input, the value is incremented.

The point register 39 is a register for storing a RAM address (memory address) when the value of the detected result Zk is pending at the time k. That is, the pointer register 39 has a function of holding the value of the address counter 40 when the EOR 35 outputs "1" and an update instruction is output.

A switch 29 switches the address value to the RAM 41. When the EOR 35 outputs "1," the switch 29 is connected to the right position (side of H); when the EOR 35 outputs "0," the switch 29 is connected to the left position (side of L).

The RAM 41 functions as a buffer memory for holding the detected result Zk. The difference between the RAM 41 and the RAM 38 shown in FIG. 2 is that the data bus connected to the RAM 38 is a 1-bit bus; whereas the data bus connected to the RAM 41 is a 2-bit bus.

The FF 42 is made of, for example, a 1-bit D-type flip-flop. When the LSB (least significant bit) of output data of the RAM 41 is "1," it becomes an input trigger signal to the FF 42, which then operates so as to hold the value of the MSB (most significant bit) of the output data of the RAM 41.

The LSB of the 2-bit data, output data of the RAM 41, becomes the LSB of output Zk and output of the FF 42 becomes the MSB of output Zk. Table 1 lists the correspondence between the 2-bit data Zk output by the Viterbi detection circuit shown in FIG. 3 and the above-mentioned quadripartite detected data "+1, +0, −0 −1."

TABLE 1

| Quadripartite data | Binary representation |
| --- | --- |
| +1 | 01 |
| +0 | 00 |
| −0 | 10 |
| −1 | 11 |

Next, the operation of the Viterbi detection circuit shown in FIG. 3 will be discussed with reference to FIG. 10.

Figure 10:
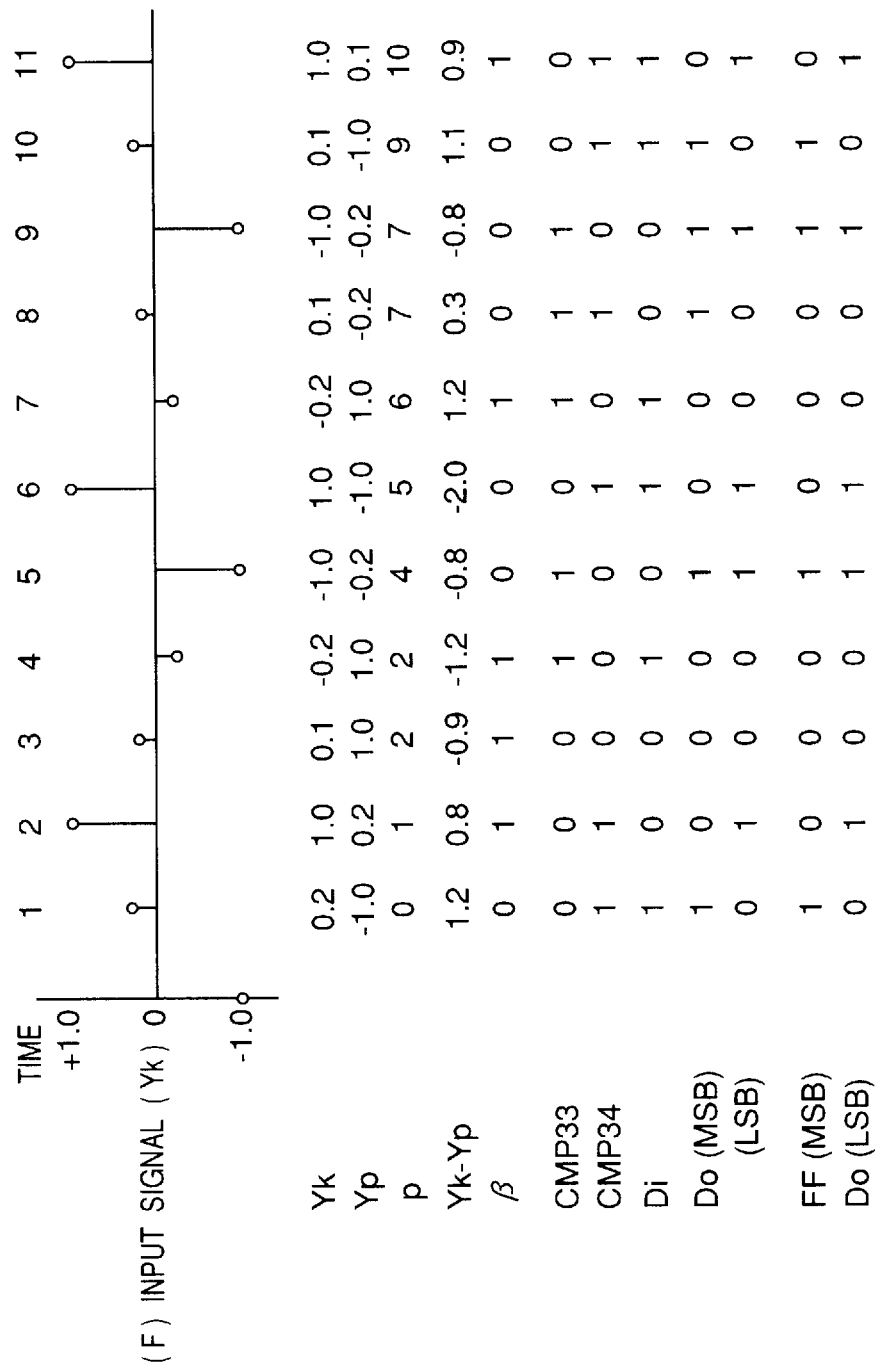
FIG. 10 is an illustration showing the operation of the Viterbi detection circuit according to the first embodiment of the invention.

In FIG. 10, (F) is input signal Yk. Let the maximum and minimum values of input signal amplitude be ±1.0. Therefore, the threshold values "+A" and "−A" set corresponding to the connection state of the switch 28 shown in FIG. 3 are "+1.0" and "−1.0." The suffix of Yk, "k," denotes the time at which the input signal is input, as before. Yp is a value held in the sample and hold 31. p is a value held in the pointer register 39. The operation will be discussed in order starting at time 3.

First, input Yk at time 3 is "0.1" and Yp at this time is "1.0," Yk at time "2." The current value of the pointer register 39, p, is 2. Therefore, the value of "Yk–Yp" output by the adder 30 becomes "−0.9." At this time, β=1 and the switch 28 is connected to the upper position ("−A," namely, "−1.0"). Therefore, the comparator 33 outputs 0 and the comparator 34 also outputs "0." Resultantly, the EOR 36 outputs "1." The EOR 35 outputs "0," outputting no update instruction. Thus, the switch 29 is connected to the L position (side of the address counter 40) and the switch 37 is connected to the L position (zero level). Therefore, the LSB of the input data Di of the RAM 41 is "0."

Since the comparator 34 outputs "0," the MSB of the input data to the RAM 41 is "0." Therefore, "00" is written into address 3 of the RAM 41. Since no update instruction is output at this time, the values of and Yp remain unchanged. The value of the address counter 40 is counted up to "4" and the process for the input signal at time 3 is completed.

Next, input Yk at time 4 is "−0.2" and Yp is the same value as at time 3, "1.0." The value of the pointer register 39, p, is "2." Thus, the value of "Yk–Yp" output by the adder 30 is "−1.2." At this time, β=1 and the switch 28 is connected to the upper position ("−A," namely, "−1.0" ). Therefore, the comparator 33 outputs "1" and the comparator 34 outputs "0." Thus, the EOR 36 outputs "1." The EOR 35 outputs "1," outputting an update instruction. Thus, the switch 29 is connected to the H position (side of the pointer register 39) and the switch 37 is connected to the H position (side of the EOR 36). The LSB of the input data Di to the RAM 41 is "1." Since the comparator 34 outputs "0," the MSB of the input data Di of the RAM 41 is "0."

Since the value of the pointer register 39, p, is "2," "01" is written into address 2 of the RAM 41. The point to be noted is that the data at time 2 is determined at time 4 as in the example. That is, the detected data at time 2 and before is defined at this point in time 4.

Further, since the comparator 34 outputs "0," the value of β is updated to 0. The value of Yp is changed to "−0.2." Further, the value of the pointer register 39, p, is updated to "4." The value of the address counter 40 is counted up to "5" for executing a process at the next time.

The data written into the RAM 41 is defined as detected data in six times (six clocks), and the data stored in the address order is read from the RAM 41. The 6-clock delay time may be changed from the compromise between the circuit scale and the detected data.

For convenience, let the MSB and LSB of output data Do of the RAM 41 be "Do_MSB" and "Do_LSB" respectively. "Do_MSB" becomes input data to the FF 42 and "Do_LSB" becomes a latch input (trigger signal) to the FF 42. For example, "Do_LSB" at time 2 shown in FIG. 10 is "1" and "Do_MSB " is "0." Thus, "0" is held in the FF 42 and data "0" is output from the FF 42, which becomes the MSB of the quadripartite Viterbi detected result. The LSB of the quadripartite Viterbi detected result becomes "Do_LSB."

Likewise, at time 3, "Do_MSB" is "0" and "Do_LSB" is "0." Thus, the value held in the FF 42 remains "0." Therefore, the final detected result is "MSB=0 and LSB=0."

For example, at time 8, output of the RAM 41, namely, "Do_MSB" is "1" and "Do_LSB" is "0." In this case, since "Do_LSB" is "0," the value held in the FF 42 does not change. Therefore, the MSB of the final detected result is set to "0."

Thus, Zk, quadripartite PR4-ML output, can be provided.

This Zk is used to perform the operation shown in expression (7) for finding the difference signal. The operation is performed by the adder 19 shown in FIG. 1. A time delay of several clocks occurs between the instant when output of the filter 14 is input to the Viterbi detection circuit 160, 170 and the instant when the corresponding detected data is output. In FIG. 1, the delay circuit 18 is provided for adjusting the time. Further, the operation shown in expression (8) is performed in the adder 20 shown in FIG. 1 for finding the error signal. This operation process usually is called (1+D) process.

Next, a configuration example of the error signal pattern detection circuit 21 shown in FIG. 1 will be discussed.

Figure 4:
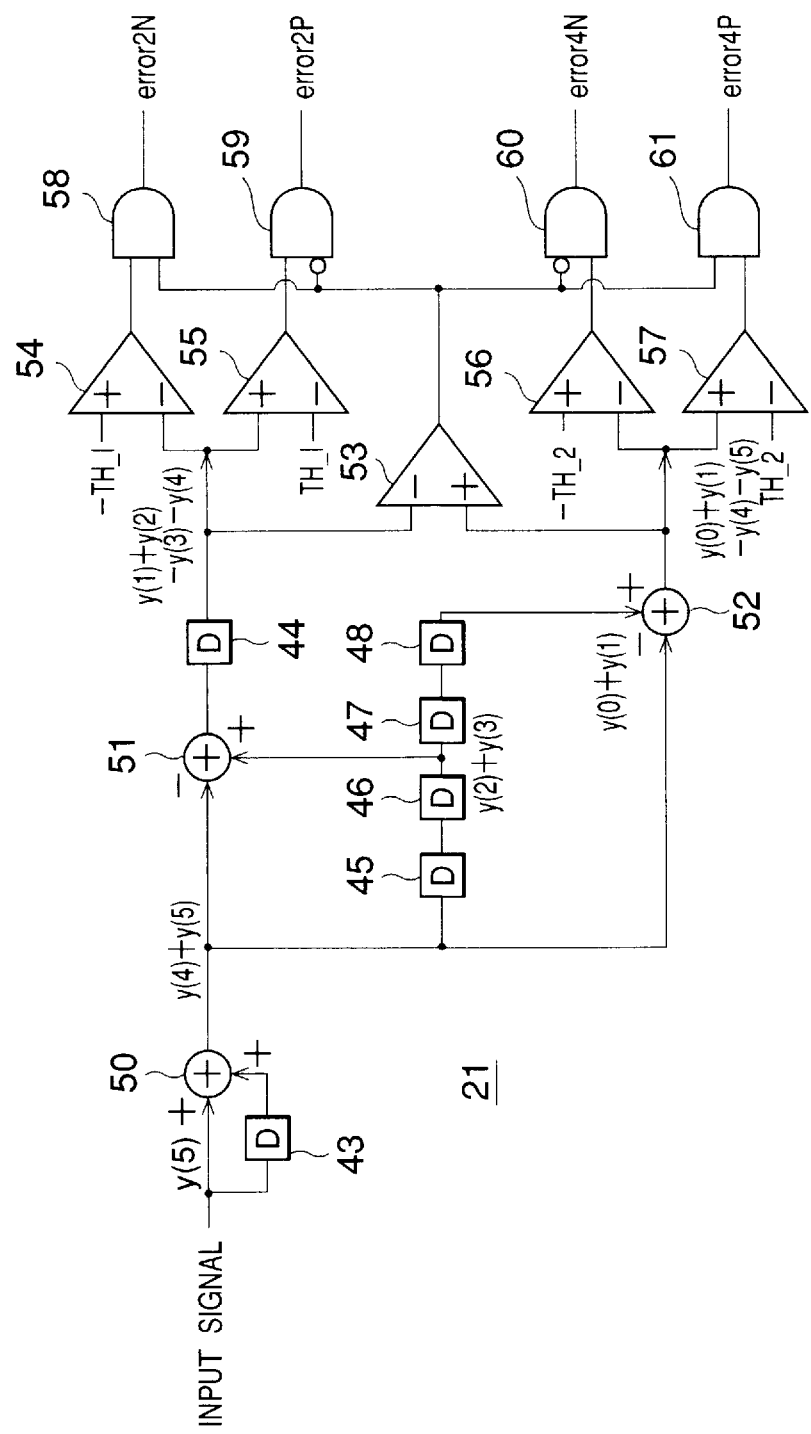
FIG. 4 is a block diagram of an error signal pattern detection circuit according to the first embodiment of the invention.

FIG. 4 is a block diagram of the error signal pattern detection circuit 21 used in the first embodiment, wherein numerals 43, 44, 45, 46, 47, and 48 are 1-clock delay circuits, each of which normally can be made of a D-type flip-flop. Numeral 50 indicates an adder and numerals 51 and 52 indicate subtractors. Numerals 53, 54, 55, 56, and 57 indicate comparators. When the value of positive terminal input (+ side) is greater than the value of negative terminal input (− side), each comparator outputs "1;" otherwise, outputs "0."

Numerals 58, 59, 60, and 61 denote AND gates; the circle of an input terminal means an inversion input. The reference clock for operating the circuit 21 uses the sampling clock used with the analog-to-digital converter 13 in FIG. 1.

The error signal pattern detection circuit 21 performs operations shown in expressions (13), (14), (15), and (16). In the operation description to follow, the input signal to the circuit 21 is assumed to be y(5) where the suffix enclosed in parentheses represents the time.

First, output of the delay circuit 43 is input one clock before, namely, is y(4). Then, y(5) and y(4) are input to the adder 50, which then outputs "y(4)+y(5)." Since a 1-clock delay occurs in each of the delay circuits 45 and 46, "y(4)+y(5)" and "y(2)+y(3)" are input to the subtractor 51. Thus, the subtractor 51 outputs "y(2)+y(3)−y(4)−y(5)." This output is delayed by one clock by the delay circuit 44 and becomes "y(1)+y(2)−y(3)−y(4)."

Output of the delay circuit 46 is delayed by one clock by the delay circuit 47 and further one clock by the delay circuit 48, and becomes "y(0)+y(1)." Then, the subtractor 52 outputs "y(0)+y(1) −y(4)−y(5)."

By the way, input of the positive terminal of the comparator 54, "−TH_1," is a threshold value and specifically the value "−2.0" compared using expression (14). Thus, the comparator 54 makes a comparison according to the first inequality of expression (14).

When the inequality is true, the comparator 54 outputs "1."

Input of the negative terminal of the comparator 55, "TH_1," is a threshold value, which is the value "2.0" compared using expression (13). Thus, the comparator 55 makes a comparison according to the first inequality of expression (13). When the inequality is true, the comparator 55 outputs "1."

Input of the positive terminal of the comparator 56, "−TH_2," is a threshold value, which is the value "−2.0" compared using expression (16). Thus, the comparator 56 makes a comparison according to the first inequality of expression (16). When the inequality is true, the comparator 56 outputs 1.

Input of the negative terminal of the comparator 57, "TH_2," is a threshold value, which is the value "2.0" compared using expression (15). Thus,the comparator 57 makes a comparison according to the first inequality of expression (15). When the inequality is true, the comparator 57 outputs "1." The threshold values of "TH_1," "TH_2," etc., may be previously adjusted in accordance with the amplitude of an actual reproduction signal.

By the way, "y(0)+y(1)−y(4)−y(5)" is input to the positive terminal of the comparator 53 and "y(1)+y(2)−y(3)−y(4)" is input to the negative terminal. Thus, the comparator 53 has a function of evaluating the following inequality:

$$y(0)-y(2)+y(3)-y(5)>0.0 \quad (21)$$

When this expression (21) is true, the comparator 53 outputs "1." At this time, the second inequalities of expressions (14) and (15) are true. In contrast, when the comparator 53 outputs "0," the second inequalities of expressions (13) and (16) are true.

The AND gate 59 has a function of ANDing output of the comparator 55 and inversion of output of the comparator 53. Thus, when expression (13) is true, the AND gate 59 outputs "1."

Next, the AND gate 58 has a function of ANDing output of the comparator 54 and output of the comparator 53. Thus, when expression (14) is true, the AND gate 58 outputs 1. Further, the AND gate 61 has a function of ANDing output of the comparator 57 and output of the comparator 53. Thus, when expression (15) is true, the AND gate 61 outputs "1." Further, the AND gate 60 has a function of ANDing output of the comparator 56 and inversion of output of the comparator 53. Thus, when expression (16) is true, the AND gate 60 outputs "1." For convenience, the output signal of the AND gate 58 is called "error2N," that of the AND gate 59 is called "error2P," that of the AND gate 60 is called "error4N," and that of the AND gate 61 is called "error4P."

As described above, the error signal pattern detection circuit 21 shown in FIG. 4 can detect the four error signal patterns of "error2N," "error2P," "error4N," and "error4P" shown in FIGS. 8A–8D.

Next, a configuration example of the bit pattern detection circuit 24 will be discussed.

Figure 5:
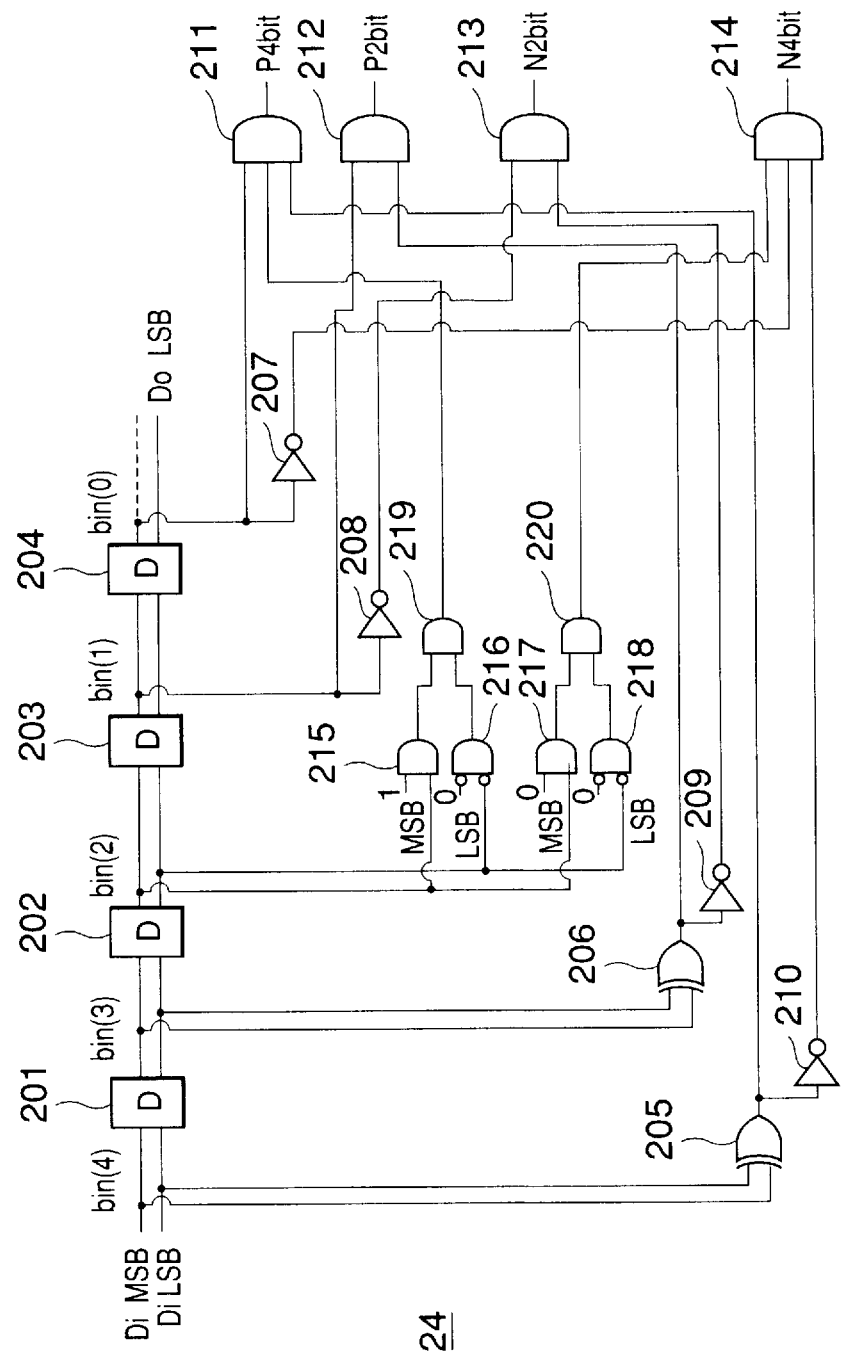
FIG. 5 is a block diagram of a bit pattern detection circuit according to the first embodiment of the invention.

FIG. 5 is a block diagram of the bit pattern detection circuit 24 according to the first embodiment, wherein the input signal is the detected data by the Viterbi detection circuit shown in FIG. 3 and specifically is 2-bit binary data. Numerals 201, 202, 203, and 204 indicate delay circuits, each of which can be made of a D-type flip-flop, which operates with the same clock as the analog-to-digital converter 13 shown in FIG. 1.

For convenience, input binary data is represented as bin(4), output of the delay circuit 201 as bin(3), output of the delay circuit 202 as bin(2), output of the delay circuit 203 as bin(1), and output of the delay circuit 204 as bin(0). The MSB of each of them is represented as "bin(k)_M" and the LSB as "bin(k)_L." Numerals 205 and 206 indicate exclusive-OR gates.

Numerals 207, 208, 209, and 210 indicate NOT circuits. Numerals 211, 212, 213, 214, 215, 216, 217, 218, 219, and 220 indicate AND gates; circles of input sides of the AND gates 216 to 218 mean inversion inputs.

From the relation between expressions (17)–(20) and Table 1, detection signals can be found by the following logical expressions:

P2bit=bin(1)_M AND (bin(3)_M EOR bin(3)_L) for expression (17);

N2bit=NOT (bin(1)_M) AND (NOT (bin(3)_M EOR bin(3)_L)) for expression (18);

P4bit=bin(0)_M AND (bin(2)_M AND 1) AND (bin(2)_L AND 0) AND (bin(4)_M EOR bin(4)_L)) for expression (19); and N4bit=(NOT bin(0)_M) AND (bin(2)_M AND 0) AND (bin(2)_L AND 0) AND (NOT (bin(4)_M EOR bin(4)_L)) for expression (20)

where NOT, AND, and EOR denote NOT operation, AND operation, and exclusive-OR operation, respectively.

The circuit 24 shown in FIG. 5 performs simply the logical operations by the exclusive-OR gates, the AND gates, the NOT gates, etc., for finding P2bit, N2bit, P4bit, and N4bit. Therefore, the circuit configuration as shown in FIG. 5 can detect P2bit, N2bit, P4bit, and N4bit.

Next, a configuration example of the data correction circuit 25 will be discussed.

Figure 6:
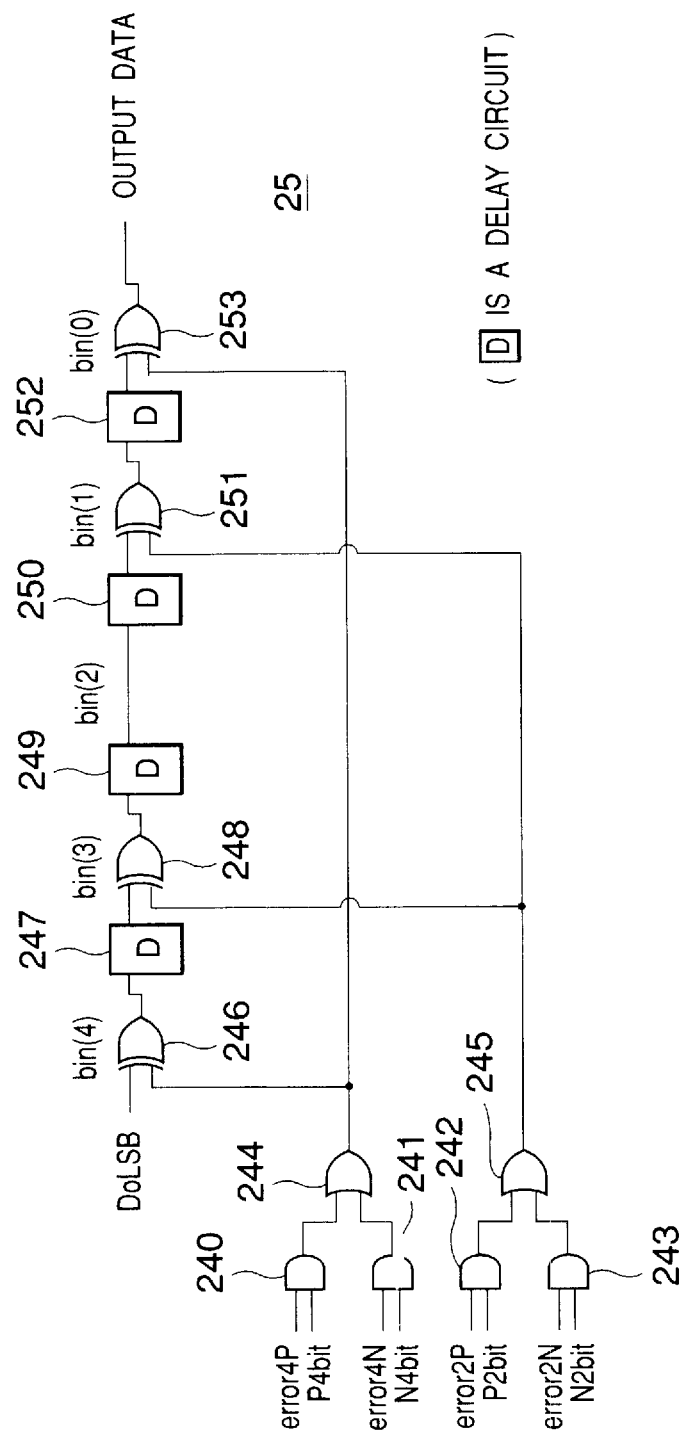
FIG. 6 is a block diagram of a data correction circuit according to the first embodiment of the invention.

FIG. 6 is a block diagram of the data correction circuit 25, wherein numerals 240, 241, 242, and 243 indicate AND gates, numerals 244 and 245 indicate OR gates, and numerals 246, 248, 251, and 253 indicate exclusive-OR gates. Numerals 247, 249, 250, and 252 indicate delay circuits, each of which is made of a D-type flip-flop, which operates with the same clock as the analog-to-digital converter 13, as before.

Input signals of the circuit 25 are the LSB of PR4-ML detected result bin(k) output by the bit pattern detection circuit 24, "error2P," "error2N," "error4P," and "error4N" output by the error signal pattern detection circuit 21 in FIG. 4, and "P2bit," "N2bit," "P4bit," and "N4bit" output by the bit pattern detection circuit 24.

For convenience, the PR4-ML detected result of input of the data correction circuit 25 is represented as bin(4), output of the delay circuit 247 as bin(3), output of the delay circuit 249 as bin(2), output of the delay circuit 250 as bin(1), and output of the delay circuit 252 as bin(0).

As described above, in the data reproducing method according to the invention, predetermined bit data of PR4-ML output data is corrected from "1" to "0" or from "0" to "1" only when the error signal detection result matches the bit pattern detection result.

The error signal pattern shown in FIG. 8A is "error2P" and its corresponding bit pattern detection signal is "P2bit." The erroneous determination data at the time is bin(1) and bin(3). Since bin(k) is 1-bit binary data, data correction can be made simply by inversion. Thus, when (error2P AND P2bit)=1, bin(1) and bin(3) are inverted. Actual inversion process is executed by exclusive ORing (error2P AND P2bit) and bin(1) or bin(3).

The error signal pattern shown in FIG. 8B is "error2N" and its corresponding bit pattern detection signal is "N2bit." The erroneous determination data at the time is bin(1) and bin(3). Thus, when (error2N AND N2bit)=1, bin(1) and bin(3) are inverted. Actual inversion process is executed by exclusive ORing (error2N AND N2bit) and bin(1) or bin(3).

The error signal pattern shown in FIG. 8C is "error4P" and its corresponding bit pattern detection signal is "P4bit." The erroneous determination data at the time is bin(0) and bin(4). Thus, when (error4P AND P4bit)=1, bin(0) and bin(4) are inverted. Actual inversion process is executed by exclusive ORing (error4P AND P4bit) and bin(0) or bin(4).

The error signal pattern shown in FIG. 8D is "error4N" and its corresponding bit pattern detection signal is "N4bit." The erroneous determination data at the time is bin(0) and bin(4). Thus, when (error4N AND N4bit)=1, bin(0) and bin(4) are inverted. Actual inversion process is executed by exclusive ORing (error4N AND N4bit) and bin(0) or bin(4).

Thus, the data reproducing circuit according to the invention can be provided by using the Viterbi detection circuit of quadripartite output, the error signal pattern detection circuit, the bit pattern detection circuit, etc., in combination.

Next, a second embodiment of the invention will be discussed wherein the error signal pattern detection circuit 21 in the first embodiment is improved for reducing the reproduction data error rate.

For convenience, the left sides of the inequalities used in expressions (13) and (15) are replaced with metrics Ma'(k) and Mc'(k) where the suffix k is the time of the first y of expression (15), which are defined as follows:

$$Ma'(k)=y(k+1)+y(k+2)-y(k+3)-y(k+4) \quad (22)$$

$$Mc'(k)=y(k)+y(k+1)-y(k+4)-y(k+5) \quad (23)$$

By the way, when large noise, etc., occurs, an error signal may be detected successively. However, the probability that a PR4-ML determination error will occur successively is extremely low; if an error signal pattern is detected successively, the possibility of erroneous detection is high. Then, to avoid such erroneous detection, the metrics of expressions (22) and (23) are compared in time sequence, and only when the metric takes the maximum value, the pattern is determined to be a true error signal pattern.

Thus, error signal patterns are detected as follows:

The conditional expression for detecting the error signal pattern shown in FIG. 8A is $$\text{error}2P=(Ma'(k)>Ma'(k+1) \text{ AND } Ma'(k)>Ma'(k-1)) \text{ AND }$$
$$(abs(Ma'(k))>TH\_1) \text{ AND } (abs(Ma'(k))>abs(Mc'(k))) \quad (24)$$

where abs(x) is a symbol meaning the absolute value of x.

Next, the conditional expression for detecting the error signal pattern shown in FIG. 8B is:

$$\text{error}2N=(Ma'(k)<Ma'(k+1) \text{ AND } Ma'(k)<Ma'(k-1)) \text{ AND }$$
$$(abs(Ma'(k))>TH\_1) \text{ AND } (abs(Ma'(k))>abs(Mc'(k))) \quad (25)$$

Further, the conditional expression for detecting the error signal pattern shown in FIG. 8C is:

$$\text{error}4P=(Mc'(k)>Mc'(k+1) \text{ AND } Mc'(k)>Mc'(k-1)) \text{ AND }$$
$$(abs(Mc'(k))>TH\_2) \text{ AND } (abs(Mc'(k))>abs(Ma'(k))) \quad (26)$$

Further, the conditional expression for detecting the error signal pattern shown in FIG. 8D is:

$$\text{error}4N=(Mc'(k)<Mc'(k+1) \text{ AND } Mc'(k)<Mc'(k-1)) \text{ AND }$$
$$(abs(Mc'(k))>TH\_2) \text{ AND } (abs(Mc'(k))>abs(Ma'(k))) \quad (27)$$

TH_1 and TH_2 of expressions (24)–(27) are threshold values, which are the same values as TH_1 and TH_2 in FIG. 4. When the value of the right side of each of expressions (24)–(27) is "1," its corresponding error signal pattern is detected.

Figure 31:
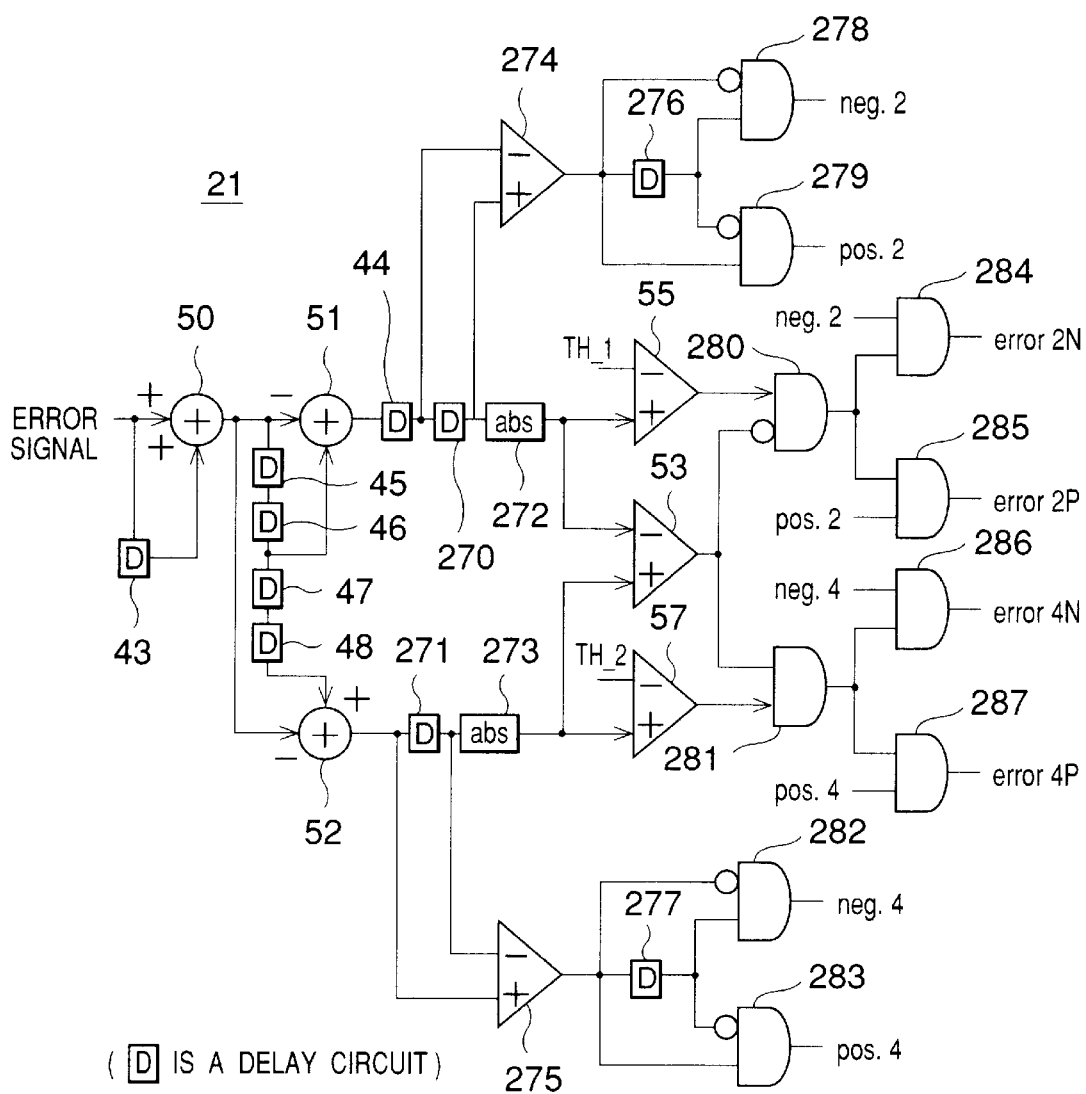
FIG. 31 is a block diagram of an error signal pattern detection circuit according to a second embodiment of the invention.

FIG. 31 is a block diagram of an error signal pattern detection circuit 21 used in the second embodiment.

Adders 50, 51, and 52 are adders having the same function as those in FIG. 4. Delay circuits 43, 44, 45, 46, 47, 48, 270, 271, 276, and 277 are delay circuits having a function of delaying a signal by one clock, each of which is made of a D-type flip-flop. Absolute value circuits 272 and 273 are circuits each for finding the absolute value of input data.

Numerals 53, 55, 57, 274, and 275 denote comparators; when the value of input of the positive terminal of each comparator is greater than the value of input of the negative terminal, the comparator outputs "1."

AND gates 278, 279, 280, 281, 282, 283, 284, 285, 286, and 287 have a function of performing an AND operation; the circle of the input terminal of each AND gate means an inversion input. Output of the AND gate 278 (neg.2) is connected to the input terminal of the AND gate 284. Output of the AND gate 279 (pos.2) is connected to the input terminal of the AND gate 285. Likewise, output of the AND gate 282 (neg.4) is connected to the input terminal of the AND gate 286. Output of the AND gate 283 (pos.4) is connected to the input terminal of the AND gate 287. Outputs from the AND gates 284, 285, 286, and 287 are error signals. Output of the delay circuit 44 in FIG. 31 is the same as output of the delay circuit 44 shown in FIG. 4. It corresponds to the metric Ma'(k) shown in expression (22).

Output of the adder 52 shown in FIG. 31 is the same as output of the adder 52 shown in FIG. 4. It is the metric Mc'(k) shown in expression (23). For convenience, output of the delay circuit 44 is represented as Ma'(k+1) and output of the delay circuit 270 is represented as Ma'(k). Likewise, output of the adder 52 is represented as Mc'(k+1) and output of the delay circuit 271 is represented as Mc'(k).

Ma'(k) becomes an input signal of the positive terminal of the comparator 274 and Ma'(k+1) becomes an input signal of the negative terminal. Therefore, if Ma'(k) is greater than Ma'(k+1), the comparator 274 outputs "1;" if Ma'(k) is less than Ma'(k+1), the comparator 274 outputs "0."

When Ma'(k−1) is compared with Ma'(k), if Ma'(k) is less than Ma'(k−1), the delay circuit 276 outputs "1;" if Ma'(k) is greater than Ma'(k−1), the delay circuit 276 outputs "0."

The comparator 274 outputs "1" and the delay circuit 276 outputs "0" when (Ma'(k)>Ma'(k+1) AND Ma'(k)>Ma'(k−1)), namely, when Ma'(k)

takes the maximum value. At this time, the AND gate 279 outputs 1. This corresponds to the first term of the right side of expression (24).

The comparator 274 outputs "0" and the delay circuit 276 outputs 1 when (Ma'(k)<Ma'(k+1) AND Ma'(k)<Ma'(k−1)), namely, when Ma'(k)

takes the minimum value. At this time, the AND gate 278 outputs "1." This corresponds to the first term of the right side of expression (25).

Likewise, Mc'(k) is input of the positive terminal of the comparator 275 and Mc'(k+1) is input of the negative terminal. Therefore, if Mc'(k) is greater than Mc'(k+1), the comparator 275 outputs "1;" if Mc'(k) is less than Mc'(k+1), the comparator 275 outputs "0."

When Mc'(k−1) is compared with Mc'(k), if Mc'(k) is less than Mc'(k−1), the delay circuit 277 outputs "1;" if Mc'(k) is greater than Mc'(k−1), the delay circuit 277 outputs "0."

The comparator 275 outputs "1" and the delay circuit 277 outputs "0" when (Mc'(k)>Mc'(k+1) AND Mc'(k)>Mc'(k−1)), namely, when Mc'(k)

takes the maximum value. At this time, the AND gate 283 outputs "1." This corresponds to the first term of the right side of expression (26).

The comparator 275 outputs "0" and the delay circuit 277 outputs "1" when (Mc'(k)<Mc'(k+1) AND Mc'(k)<Mc'(k−1)), namely, when Mc'(k)

takes the minimum value. At this time, the AND gate 282 outputs "1." This corresponds to the first term of the right side of expression (27).

The absolute value circuit 272 finds abs(Ma'(k)) and the absolute value circuit 273 finds abs(Mc'(k)).

When (abs(Ma'(k))>TH_1) is true, the comparator 55 outputs "1;" when not true, the comparator 55 outputs "0." When (abs(Mc'(k))>TH_2) is true, the comparator 57 outputs "1;" when not true, the comparator 57 outputs "0."

Further, when (abs(Mc'(k))>abs(Ma'(k))) is true, the comparator 53 outputs "1;" when not true, the comparator 53 outputs "0."

Thus, when (abs(Ma'(k))>TH_1) AND (abs(Ma'(k))>abs(Mc'(k))) is true, the AND gate 280 outputs "1." This corresponds to the second and third terms of the right sides of expressions (24) and (25).

Likewise, when (abs(Mc'(k))>TH_2) AND (abs(Mc'(k))>abs(Ma'(k))) is true, the AND gate 281 outputs "1." This corresponds to the second and third terms of the right sides of expressions (26) and (27).

The AND gate 285 ANDs output of the AND gate 279 and output of the AND gate 280, and outputs the result, thus evaluates expression (24) after all. If the AND gate 285 outputs "1," "error2P=1."

The AND gate 284 ANDs output of the AND gate 278 and output of the AND gate 280, and outputs the result, thus evaluates expression (25) after all. If the AND gate 284 outputs "1," "error2N=1."

The AND gate 287 ANDs output of the AND gate 283 and output of the AND gate 281, and outputs the result, thus evaluates expression (26) after all. If the AND gate 287 outputs "1," "error4P=1."

The AND gate 286 ANDs output of the AND gate 282 and output of the AND gate 281, and outputs the result, thus evaluates expression (27) after all. If the AND gate 286 outputs "1," "error4N=1."

Since the error signal patterns thus detected are the same as the error signal patterns detected by the circuit 21 shown in FIG. 4, the purpose in the second embodiment can be accomplished by using the same components as in the first embodiment for other components in the second embodiment.

Figure 33:
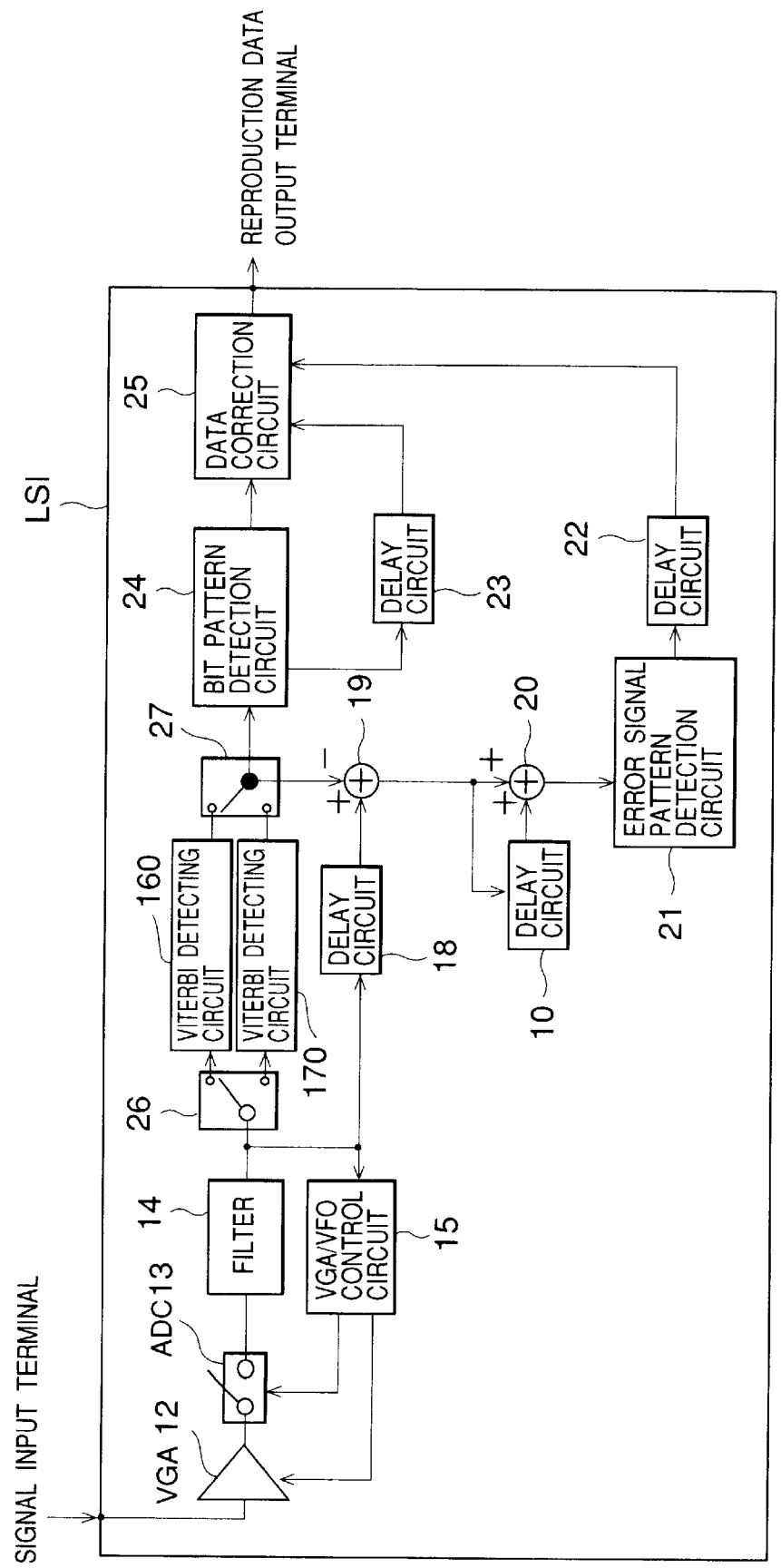
FIG. 33 is a conceptual drawing of LSI circuitry.

By the way, the circuitry according to the first and second embodiments we have discussed can also be integrated and manufactured as semiconductor LSI, as shown in FIG. 33. If a signal input terminal and a reproduction data output terminal are provided and further the components shown in FIG. 33 are formed on a single semiconductor substrate for LSI, even if it is built in various information processing systems, it is convenient to miniaturize the systems. The circuitry is put into semiconductor, thereby also improving mass productivity and moreover reducing costs. Preferably, the circuitry according to embodiments discussed below is put into LSI.

Next, a third embodiment of the invention provided by simplifying the configuration of the first embodiment shown in FIG. 1 will be discussed.

Figure 11:
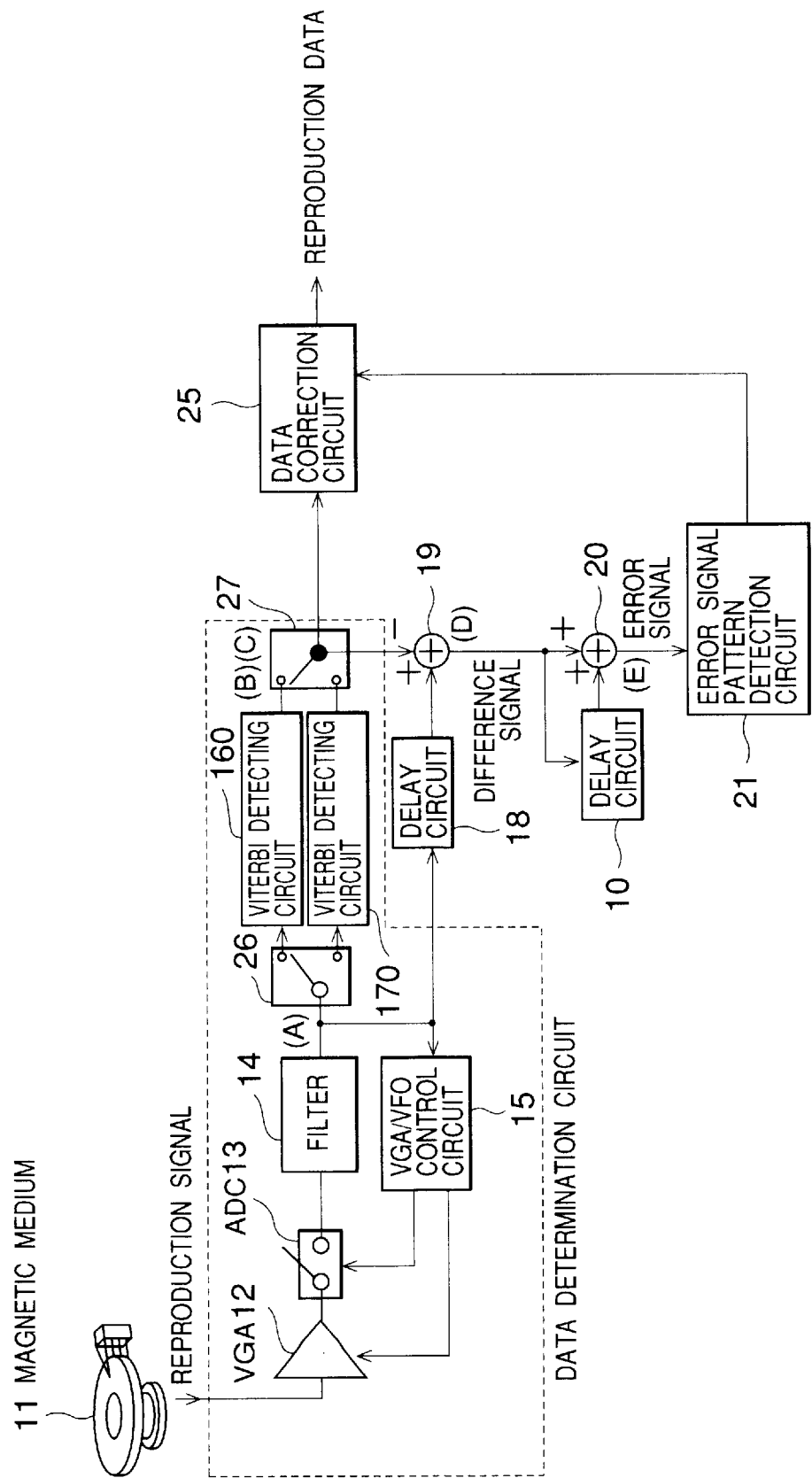
FIG. 11 is a block diagram of a data reproducing circuit according to a third embodiment of the invention.

In the third embodiment shown in FIG. 11, the bit pattern detection circuit 24 in the first embodiment is removed and bit pattern detection for quadripartite output values performed in the first embodiment is not performed, whereby the circuit configuration is simplified and the circuitry is also put into LSI easily although reliability for detecting a determination error lowers. The bit pattern detection executed in the first embodiment is executed for preventing erroneous detection of error signal patterns, and originally can be omitted.

As shown in FIG. 11, when the bit pattern detection circuit 24 is removed, although erroneous detection of an error signal pattern increases and the final error rate raises, the error rate does not much raise. On the other hand, the overall circuit scale can be drastically reduced by removing the bit pattern detection circuit 24.

Figure 12:
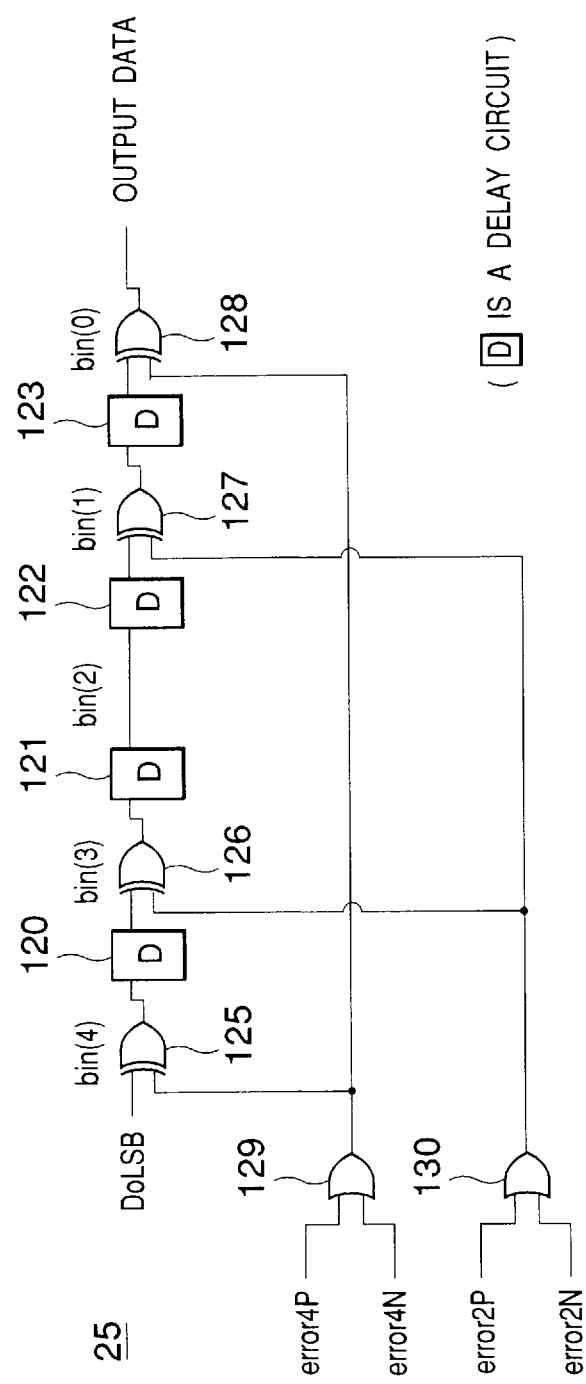
FIG. 12 is a block diagram of a data correction circuit according to the third embodiment of the invention.

In addition, a data correction circuit 25 is changed to a simpler circuit configuration shown in FIG. 12 from the circuit shown in FIG. 6 because bit pattern detection is not executed in the third embodiment.

In FIG. 12, numerals 120, 121, 122, and 123 denote delay circuits for delaying an input signal by one clock, each of which is made of a D-type flip-flop. As seen in the figure, input signal bin(4) is delayed as bin(3), bin(2), bin(1), and bin(0) by the delay circuits.

Numerals 125, 126, 127, and 128 denote exclusive-OR gates and numerals 129 and 130 denote OR gates. The OR gate 129 inputs "error4P" and "error4N" signals, ORs the signals, and outputs the result to the exclusive-OR gates 125 and 128. Likewise, the OR gate 130 inputs "error2P" and "error2N" signals, ORs the signals, and outputs the result to the exclusive-OR gates 126 and 127.

Such a circuit configuration enables a data correction to be made in response to the error signal patterns discussed so far. Bit pattern detection is omitted, thus eliminating the need for the Viterbi detection of quadripartite output described above. However, at least the ternary detected result of "+1, 0, −1" is required to find an error signal pattern. However, if the ternary detected result is divided into two sequences, "+1" and "−1" occur alternately with n (where n is an integer of 0 or more) "0"s between in each sequence. Therefore, data may be recorded so that the first "1" becomes, for example, "+1" in each sequence when data is reproduced.

Next, a fourth embodiment of the invention will be discussed wherein the first embodiment is put into parallel processing for enabling high-speed processing.

In the Viterbi detection of the PR4-ML method, data is divided into two sequences of an even sequence and an odd sequence for data reproduction. Resultantly, parallel processing is performed and data can be reproduced at extremely high speed. In the first embodiment shown in FIG. 1, reproduction signal divided into two sequences in the PR4-ML method is again integrated into one sequence for detecting erroneous determination data. Thus, the system processing speed is not improved unless the processing speed of the circuit for detecting erroneous determination data is improved. Then, an application example in which the detected result is divided into an even sequence and an odd sequence as in the PR4-ML method is shown in FIG. 13 as the fourth embodiment of the invention.

The featuring configuration of the embodiment is provided with first sequence circuitry (for even data) comprising a Viterbi detection circuit 160, a bit pattern detection circuit 64, a data correction circuit 66, and a delay circuit 97 and second sequence circuitry (for odd data) comprising a Viterbi detection circuit 170, a bit pattern detection circuit 65, a data correction circuit 67, and a delay circuit 96. Of course, corresponding to the two sequences, two sequences of circuitry for detecting error signals are also provided. Specifically, delay circuits 101, 102, 98, and 99 and adders 132 and 133 are provided for the two sequences.

Figure 13:
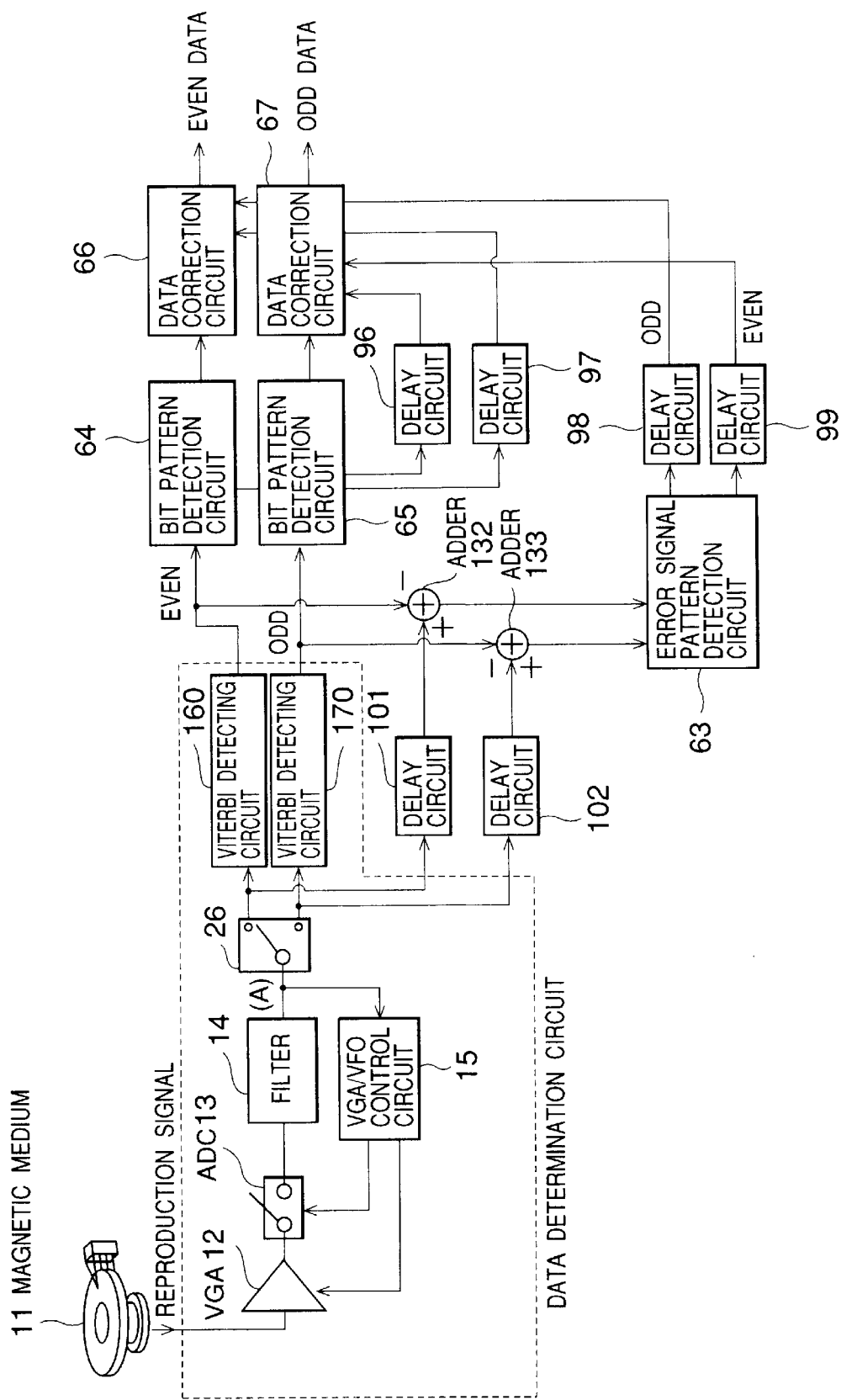
FIG. 13 is a block diagram of a data reproducing circuit according to a fourth embodiment of the invention.

In FIG. 13, the difference signal shown in (D) of FIG. 7 is generated only by finding a difference between filter 14 output and the Viterbi detection circuit 160 or 170, thus detected signal can be divided into the two sequences as it is.

Figure 14:
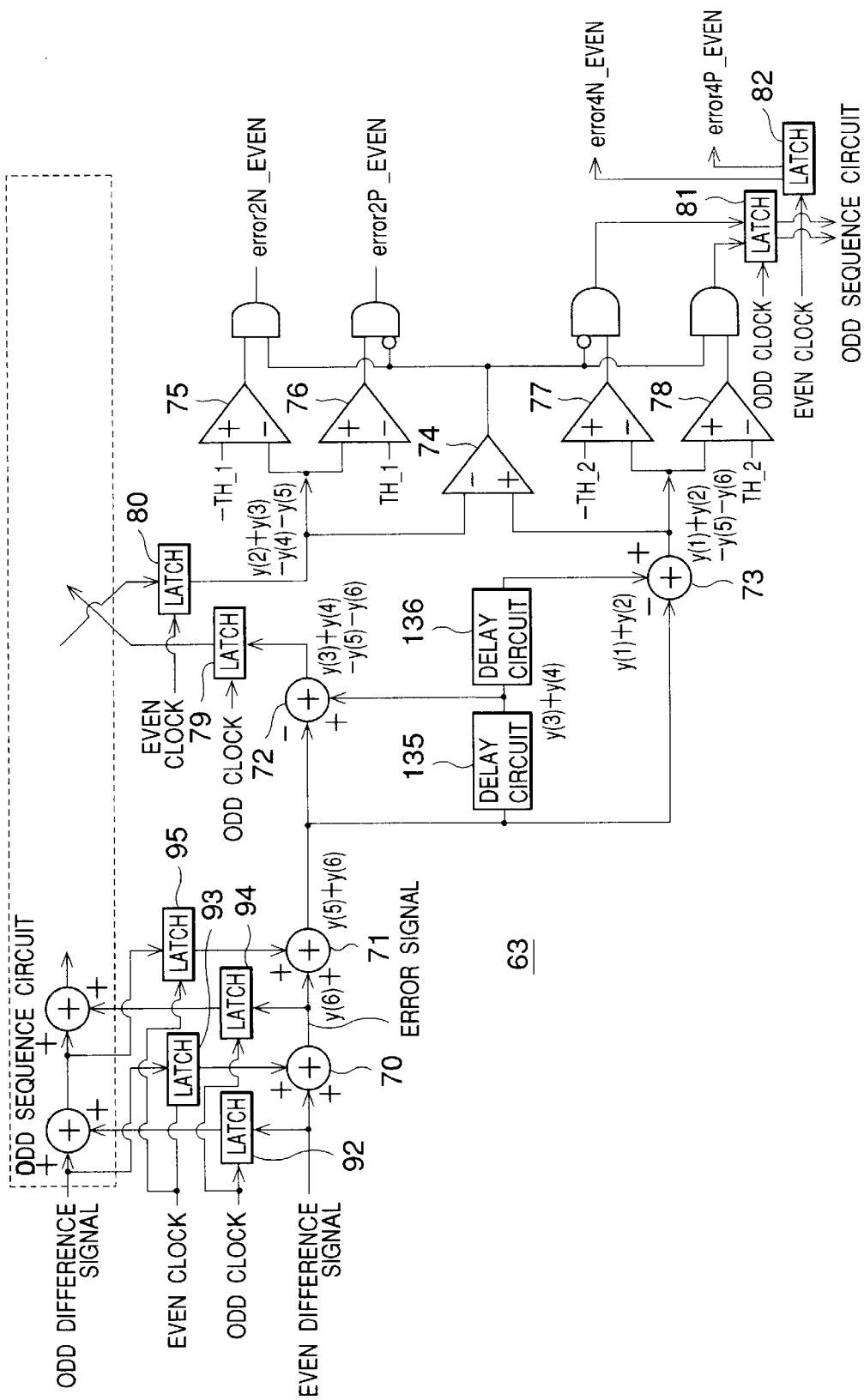
FIG. 14 is a block diagram of an error signal pattern detection circuit according to the fourth embodiment of the invention.

However, since mutual mated sequence signals are required in so-called (1+D) process, an error signal detection process finding an error signal from a difference signal, parallel processing is not readily enabled. Then, an error signal pattern detection circuit 63 for handling parallel processing is shown in FIG. 14, wherein numerals 79, 80, 81, 82, 92, 93, 94, and 95 denote latches, numerals 70 and 71 denote adders, numerals 72 and 73 denote subtractors, and numerals 74, 75, 76, 77, and 78 denote comparators. In addition, four AND gates are placed on the right of the figure, and delay circuits 135 and 136 are provided.

The operation of the error signal pattern detection circuit 63 is only outlined. Odd and even difference signals and even and odd clocks are supplied from the right in the figure. Considering circuit symmetry, only the circuit part for even input is shown in detail in FIG. 14.

Four error signals of "error4P_even," "error4N_even," "error2P_even," and "error2N_even" are provided by the operation of the circuit parts.

The adder 70 performs the (1+D) process finding an error signal from a difference signal. Since the difference signal of one clock before required for the (1+D) process exists in the other sequence (odd sequence), the difference signal in the odd sequence needs to be received.

Then, the difference signal in the odd sequence is once latched into the latch 93 in response to an odd sequence clock (even clock) and output of the latch 93 and an even difference signal are added, then the (1+D) process is executed.

Figure 17:
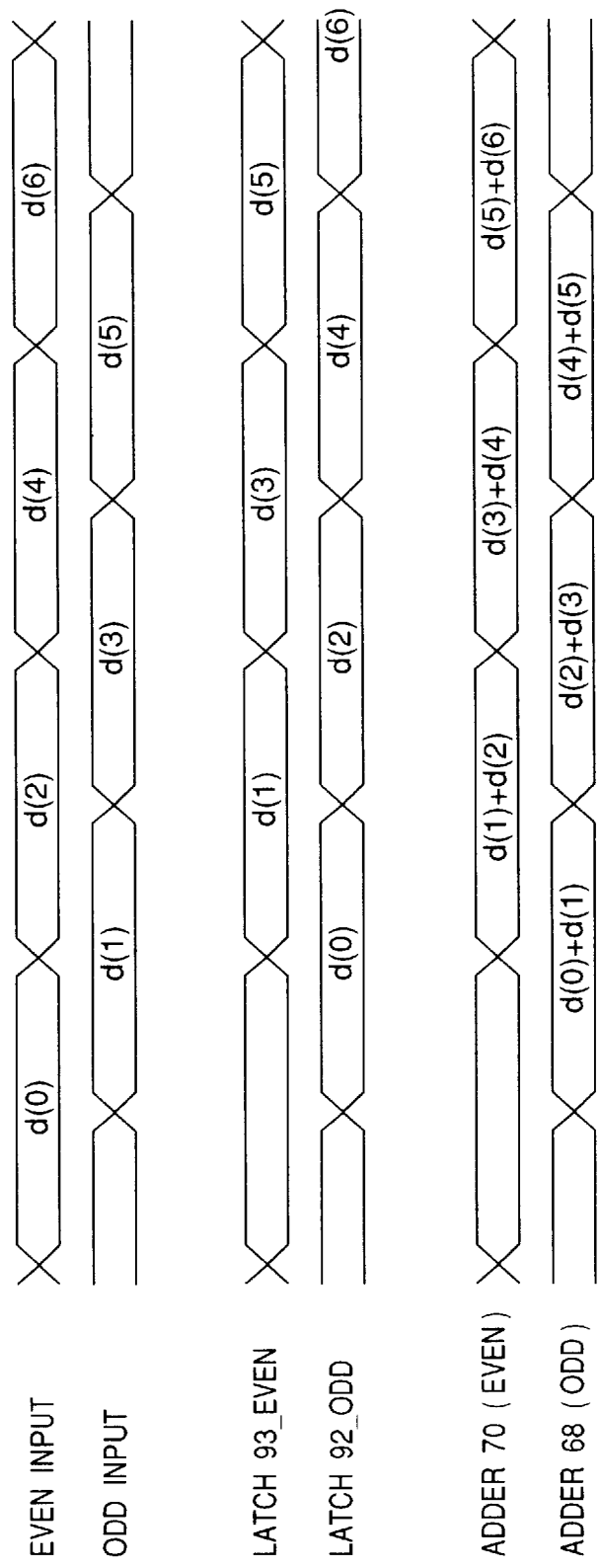
FIG. 17 is an operation timing chart of error signal generation according to the fourth embodiment of the invention.

FIG. 17 is a timing chart example of the error signal generation operation.

In FIG. 17, d(x) of "even input" denotes an even sequence difference signal at each time and the suffix indicates the time. d(x) of "odd input" denotes an odd sequence difference signal at each time and the suffix indicates the time. "Latch93_even" is a value of latching an odd sequence difference signal in response to an even sequence clock. "Adder 70 (even)," which is output of the adder 70 in the even sequence, is an object error signal resulting from adding even input and "latch93_even" at the same time.

Letting the error signal at time k be y(k), y(k) is the sum of d(k) and d(k−1), and output of the adder 70 becomes the error signal at each time. When even input is d(2), output of "latch93_even" is d(1) and their addition result "d(1)+d(2)" is error signal y(2) at time 2. After this, error signals can be found by repeating a similar process.

Figure 18:
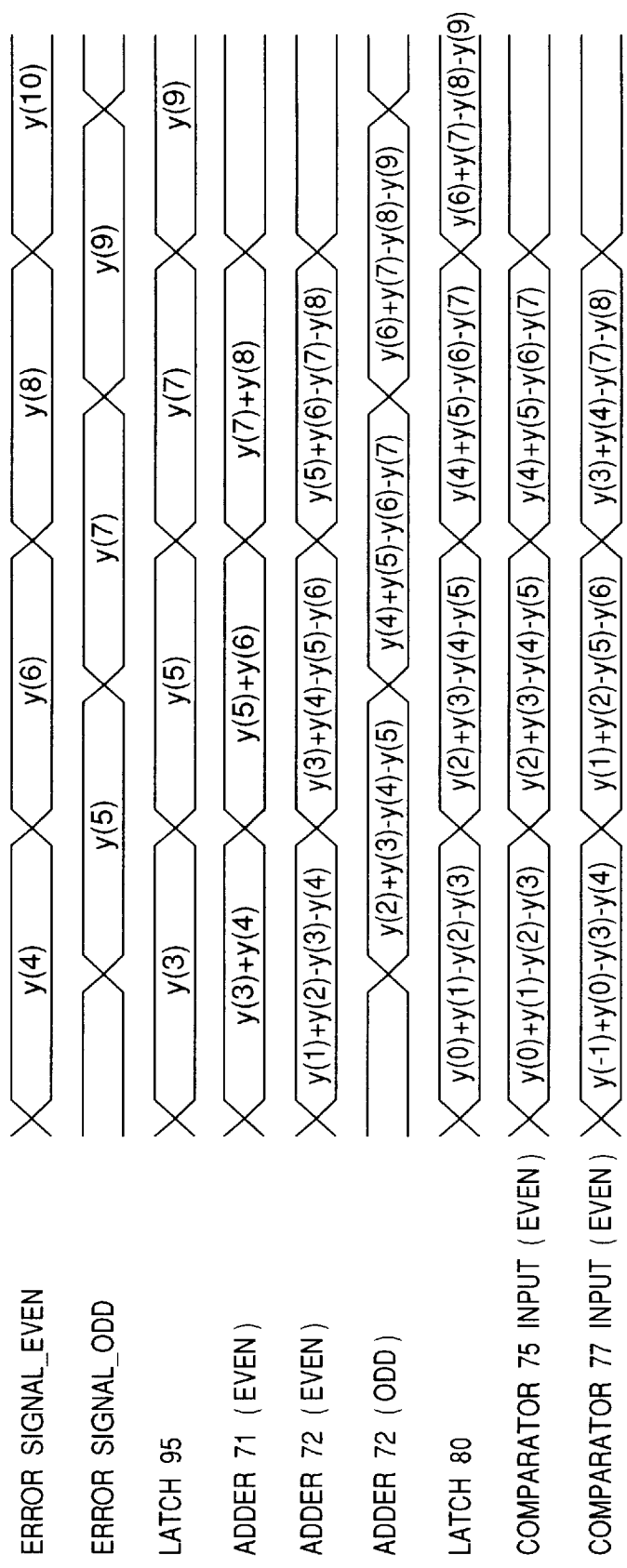
FIG. 18 is an operation timing chart of an error detection circuit according to the fourth embodiment of the invention.

Parallel processing of error signal detection is performed like processing as described above. FIG. 18 is a drive timing chart of the error signal pattern detection circuit shown in FIG. 14.

The signal timings of error signal (even), error signal (odd), value of latch 95, output of adder 71 (even), output of adder 72 (even), output of adder 72 (odd), value of latch 80, input of comparator 75, and input of comparator 77 (even) are shown from top to bottom of FIG. 18.

In FIG. 18, "error signal_even" is output of the adder 70 and is represented as y(k) where the suffix k denotes the time. "Error signal_odd" is latched into the latch 95 in response to an even clock, and the latch 95 outputs a signal in synchronization with "error signal_even" as with the latch 92. At time 6, the adder 71 (even) outputs "y(5)+y(6)." The next output of the adder 71 (even) in the even sequence is "y(7)+y(8)."

The delay circuits 135 and 136 are 1-clock delay circuits for even clocks. When the adder 71 (even) outputs "y(5)+y(6)," the delay circuit 135 outputs "y(3)+y(4)." Further, at this time, the delay circuit 136 outputs "y(1)+y(2)." Thus, the adder 72 (even) outputs the sum of the adder 71 (even) and the delay circuit 135, namely, "y(3)+y(4)−y(5)−y(6)." The output of the adder 72 is latched into the latch 79 in response to an odd clock for use in the error signal pattern detection circuit in the odd sequence. In contrast, the operation result of the adder 72 (odd) is latched into the latch 80 in response to an even clock for use in the error signal pattern detection circuit in the even sequence. When the adder 72 (even) outputs "y(3)+y(4)−y(5)−y(6)," the latch 80 outputs "y(2)+y(3)−y(4)−y(5)" as shown in the timing chart of FIG. 18. At this time, the adder 73 (even) outputs the sum of the delay circuit 136 and the adder 73 (even), namely, "y(1)+y(2)−y(5)−y(6)." When the process is repeated at each time, the timing chart of FIG. 18 is provided.

The threshold values TH_1 and TH_2 for the comparators 75 and 76 and 77 and 78 are the same as those used in the circuit shown in FIG. 4. Paying attention to input signals of the comparators 75 to 78, when "y(2+y(3)−y(4)−y(5)" is input to the comparator 75, 76, "y(1)+y(2)−y(5)−y(6)" is input to the comparators 77 and 78, indicating that the same operation as the circuit in FIG. 4 is performed. Therefore, the error signal pattern detection circuit for enabling parallel processing shown in FIG. 14 has the same function as the error signal pattern detection circuit not performing parallel processing shown in FIG. 4. "Y(1)+y(2)−y(5)−y(6)" is input to the comparators 77 and 78, and the data to be corrected at this time is the detected result corresponding to y(1) and y(5), odd sequence data. Thus, the detection signals of the error signal patterns output by the comparators 77 and 78 (error4P_odd and error4N_odd) are latched into the latch 81 using an odd clock, providing error signal pattern detection output in the odd sequence, In contrast, the signals of error4P_even and error4N_even output in the error signal pattern detection circuit in the odd sequence are latched into the latch 82 using an even clock, providing error signal pattern detection output in the even sequence.

Figure 15:
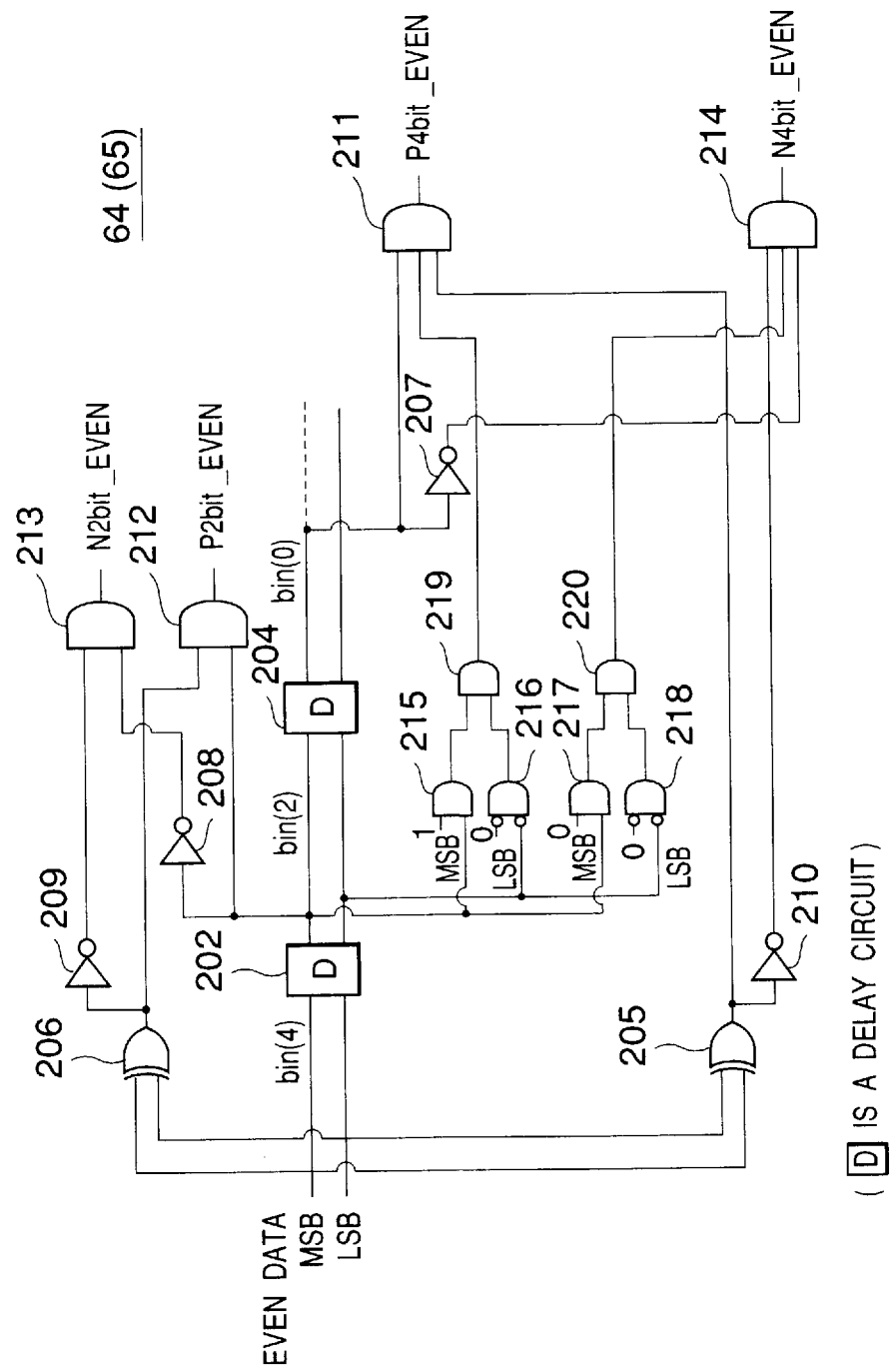
FIG. 15 is a block diagram of a bit pattern detection circuit according to the fourth embodiment of the invention.
Figure 16:
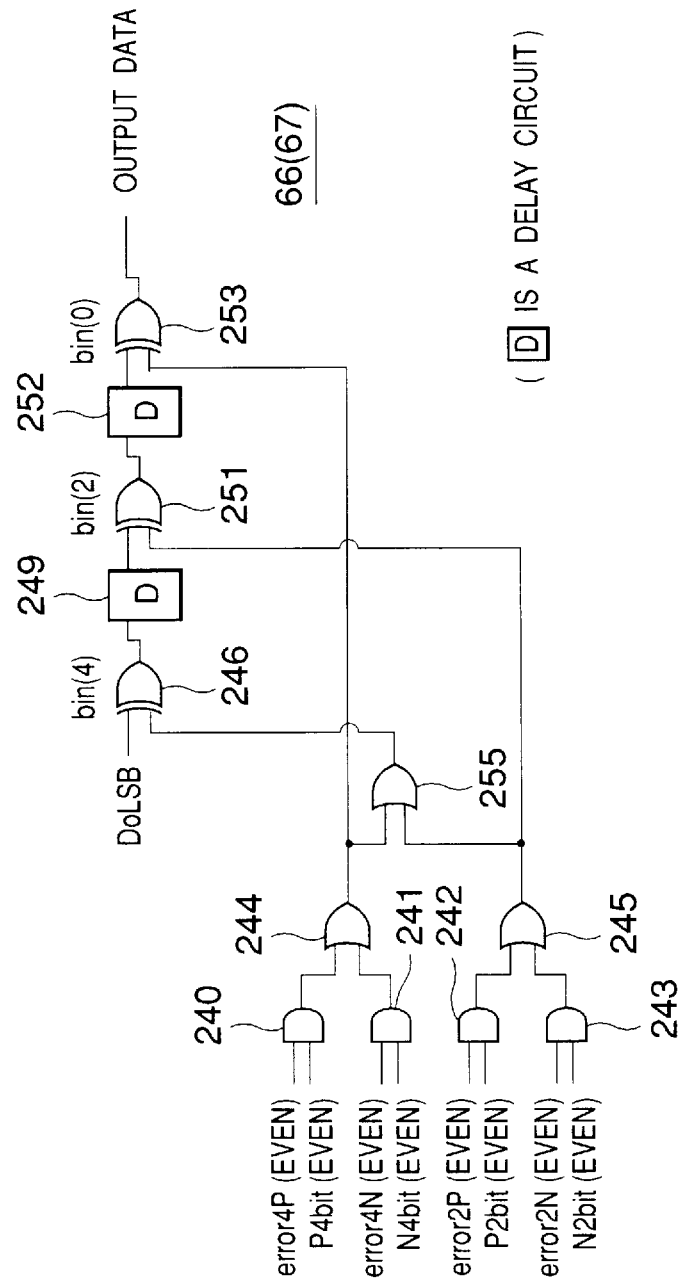
FIG. 16 is a block diagram of a data correction circuit according to the fourth embodiment of the invention.

FIGS. 15 and 16 show configuration examples of the bit pattern detection circuit and the data correction circuit for handling parallel processing. Here, the even sequence, which is the same as the odd sequence in configuration and operation, will be discussed. The basic configurations of the bit pattern detection circuit and the data correction circuit in FIGS. 15 and 16 are the same as those shown in FIGS. 5 and 6; circuit parts identical with those in FIGS. 5 and 6 are denoted by the same reference numerals in FIGS. 15 and 16 and will not be discussed again. The differences between FIGS. 15 and 5 and FIGS. 16 and 6 are that the detected result data string becomes "bin(0), bin(2), bin(4), . . . " because only the even sequence determination result becomes an input signal by performing parallel processing.

Then, the circuit portions using the values of bin(1) and bin(3) in the circuits in FIGS. 5 and 6 are changed so as to use the values of bin(2) and bin(4) in FIGS. 15 and 16. Because except or the mentioned point, the circuit in FIG. 15, 16 has the same function as the in FIG. 5 and 6, detailed operation will not be discussed. Only the realizability of the circuit will be shown.

Figure 19:
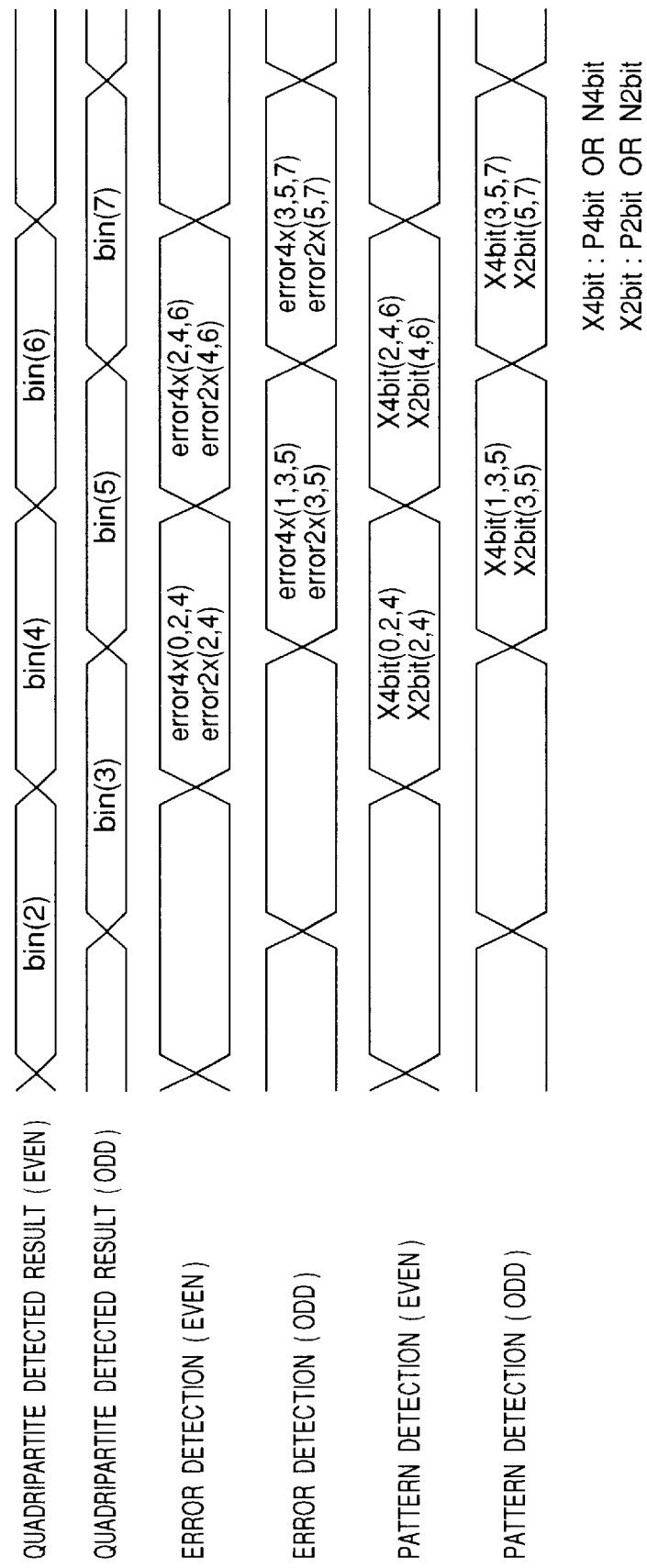
FIG. 19 is an operation timing chart of a data correction circuit according to the fourth embodiment of the invention.

FIG. 19 is a timing chart showing the relationship between output of the error signal pattern detection circuit shown in FIG. 14 and output of the bit pattern detection circuit shown in FIG. 15. However, actual signals are subjected to time adjustment by the delay circuits 96–99, thus are not output at the same time. The signal timings of even and odd quadripartite detected results, even and odd error detection outputs, and even and odd pattern detection outputs are shown from top to bottom of FIG. 19.

"bin(k)" represents the quadripartite Viterbi detected result where the suffix k denotes the time. "error4(j, x, k)" and "error2(j, k)" are output from the error signal pattern detection circuit shown in FIG. 14 where the values of j and k denote the times of detected data to be corrected. "X4bit(j, x, k)" represents output signal P4bit(j, x, k) or N4bit(j, x, k) from the bit pattern detection circuit shown in FIG. 15 where j and k denote the times at which data is to be corrected. Likewise, X2bit(j, k) represents P2bit(j, k) or N2bit(j, k) where j and k denote the times at which data is to be corrected.

The timing chart of FIG. 19 and the operation of the circuit in FIG. 16 will be discussed by taking the even sequence as an example. Assume that error4P(0, 2, 4)=1 is output by the error signal pattern detection circuit (even) and that P4bit(0, 2, 4)=1 is output from the pattern detection circuit (even). Then, both input terminals of the AND gate 240 in FIG. 16 are set to 1. Thus, the AND gate 240 outputs "1." Then, the OR gate 244 outputs "1" regardless of output of the AND gate 241, and the OR gate 255 outputs "1"

regardless of output of the OR gate 245. Then, the exclusive-OR gate 246 outputs the value provided by inverting input "bin(4)." The exclusive-OR gate 253 outputs the value provided by inverting input "bin(0)."

Thus, the PR4-ML detected result is corrected for output as the final detected data.

The overall processing speed of the circuitry can be improved by performing the parallel processing as described above.

Next, a fifth embodiment of the invention will be discussed wherein the entire processing speed is raised by performing pipeline processing. The description made so far indicates that if the operation speed of the PR4-ML erroneous determination detection circuit is made fast, the overall processing speed is improved. To speed up detection of erroneous determination, only the error signal pattern detection circuit needs to be able to operate at high speed. The error signal pattern detection circuit, which does not contain a feedback process, can be operated easily at high speed by pipeline processing.

Figure 20:
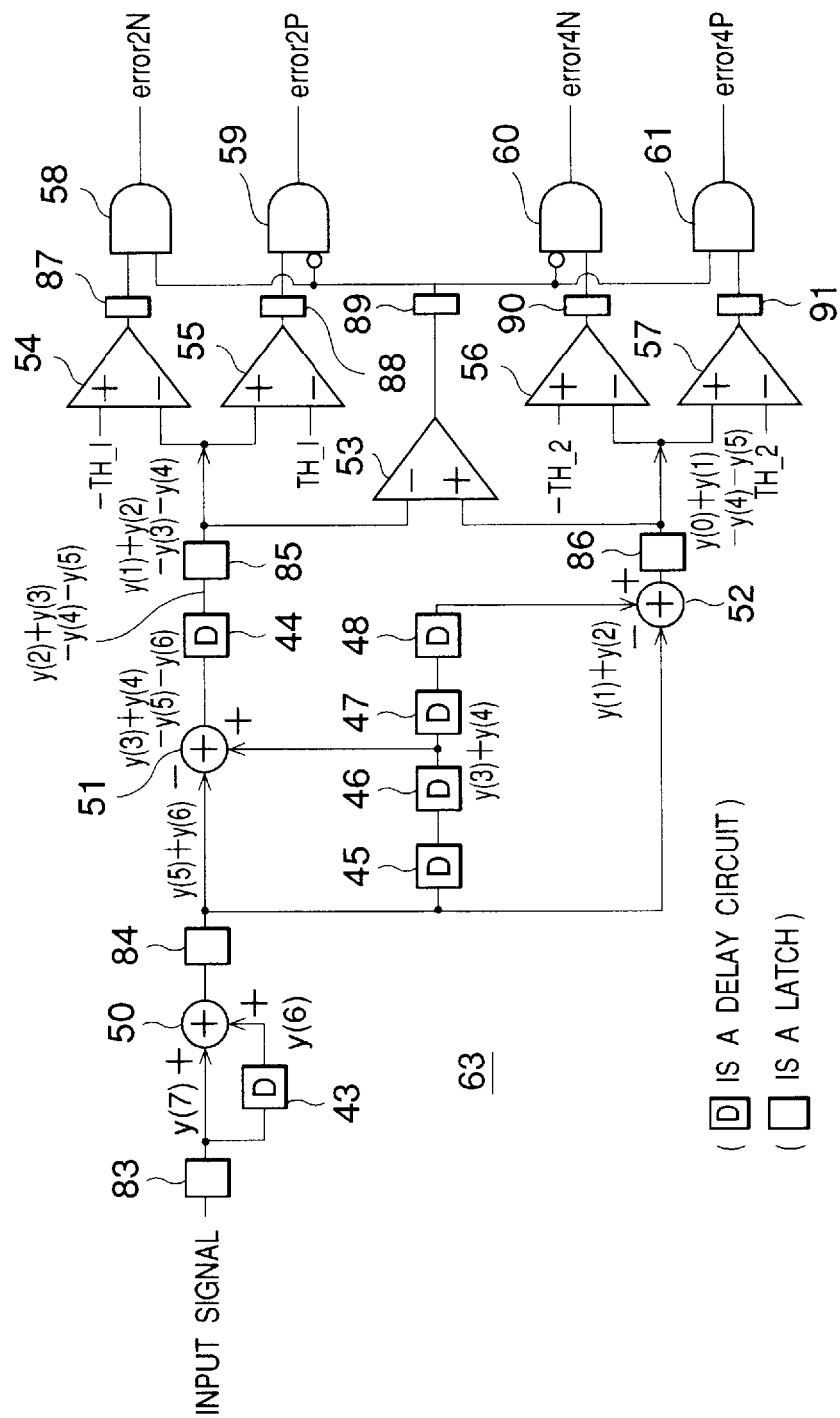
FIG. 20 is a block diagram of an error signal pattern detection circuit according to a fifth embodiment of the invention.

FIG. 20 is a block diagram of a circuit speeded up by putting the error signal pattern detection circuit shown in FIG. 4 into a pipeline. In FIG. 20, latches 83 to 91 are latched added for pipeline processing; an addition or comparison process is executed once or less between the latches. As seen in FIG. 20, it is sufficiently possible to provide a pipelined error signal pattern detection circuit.

The processing part in the adder 30, the comparator 33, and the EOR 35 takes the longest processing time in the Viterbi detection circuit for partial response class 4 shown in FIG. 3. This processing part contains a feedback process and pipeline processing cannot be performed. By the way, since the same two circuits in FIG. 3 are used to perform parallel processing, it corresponds to about one addition process in terms of the processing time of the circuit in FIG. 20 where parallel processing is not performed. Thus, the processing speed of the circuit in FIG. 3 is almost equal to that of the circuit in FIG. 20. Therefore, data can be reproduced at extremely high speed in the fifth embodiment using the error signal pattern detection circuit in FIG. 20.

The operation of the circuit in FIG. 20 is the same as that of the circuit in FIG. 4 except that pipeline processing is performed. The difference between the operation of the circuit in FIG. 20 and that in FIG. 4 will be briefly discussed. In FIG. 20, the input signal is an error signal output by an adder 20. It is temporarily latched into the latch 83. For convenience, output of the latch 83 is represented as "y(7)." Then, a delay circuit 43 outputs "y(6)" and at this time, an adder 50 outputs "y(6)+y(7)." This signal is latched into the latch 84, which then outputs "y(5) +y(6)." Since this value is delayed by two clocks by two delay circuits 45 and 46, the delay circuit 46 outputs "y(3)+y(4)."

Likewise, a delay circuit 48 outputs "y(1)+y(2)." An adder 51 outputs "y(3)+y(4)−y(5)−y(6)." An adder 52 outputs "y(1) +y(2)−y(5) −y(6)." The output of the adder 51 is delayed by two clocks by the delay circuit 44 and the latch 85, which then outputs "y(1)+y(2)−y(3)−y(4)." On the other hand, the output of the adder 52 is delayed by one clock by the latch 86, which then outputs "y(0)+y(1)−y(4) −y(5)." Therefore, input signals to comparators 53, 54, 55, 56, and 57 are the same as those in FIG. 4; it is apparent that the two circuits perform the same processing. Outputs of the comparators 54, 55, 56, and 57 are once latched into the latches 87, 88, 90, and 91 respectively, then output as error signal pattern detection signals via AND gates 58, 59, 60, and 61.

When the error signal pattern detection circuit in FIG. 4 is compared with that in FIG. 20, since pipeline processing is performed in the circuit configuration shown in FIG. 20, the time between the instance when an error signal at one time is input and the instance when its corresponding error signal pattern detection signal is output differs from that in the configuration in FIG. 4. To absorb the time difference, the delay time of the delay circuits 22 and 23 in FIG. 1 must be adjusted when the error signal pattern detection circuit in FIG. 20 is used.

In the description made so far, an error signal generated by performing a (1+D) process for a difference signal is assumed to be EPR4 channel output and an error signal pattern corresponding to a PR4-ML determination error is detected. The (1+D) process is furthermore performed for the error signal and the result can also assumed to be EEPR4 (Extended Extended Partial Response class 4) channel output for detecting an error signal pattern. According to a sixth embodiment of the invention for such a purpose, the case where the recording density is raised more than that in the first embodiment can also be handled.

Figure 22:
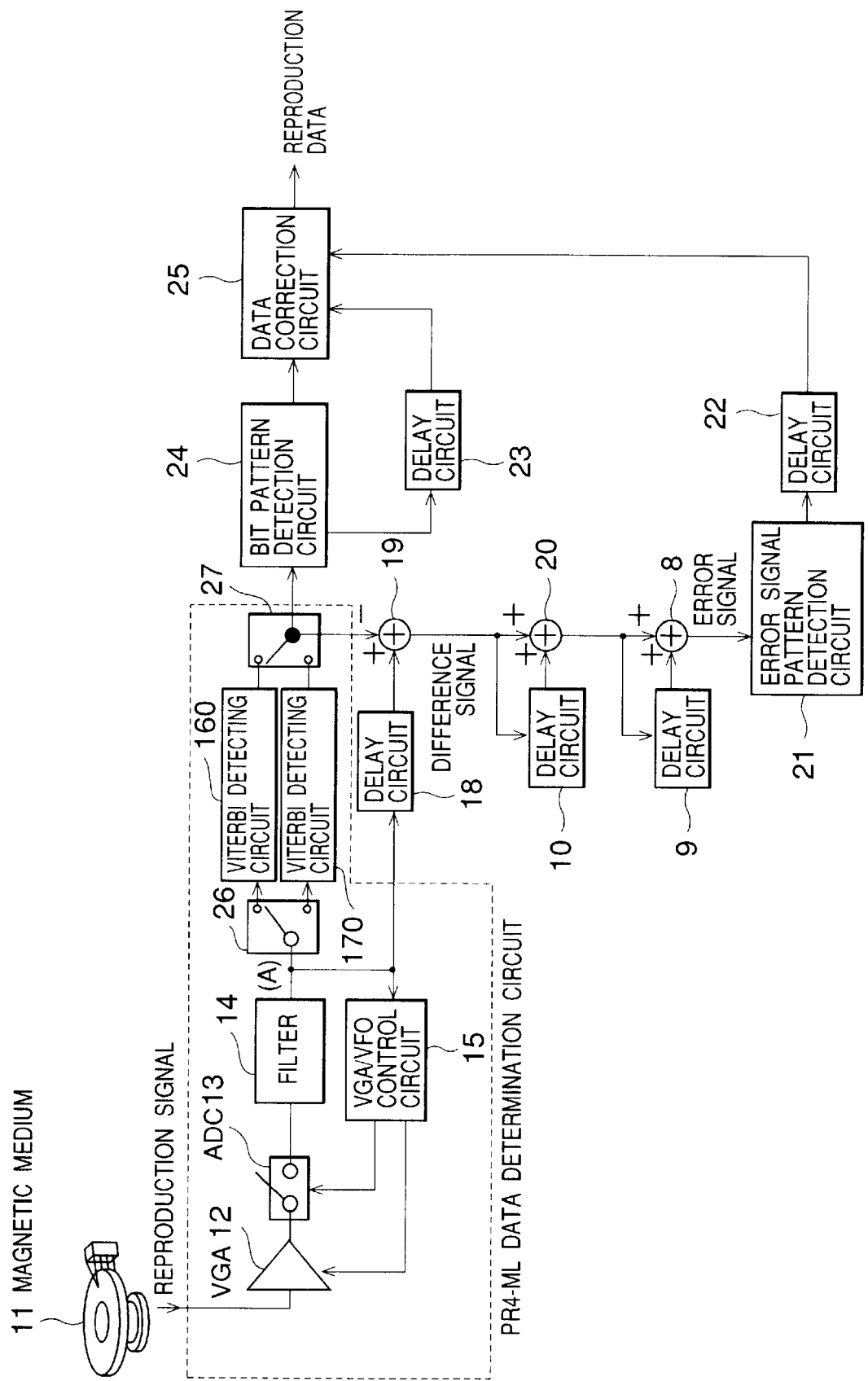
FIG. 22 is a block diagram of a data reproducing circuit according to the sixth embodiment of the invention.

FIG. 22 is a block diagram of a data reproducing circuit according to the sixth embodiment corresponding to FIG. 1 used to describe the first embodiment. FIG. 21 is an illustration showing the relationship between determination errors and error signals in the sixth embodiment corresponding to FIG. 8.

Main components identical with those previously described with reference to FIG. 1 are denoted by the same reference numerals in FIG. 22. The data reproducing circuit shown in FIG. 22 is characterized by the fact that a delay circuit 9 and an adder 8 are newly provided for again executing a (1+D) process to generate an error signal. Therefore, the configuration of an error signal pattern detection circuit 21 differs from the circuit configuration discussed above.

First, metrics Ma, Mb, Mc, and Md for the error signals in FIGS. 21A–21D and metric M0 when no PR4-ML determination error occurs are found according to a similar procedure to that in the first embodiment as follows:

$$Ma = y(0)^2 + (y(1)-1)^2 + (y(2)-2)^2 + (y(4)+2)^2 + (y(5)+1)^2 + y(6)^2$$

$$Mb = y(0)^2 + (y(1)+1)^2 + (y(2)+2)^2 + (y(4)-2)^2 + (y(5)-1)^2 + y(6)^2,$$

$$Mc = (y(0)-1)^2 + (y(1)-2)^2 + y(2)-1)^2 + (y(4)+1)^2 + (y(5)+2)^2 + (y(6)+1)^2,$$

$$Md = (y(0)+1)^2 + (y(1)+2)^2 + (y(2)+1)^2 + (y(4)-1)^2 + (y(5)-2)^2 + (y(6)-1)^2,$$

$$M0 = y(0)^2 + y(1)^2 + y(2)^2 + y(4)^2 + y(5)^2 + y(6)^2$$

Since the metric is an error representing value, it is determined that the error signal pattern corresponding to the metric of the minimum value among Ma, Mb, Mc, Md, and M0 is an actually observed error signal pattern.

However, since a process for strictly finding the minimum value is complicated, the following simplified conditional expressions are used to detect the error signal patterns in the invention: The conditional expression for detecting the error signal pattern shown in FIG. 21A is as follows:

(Ma<M0) AND (Ma<Mc)

where AND denotes AND operation.

When this inequality is calculated according to the definition of each metric, $$y(1) + 2 \cdot y(2) - 2 \cdot y(4) - y(5) > 5$$

and $$y(0) + y(1) - y(2) + y(4) - y(5) - y(6) < 1 \qquad (28)$$

Likewise, the conditional expression for detecting the error signal pattern shown in FIG. 21B is as follows:

(Mb<M0) AND (Mb<Md)

where AND denotes AND operation.

When this inequality is calculated according to the definition of each metric, $$y(1)+2\cdot y(2)-2\cdot y(4)-y(5)<-5$$

and $$y(0)+y(1)-y(2)+y(4)-y(5)-y(6)>-1 \qquad (29)$$

Likewise, the conditional expression for detecting the error signal pattern shown in FIG. 21C is as follows:

(Mc<M0) AND (Mc<Ma)

where AND denotes AND operation.

When this inequality is calculated according to the definition of each metric, $$y(0)+2\cdot y(1)+y(2)-y(4)-2\cdot y(5)-y(6)>6$$

and $$y(0)+y(1)-y(2)+y(4)-y(5)-y(6)>1 \qquad (30)$$

Likewise, the conditional expression for detecting the error signal pattern shown in FIG. 21D is as follows:

(Md<M0) AND (Md<Mb)

where AND denotes AND operation.

When this inequality is calculated according to the definition of each metric, $$y(0)+2\cdot y(1)+y(2)-y(4)-2\cdot y(5)-y(6)<-6$$

and $$y(0)+y(1)-y(2)+y(4)-y(5)-y(6)<-1 \qquad (31)$$

Expressions (28), (29), (30), and (31) mentioned above are determination expressions for detecting error signal patterns in the sixth embodiment.

Figure 23:
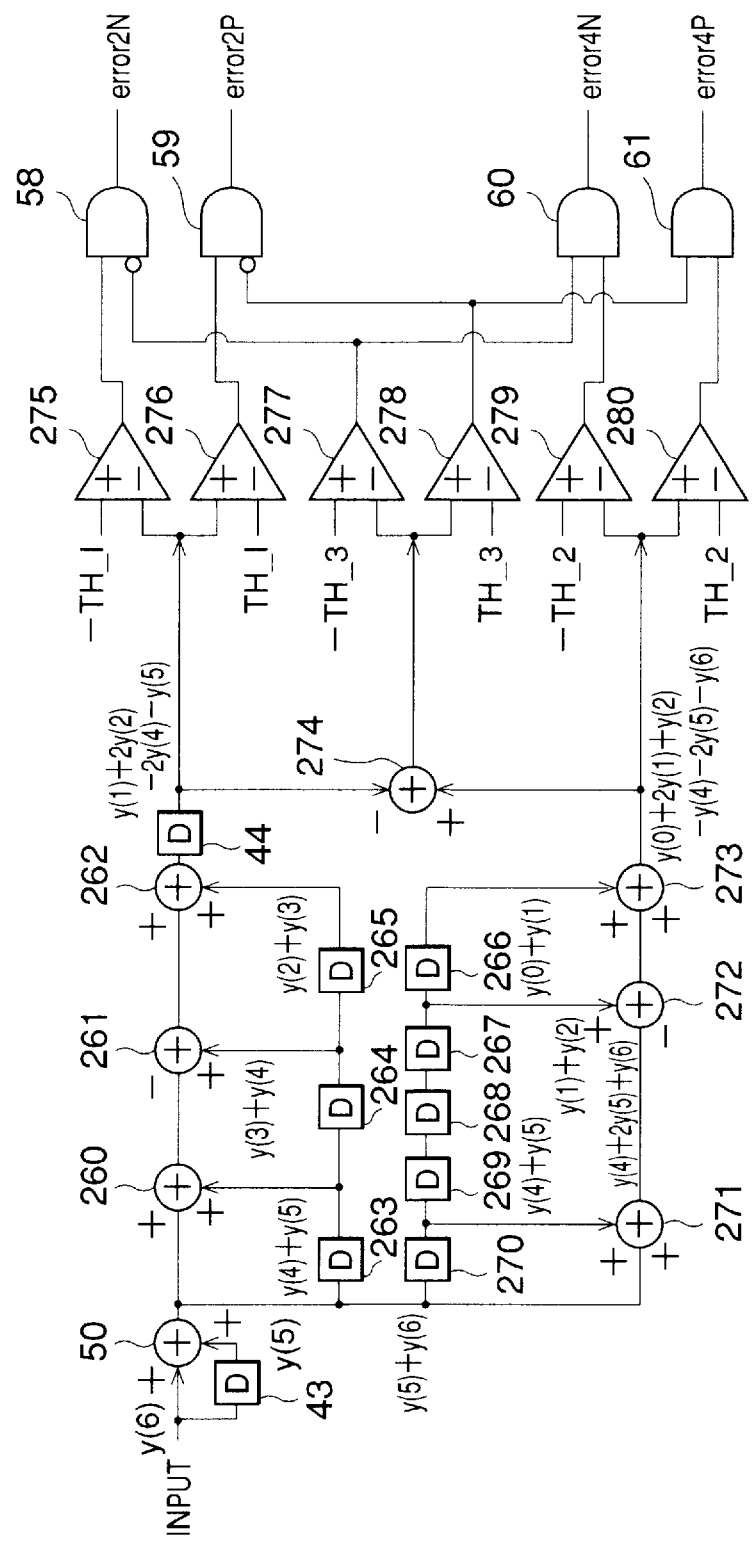
FIG. 23 is a block diagram of an error signal pattern detection circuit according to the sixth embodiment of the invention.

FIG. 23 is a block diagram of the error signal pattern detection circuit 21 for detecting error signal patterns according to the determination expressions. As shown here, the four error signal patterns in the sixth embodiment can be detected. The circuit in FIG. 23 has basically the same configuration as the circuit in FIG. 4. The operation of the error signal pattern detection circuit 21 will be simply discussed with reference to FIG. 23.

First, let an input signal be "y(6)." Since a 1-clock delay occurs in a delay circuit 43, an adder 50 outputs "y(5)+y(6)." After this, the output is delayed by one clock in order by each of delay circuits 263, 264, and 265; the delay circuit 263 outputs "y(4)+y(5)," the delay circuit 264 outputs "y(3)+y(4)," and the delay circuit 265 outputs "y(2)+y(3)." Thus, operations are performed in order by adders 260, 261, and 262; the adder 260 outputs "y(4)+2·y(5)+y(6)," the adder 261 outputs "y(3)–2·y(5) –y(6)," and the adder 262 outputs "y(2)+2·y(3)–2·y(5)–y(6)." This signal is furthermore delayed by one clock by a delay circuit 44 and "y(1)+2·y(2)–2·y(4)–y(5)" is input to comparators 275 and 276.

On the other hand, output of the adder 50 is delayed by one clock by each of delay circuits 270, 269, 268, 267, and 266; an adder 271 outputs "y(4)+2·y(5)+y(6)," an adder 272 outputs "y(1)+y(2)–y(4)–2·y(5)–y(6)," and an adder 273 outputs "y(0) +2·y(1)+y(2)–y(4)–2·y(5)–y(6)." Further, an adder 274 outputs a value resulting from subtracting output of the delay circuit 44 from output of the adder 273, "y(0)+y(1)–y(2)+y(4) –Y(5)–y(6)."

The comparator 275 evaluates the first inequality of expression (29) and the comparator 276 evaluates the first inequality of expression (28). Thus, considering expressions (28) and (29), "TH_1=5."

A comparator 279 evaluates the first inequality of expression (31) and a comparator 280 evaluates the first inequality of expression (30). Thus, considering expressions (30) and (31), "TH_2=6." A comparator 277 evaluates the second inequalities of expressions (29) and (31) and a comparator 278 evaluates the second inequalities of expressions (28) and (30). Thus, "TH_3=1."

If the operations are thus performed in order, the inequalities of expressions (28)–(31) can be evaluated. Of course, the threshold values may be preset in accordance with actual reproduction signals.

A bit pattern detection circuit 24 and a data correction circuit 25 in the sixth embodiment may use the same circuits as in the first embodiment.

Only the four error signal patterns shown in FIGS. 8A–8D are detected by maximum likelihood sequence estimation in the first embodiment already described; determination errors are furthermore reduced and data recorded at higher recording density is handled by also detecting other error signal patterns. For example, a configuration enabling detection of error signal patterns shown in FIGS. 24A and 24B as well as the error signal patterns shown in FIGS. 8A–8D is possible, which will be discussed as a seventh embodiment of the invention.

Figure 24A:
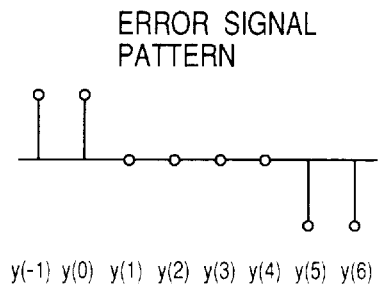
FIGS. 24A and 24B are illustrations showing the relationship between determination errors and error signals according to a seventh embodiment of the invention.
Figure 24B:
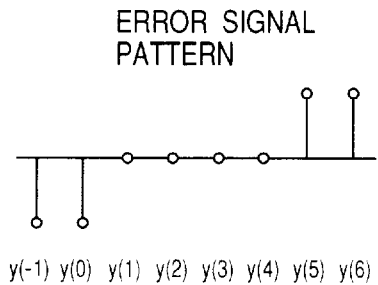

Metrics Me and Mf for error signal patterns in FIGS. 24A and 24B are defined as in the first embodiment:

$$Me=(y(-1)-1)^2+(y(0)-1)^2+y(1)^2+y(2)^2+y(3)^2+y(4)^2+(y(5)+1)^2+(y(6)+1)^2$$

$$Mf=(y(-1)-1)^2+(y(0)+1)^2+y(1)^2+y(2)^2+y(3)^2+y(4)^2+(y(5)-1)^2+(y(6)-1)^2$$

Again, the conditional expression for detecting the error signal pattern in FIG. 8A is shown below:

(Ma<M0) AND (Ma<Mc) AND (Ma<Me)

When the expression is expanded according to the definition of each metric, $$y(1)+y(2)-y(3)-y(4)>2.0$$

$$y(0)-y(2)+y(3)-y(5)<0.0$$

$$y(-1)+y(0)-y(1)-y(2)+y(3)+y(4)-y(5)-y(6)<0.0 \qquad (32)$$

The conditional expression for detecting the error signal pattern in FIG. 8B is shown below:

(Mb<M0) AND (Mb<Md) AND (Mb<Mf)

When the expression is expanded according to the definition of each metric, $$y(1)+y(2)-y(3)-y(4)<-2.0$$

$$y(0)-y(2)+y(3)-y(5)>0.0$$

$$y(-1)+y(0)-y(1)-y(2)+y(3)+y(4)-y(5)-y(6)>0.0 \qquad (33)$$

Further, the conditional expression for detecting the error signal pattern in FIG. 8C is shown below:

(Mc<M0) AND (Mc<Ma) AND (Mc<Me)

When the expression is expanded according to the definition of each metric, $$y(0)+y(1)-y(4)-y(5)>2.0$$

$$y(0)-y(2)+y(3)-y(5)>0.0$$

$$y(-1)-y(1)+y(4)-y(6)<0.0 \tag{34}$$

Further, the conditional expression for detecting the error signal pattern in FIG. 8D is shown below:

(Md<M0) AND (Md<Mb) AND (Md<Mf)

When the expression is expanded according to the definition of each metric, $$y(0)+y(1)-y(4)-y(5)<-2.0$$

$$y(0)-y(2)+y(3)-y(5)<0.0$$

$$y(-1)-y(1)+y(4)-y(6)>0.0 \tag{35}$$

The conditional expression for detecting the error signal pattern in FIG. 24A is shown below:

(Me<M0) AND (Me<Ma) AND (Me<Mc)

When the expression is expanded according to the definition of each metric, $$y(-1)+y(0)-y(5)-y(6)>2.0$$

$$y(-1)+y(0)-y(1)-y(2)+y(3)+y(4)-y(5)-y(6)>0.0$$

$$y(-1)-y(1)+y(4)-y(6)>0.0 \tag{36}$$

The conditional expression for detecting the error signal pattern in FIG. 24B is shown below:

(Mf<M0) AND (Mf<Mb) AND (Mf<Md)

When the expression is expanded according to the definition of each metric, $$y(-1)+y(0)-y(5)-y(6)<-2.0$$

$$y(-1)+y(0)-y(1)-y(2)+y(3)+y(4)-y(5)-y(6)<0.0$$

$$y(-1)-y(1)+y(4)-y(6)<0.0 \tag{37}$$

Figure 25:
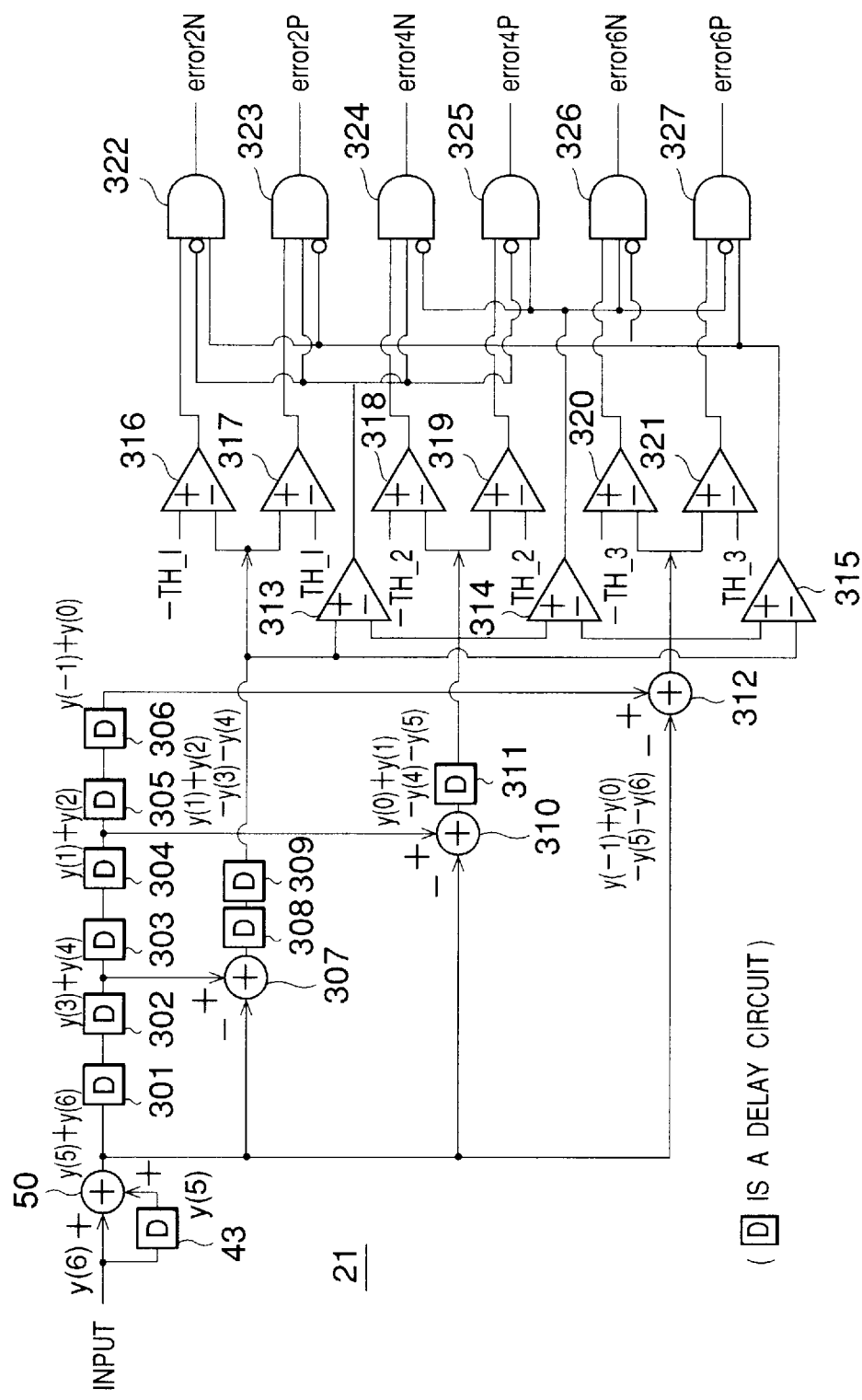
FIG. 25 is a block diagram of an error signal pattern detection circuit according to the seventh embodiment of the invention.

FIG. 25 shows a configuration example of the error signal pattern detection circuit 21 for detecting the error signal patterns as described above.

In FIG. 25, "TH_1" and "TH_2" are the same as "TH_1" and "TH_2" in FIG. 4. "TH_3" is the value of the right side of the first inequality of expression (36), (37); normally, the same value as "TH_1," "TH_2" is set.

The operation of the error signal pattern detection circuit 21 will be briefly discussed with reference to FIG. 25.

In FIG. 25, numerals 43, 301, 302, 303, 304, 305, 306, 308, 309, and 311 are 1-clock delay circuits. Numerals 50, 307, 310, and 312 denote adders. Numerals 313, 314, 315, 316, 317, 318, 319, 320, and 321 denote comparators. Numerals 322, 323, 324, 325, 326, and 327 denote AND circuits.

Although the operation contents performed by the circuit shown in FIG. 25 are complicated, the basic circuit configuration is the same as the circuit configuration shown in FIG. 4.

Now, let an input signal be "y(6)." Output delayed one clock by the delay circuit 43 is added to the input signal by the adder 50, which then outputs "y(5)+y(6)." This signal is delayed by one clock in order by each of the delay circuits 301, 302, 303, 304, 305, and 306; the delay circuit 302 outputs "y(3)+y(4)," the delay circuit 304 outputs "y(1)+y(2)," and the delay circuit 306 outputs "y(-1)+y(0)." A difference between the output of the delay circuit 302 and the output of the adder 50 is found by the adder 307, and is delayed by one clock by each of the delay circuits 308 and 309, the latter of which then outputs "y(1)+y(2) -y(3) -y(4)."

A subtraction operation on the output of the delay circuit 304 and the output of the adder 50 is performed by the adder 310 and the result is delayed by one clock by the delay circuit 311, which then outputs "y(0)+y(1)-y(4)-y(5)." Further, the adder 312 outputs the subtraction result of the output of the delay circuit 306 and the output of the adder 50 as "y(-1)+y(0)-y(5)-y(6)." The operation results are compared with the properly set threshold values TH_1, TH_2, and TH_3 for making an evaluation as to whether or not the inequalities of expressions (32)–(37) are true after all.

The comparator 317 evaluates the first inequality of expression (32) and the comparator 316 evaluates expression (33). The comparator 319 evaluates the first inequality of expression (34) and the comparator 318 evaluates expression (35). The comparator 321 evaluates the first inequality of expression (36) and the comparator 320 evaluates expression (37). Further, the comparator 313 compares the output of the comparator 309 with the output of the delay circuit 311 for evaluating the second inequality of expression (32), (33), (34), (35). The comparator 314 compares the output of the comparator 311 with the output of the adder 312 for evaluating the third inequality of expression (34), (35) and the second inequality of expression (36), (37). The comparator 315 compares the output of the adder 312 with the output of the delay circuit 309 for evaluating the third inequality of expression (32), (33), (36), (37).

The evaluation results of the inequalities are ANDed by the AND circuits 322, 323, 324, 325, 326, and 327, whereby object error detection signals, error2N, error2P, error4N, error4P, error6N, and error6P, can be output.

Figure 26:
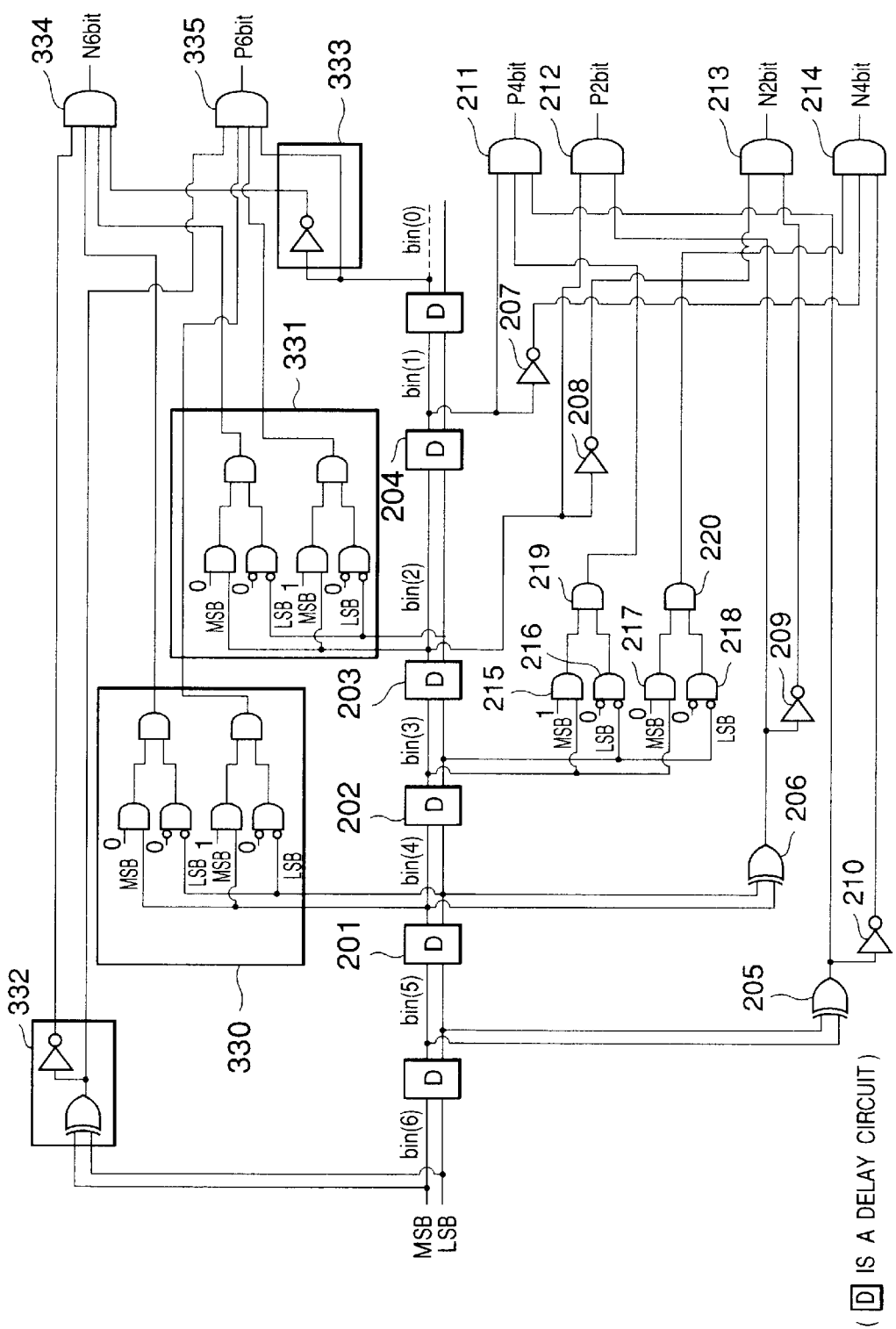
FIG. 26 is a block diagram of a bit pattern detection circuit according to the seventh embodiment of the invention.

FIG. 26 shows a bit pattern detection circuit corresponding to the circuit in FIG. 5 in the first embodiment. The bit pattern detection circuit in FIG. 26 also has the same basic configuration as the circuit in FIG. 5 except that the types of error signal patterns to be detected increase.

The configuration and operation of the bit pattern detection circuit will be simply discussed with reference to FIG. 26.

The difference between the circuits in FIGS. 26 and 5 is that the circuit in FIG. 5 detects only the four bit patterns shown in FIG. 8; whereas the circuit in FIG. 26 detects the two bit patterns shown in FIG. 24 as well as the bit patterns shown in FIGS. 8A–8D. The detection conditions for the two bit patterns shown in FIG. 26 are $P6$bit=(bin(0)=-1 OR bin(0)=-0) AND (bin(2)=-0) AND (bin(4)=-0) AND (bin(6)=+1 OR bin(6)=-0)

$N6$bit=(bin0)=+1 OR bin(0)=+0) AND (bin(2)=+0) AND (bin(4)=+0) AND (bin(6)=-1 OR bin(6)=+0)

The detection operation of other four bit patterns is the same as that of the circuit in FIG. 5; circuit parts identical with those in FIG. 5 are denoted by the same reference numerals in FIG. 26 and will not be discussed again.

A bit detection block (333) corresponding to bin(0) in the P6bit and N6bit detection section is the same as a detection block (207) corresponding to bin(1) of P4bit, N4bit. Likewise, bit detection blocks (330, 331) corresponding to bin(2), bin(4) in the P6bit and N6bit detection section are the same as a detection block (215–220) corresponding to bin(3) of P4bit, N4bit. A bit detection circuit (332) corresponding to bin(6) in the P6bit and N6bit detection section is the same as a detection block (205 and 210) corresponding to bin(5) of P4bit, N4bit.

The detection results of the bits are ANDed by AND circuits 334 and 335, whereby the detection signal of P6bit corresponding to the bit pattern in FIG. 24A and the detection signal of N6bit corresponding to the bit pattern in FIG. 24B can be output.

Figure 27:
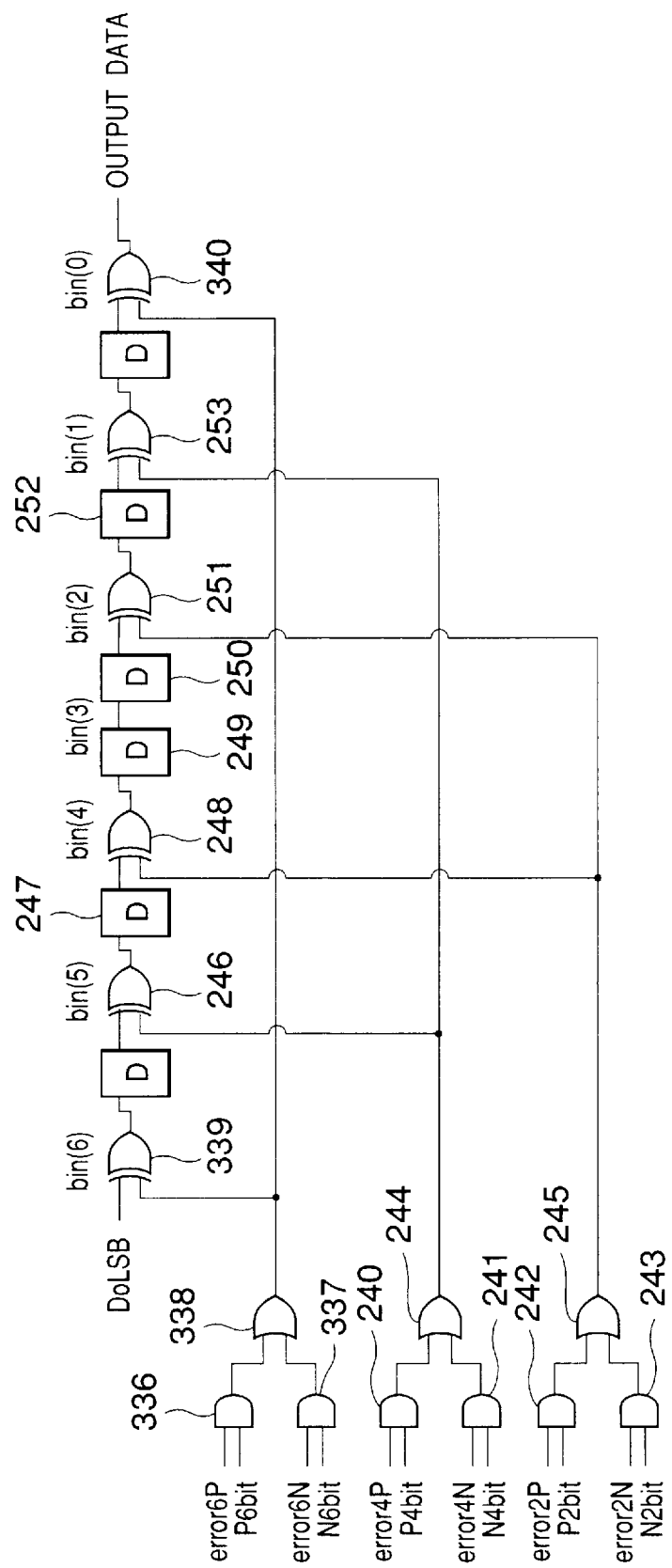
FIG. 27 is a block diagram of a data correction circuit according to the seventh embodiment of the invention.

FIG. 27 shows a data correction circuit corresponding to the circuit in FIG. 6 in the first embodiment.

The data correction circuit in FIG. 27 is also the same as the circuit in FIG. 6 in basic configuration and operation except that the data to be corrected increases.

The configuration and operation of the error correction circuit will be simply discussed with reference to FIG. 27; circuit parts identical with those in FIG. 6 are denoted by the same reference numerals in FIG. 27 and will not be discussed again.

The difference between the circuits in FIGS. 6 and 27 is that the circuit in FIG. 6 corrects only the data corresponding to the error signals of error2P, error2N, error4P, and error4N; whereas the circuit in FIG. 27 corrects the data corresponding to error6P and error6N in addition to the data. Thus, the data correction circuit section corresponding to the error signals of error2P, error2N, error4P, and error4N is the same as the circuit in FIG. 6. Only the feature of the operation of the data correction circuit in FIG. 27 will be briefly described:

To correct the data corresponding to the error pattern in FIG. 24A, when the AND circuit 336 detects both the corresponding error detection signal (error6P) and bit pattern detection signal (P6bit) being 1, the corresponding data is inverted by EOR 339 and 340. Likewise, to correct the data corresponding to the error pattern in FIG. 24B, when the AND circuit 337 detects both the corresponding error detection signal (error6N) and bit pattern detection signal (N6bit) being 1, the corresponding data is inverted by EOR 339 and 340.

Thus, in the invention, the error detection pattern types can be increased like Turbo-PRM or more.

The types of detected error signal patterns are increased as in the seventh embodiment, whereby final determination errors can be reduced and data recorded at higher recording density can be handled.

The basic configuration of the data reproducing circuit in the sixth embodiment is the same as that in the seventh embodiment; high-speed processing comparable to PR4-ML can also be executed by performing parallel processing and pipeline processing as in the fourth and fifth embodiments.

Of course, the sixth and seventh embodiments can also be used together. Further, in the embodiments, the bit pattern detection circuit can also be removed as in the second embodiment.

Next, an eighth embodiment of the invention provided by simplifying the circuit configuration of the fourth embodiment will be discussed.

In the fourth embodiment, the error signal pattern detection circuit 63 has the slightly complicated configuration for performing parallel processing. Then, in the eighth embodiment, the error signal pattern detection circuit 63 is simplified; in other parts, the circuit configuration of the eighth embodiment is the same as that of the fourth embodiment.

The eighth embodiment is characterized by the fact that the error signal patterns shown in FIGS. 8A–8D are detected at high speed by detecting error signals of one pair like $a_1$ and $a_2$ shown in the figure as a unit. As seen in FIGS. 8A–8D, the error signal pattern can be comparatively easily detected by seeing the error signal output form in pair units (positive to negative or negative to positive; a delay may exist between positive and negative in some cases). The embodiment uses such a point.

First, an error signal pattern detection method of the eighth embodiment will be discussed with reference to FIG. 36. The processing procedures of even and odd sequences are the same; the description will be focused on the processing procedure of the even sequence.

In FIG. 36, each number under the first column denotes the time of an input signal. The signal at an odd time is input to the odd sequence circuit and the signal at an even time is input to the even sequence circuit.

"Zk" under the second or third column is the result of executing a (1+D) process for an input error signal for the odd or even sequence where the suffix k denotes the time. Letting the error signal at time k be Yk, Zk=Yk+Yk−1.

Listed under the fourth column are the maximum values to the time k of Zk in the even sequence shown under the third column; listed under the fifth column are the minimum values to the time k of Zk in the even sequence.

Listed under the sixth column are the results of subtracting the minimum value in the even sequence from the maximum value in the even sequence at the same time k (maximum value in even sequence—minimum value in even sequence), namely, "value under fourth column—value under fifth column." Listed under the seventh column are the results of subtracting the minimum value in the odd sequence from the maximum value in the odd sequence at the same time k (maximum value in odd sequence—minimum value in odd sequence). Further, metrics Ma'(k) and M'(k) defined in expressions (22) and (23) are again defined as Mg(k) and Mh(k).

$$Mg(k)=M'a(k)=(Zk-2-Zk) \tag{38}$$

$$Mh(k)=M'c(k+1)=(Zk-4-Zk) \tag{39}$$

Note that one clock is delayed between Mh and M'c for convenience. The values of Mg(k) and Mh(k) are listed under the eighth and ninth columns of FIG. 36.

As we have discussed, the determination error rate in the PR4-ML method used in the invention is sufficiently low and it is extremely rare that more than one error pattern occurs almost at the same time. If the time range is limited to a certain degree, the possibility that the absolute value of Mg or Mh when an error signal is detected will be the maximum value and that Zk−2 and Zk for Mg(k) and Zk−4 and Zk for Mh(k) will become the maximum or minimum values is extremely high. This is also understood from the fact that the value "2.7306" of "maximum value in even sequence—minimum value in even sequence" under the sixth column at time 12 matches the value "2.7306" of Mg(k) under the eighth column at the same time 12 in the example in FIG. 36.

Then, for example, when the difference between the maximum and minimum values of partial Zk in the range of preceding and following 14 bits or so in total exceeds one threshold value, it is assumed that an error signal is detected. The error bit position is one clock before the time at which the maximum and minimum values of Zk are detected.

In the eighth embodiment, it is difficult to directly compare a value with Zk in the other sequence for further performing parallel processing. Then, the difference between the maximum and minimum values of Zk in the even sequence is found for the even sequence and when the difference value is greater than one threshold value and greater than the difference value between the maximum and minimum values of Zk in the odd sequence, an error signal is assumed to be detected.

To ensure detection of the maximum and minimum values in each sequence, when no values are updated after a lapse of a given time since the maximum or minimum value is updated, the maximum or minimum value is assumed to be true. In the example shown in FIG. 36, the maximum value in the even sequence at time 10 and the minimum value at time 12 are defined, for example, at time 18, and the difference value "2.7306" at the time is compared with the threshold value and the difference value in the other sequence. In this case, the difference value "2.7306" is greater than the threshold value "2.0" corresponding to TH_1 mentioned above and greater than the difference value in the odd sequence "2.3884," it is detected as an error signal.

Further, to distinguish the four error signal patterns shown in FIGS. 8A–8D from each other, the error data interval corresponds to the time interval of the maximum and minimum values of Zk and error signal "pos/neg" ("pos" and "neg" correspond to P and N in FIGS. 8A–8D respectively) corresponds to the maximum and minimum value detection order of Zk. That is, if the maximum and minimum values are detected in order successively for Zk in the even sequence, the error signal pattern in FIG. 8A is applied; if the minimum and maximum values are detected in order successively, the error signal pattern in FIG. 8B is applied; if the maximum and minimum values are detected in order with one data piece between, the error signal pattern in FIG. 8C is applied; and if the minimum and maximum values are detected in order with one data piece between, the error signal pattern in FIG. 8D is applied.

Figure 34:
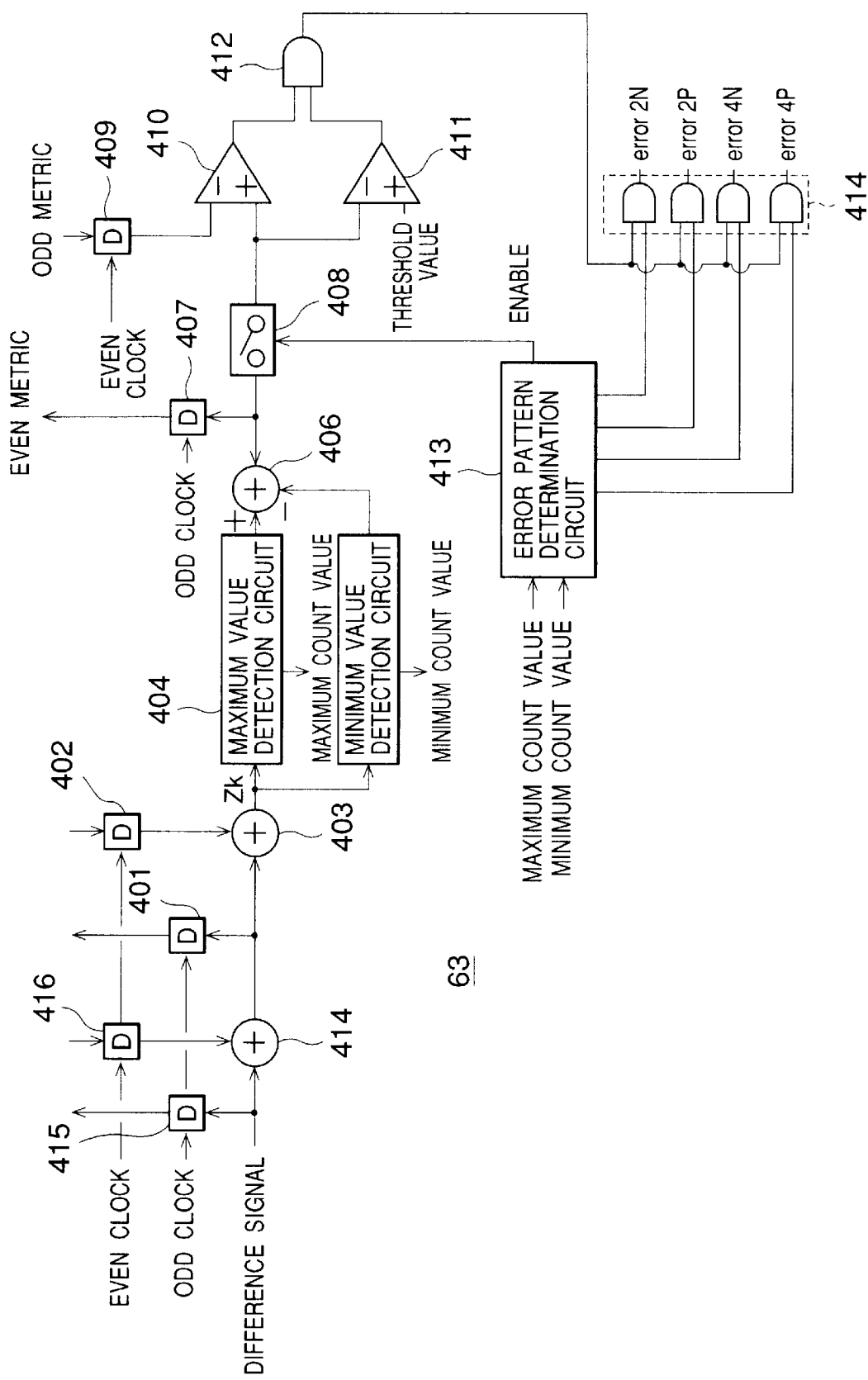
FIG. 34 is a block diagram of an error signal pattern detection circuit according to an eighth embodiment of the invention.

FIG. 34 is a block diagram of the error signal pattern detection circuit for detecting error signal patterns by the method described above. However, the circuit configuration shown here is only one sequence (even sequence) of the parallel processing configuration; in fact, the same circuit is required for the odd sequence.

In FIG. 34, numerals 415, 416, 401, 402, 407, and 409 are latch circuits, each of which has a 1-clock delay function and is represented as "D." Each of the latch circuits 415, 401, and 407 inputs data in response to an odd clock and outputs the value to the odd sequence circuit. Each of the latch circuits 416, 402, and 409 inputs data in response to an even clock and outputs the value to the even sequence circuit. Numerals 414, 403, and 406 are adders. Numeral 408 is a switch. When a control signal from an error pattern determination circuit 413, enable, is on (1), the switch 408 is connected, outputting an output of the adder 406 to comparators 410 and 411.

Each of the comparators 410 and 410 has a function of evaluating the greater-than, equal-to, or less-than relation between the values of two input signals. If the input value to the positive terminal is greater than the input value to the negative terminal, "1" is output; otherwise, "0" is output. Numeral 412 is an AND circuit. Numeral 414 is a circuit block having four AND circuits. Numeral 404 is a circuit for finding the maximum value of input signal Zk and numeral 405 is a circuit for finding the minimum value of input signal Zk. Numeral 413 is the above-mentioned error pattern determination circuit. These three circuits 404, 405, and 413 will be discussed later in detail.

A difference signal input to the error signal pattern detection circuit is subjected to a (1+D) process by the latch 416 and the adder 414, and results in error signal Yk. Further, the error signal Yk is subjected to a (1+D) process by the latch 402 and the adder 403, and results in Zk. The maximum value detection circuit 404 and the minimum value detection circuit 405 finds the local maximum and minimum values for the Zk. The adder 406 finds a difference between the maximum and minimum values. The found difference value is output through the latch 407 to an odd sequence comparator 410 (not shown).

The error pattern determination circuit 413 determines the error pattern type based on the time at which the maximum and minimum values of Zk are found. If the determination result matches any of the four error patterns detected in the invention, the error pattern determination circuit 413 outputs a detection signal of the error pattern and the control signal "enable" for connecting the switch 408. The switch 408 is turned on (connection mode) in response to the enable signal from the error pattern determination circuit 413, allowing the output value of the adder 406 to be input to the comparators 410 and 411. The comparator 410 compares the output of the adder 406 with the difference between the maximum and minimum values provided by the odd sequence circuit. Assuming that the output value of the adder 406 is greater than the difference value, the comparator 410 outputs "1;" otherwise, the comparator 410 outputs "0."

The comparator 411 compares the output value of the adder 406 with a threshold value, which is TH_1 shown in expressions (24)–(27).

If the output value of the adder 406 is greater than the threshold value, the comparator 411 outputs "1." The AND circuit 412 ANDs the outputs of the comparators 410 and 411 and further the AND circuit block 414 ANDs the ANDing result and the output of the error pattern determination circuit 413, outputting the final error signal pattern detection signal error2P, error2N, error4P, or error4N.

Next, the maximum value detection circuit 404 will be discussed with reference to FIG. 35. In the figure, numeral 412 is a counter for incrementing the internal count value by one each time a clock is input.

Numeral 423 is a comparison circuit which outputs "1" when the count value of the counter 421 is seven. This is a process for finding the maximum value of Zk in the range of preceding and following 14 bits; if another new maximum value is not obtained in seven clocks after a new maximum value of Zk is input, this maximum value is cleared and a new maximum value is found.

Numeral 422 is a flip-flop for holding the maximum value of input data Zk. Numeral 424 is an OR circuit. When the OR circuit 424 outputs "0," the flip-flop 422 enters "Hold" mode and holds the value intact. On the other hand, when an OR gate 424 outputs "1," the flip-flop 422 enters "Load" mode for holding the value of input data Zk as a new maximum value.

Numeral 425 is a comparator which compares the value held in the flip-flop 422 with the input data Zk and if the input data Zk is greater than the held value, outputs "1." When the comparator 425 or the comparison 423 outputs "1," the OR circuit 424 outputs "1." This signal is sent to the counter 421 and the flip-flop 422, resetting the counter 421 and placing the flip-flop 422 in the "Load" mode.

Figure 35:
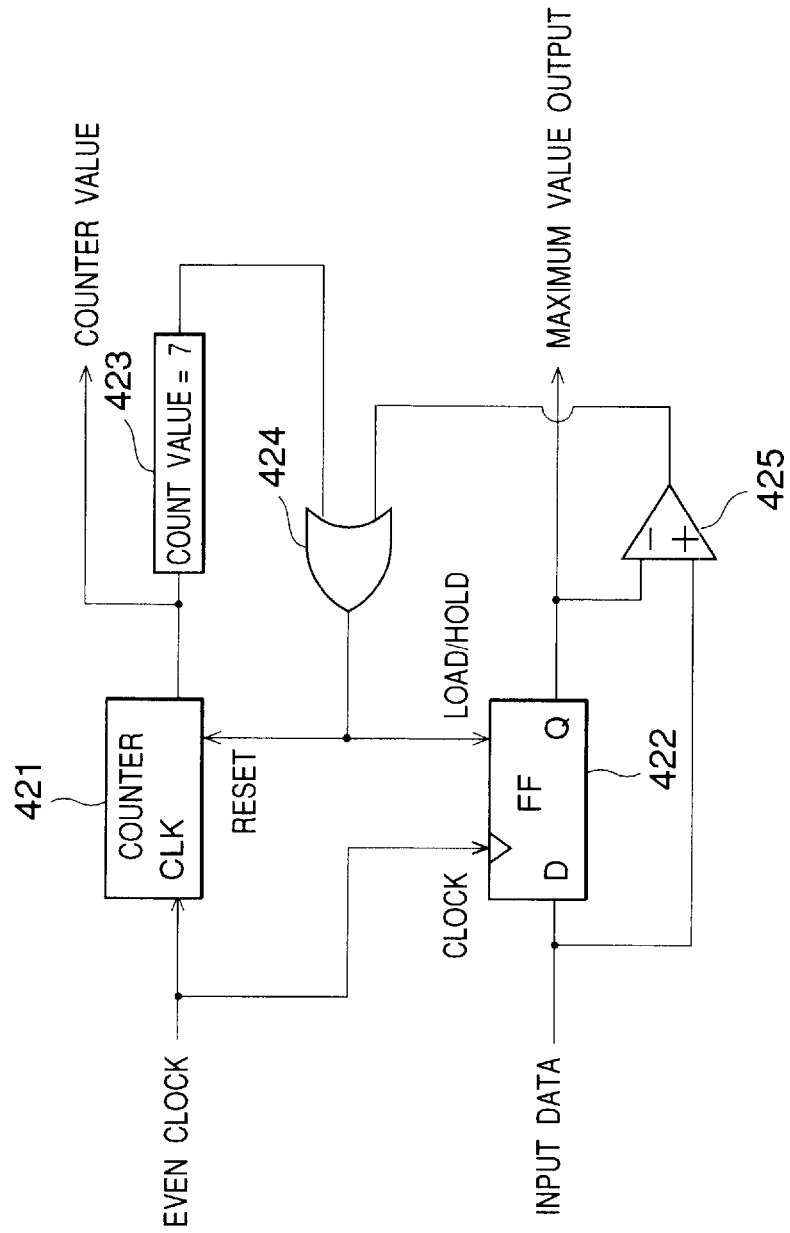
FIG. 35 is a block diagram of a maximum value detection circuit according to the eighth embodiment of the invention.

Although FIG. 35 shows a configuration example of the maximum value detection circuit 404, the minimum value detection circuit 405 can also be made of almost the same circuit configuration as the maximum value detection circuit 404. The difference therebetween is signs of input terminals of comparator 425; the minimum value detection circuit 405 is configured so that output of flip-flop 422 is input to the positive terminal of the comparator 425 and input data Zk is input to the negative terminal and that when the value of input data Zk is less than the value held in the flip-flop 422, the value of the flip-flop 422 is updated.

Next, the operation of the error pattern determination circuit 413 will be discussed with reference to FIG. 37.

This circuit 413 discriminates the four error patterns shown in FIGS. 8A–8D from each other from the time at which the maximum and minimum values of Zk are obtained. The maximum or minimum value detection circuit uses the counter for counting the elapsed time to the present after the maximum or minimum value of Zk is input. When the counter value reaches a value shown in FIG. 37, the maximum or minimum value detection circuit outputs the corresponding error detection signal.

That is, when the count value of the maximum value detection circuit is "4" and that of the minimum value detection circuit is "3," the error signal pattern shown in FIG. 8A is applied and "error2P=1" is output. Likewise, when the count value of the maximum value detection circuit is "3" and that of the minimum value detection circuit is "4," "error2N=1" is output. When the count value of the maximum value detection circuit is "5" and that of the minimum value detection circuit is "3," "error4P=1" is output. When the count value of the maximum value detection circuit is "3" and that of the minimum value detection circuit is "5," "error4N=1" is output.

At the same time, if any of the four error signals is output, the enable signal for the switch 408 is set to "1," turning on the switch 408. If none of the four error signals is output, the enable signal is set to "0" for turning off the switch 408.

The error signal type can be thus determined. The circuit for performing the operation can be easily provided by combining logic devices and can also be extremely easily put into LSI.

The data reproducing method according to the first embodiment of the invention and the conventional data reproducing methods PR4-ML and EPR4-ML are compared with each other with respect to data reproducing performance by computer simulation.

Reproduction waveform s(t) of a magnetic disk drive is approximated as follows:

$$s(t) = \sum_{k=0}^{\infty} Bk \times \{h(t-kT) - h(t-(k+1)T)\} + n(t)$$

Bk: Precode output
T: Data recording period (s/bit)
n(t): white Gaussian noise $$h(t) = \frac{1}{1 + \left(\frac{2t}{k}\right)^2}$$

k: Constant representing recording density (normalized scanning density)

The recording density representing constant k is 2.5 and noise n(t) superposed on the reproduction waveform is approximated with white Gaussian noise.

Figure 32:
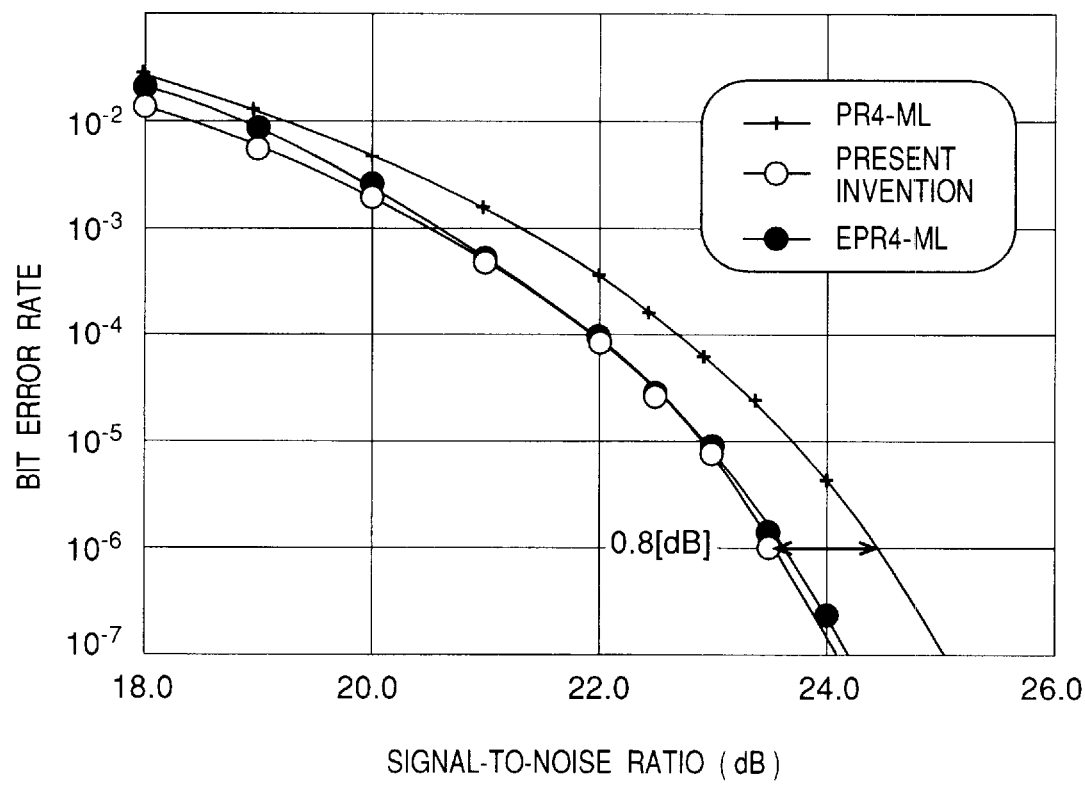
FIG. 32 is a graph showing data reproducing performance of the data reproducing method according to the invention and the conventional data reproducing methods.

FIG. 32 shows the computer simulation results. As seen in the figure, the data reproducing method according to the invention enables characteristic improvement of about 0.8 (dB) in terms of signal-to-noise ratio as compared with the conventional PR4-ML method and also provides data reproducing performance substantially comparable to the EPR4-ML method.

Further, an increase in the scale of the data reproducing circuit according to the first embodiment can be made about a half of the circuit scale increase when a change is made from the PR4-ML method to the EPR4-ML method. Further, according to the invention, high-speed processing comparable to the PR4-ML method can be performed.

Therefore, according to the invention, a magnetic disk drive capable of reproducing record signals recorded at higher recording density than a magnetic disk drive using the PR-ML4 method can be provided.

Thus, according to the invention, the digital data reproducing method can be provided whereby the error rate on magnetic disk, etc., is reduced more than the PR4-ML reproducing method and a simpler circuit configuration than the EPR4-ML reproducing method is provided and high-speed processing comparable to the PR4-ML reproducing method can be performed.

Specifically, the digital data reproducing method for reducing the error rate about 0.8 (dB) in terms of S/N as compared with the PR4-ML method, supporting the circuit scale increase about a half of that of the EPR4-ML method from the PR4-ML method, and enabling high-speed processing comparable to the PR4-ML method can be provided.

What is claimed is:

1. A data reproducing system using a partial response method for reproducing data recorded on a recording medium, said system comprising:

a head for reading data recorded on the recording medium and outputting an analog signal;

analog-to-digital conversion means for converting the analog signal into a corresponding digital signal at given time intervals;

means for equalizing the digital signal provided by said analog-to-digital conversion means according to an equalization characteristic corresponding to the partial response method;

Viterbi detection means for performing Viterbi detection of an output signal received from said equalization means for generating quadripartite reproduction data; and data conversion means for converting the quadripartite reproduction data output from said Viterbi detection means into binary reproduction data according to a predetermined rule.

2. The data reproducing system as claimed in claim 1, wherein class IV partial response method is used as said partial response method and an output Yk of said equalization means is serial data consisting of three values of "1", "0", and "−1", where "k" denotes a point of time.

3. The data reproducing system as claimed in claim 2, wherein, letting the quadripartite reproduction data output from said Viterbi detection means be Zk, the Zk is determined by the following relations:

Zk=+1 when Yk=+1;
Zk=−1 when Yk=−1;
Zk=+0 when Yk=0 and (Zk−2=+1 or Zk−2=+0);
and Zk=−0 when Yk=0 and (Zk−2=−1 or Zk−2=−0).

4. The data reproducing system as claimed in claim 3, wherein said data conversion means comprises:

means for assuming both "+0" and "−0" of the quadripartite reproduction data output from said Viterbi detection means to be "0" to regard the quadripartite data as ternary data of "1", "0", and "−1" and generating a difference signal between the ternary data and output of said equalization means;

means for performing a (1+D) process of adding a delayed signal resulting from delaying the difference signal and the difference signal, thereby generating an error signal;

error signal pattern detection means for determining whether or not a pattern of the error signals matches any of a limited number of predetermined error signal patterns; and data correction means, when a match is found by said error signal pattern detection means, for correcting an erroneous bit pattern of the quadripartite reproduction data output from said Viterbi detection means, corresponding to the error signal pattern, to a predetermined correct bit pattern in response to the error signal pattern, and converting the corrected reproduction data into binary reproduction data for output.

5. The data reproducing system as claimed in claim 4, wherein a limited number of the predetermined error signal patterns include four types of

"+A,+A,−A,−A,"

"−A,−A,+A,+A,"

"+A,+A,0,0,−A,−A"

and

"−A,−A,0,0,+A,+A"

where "A" is a signal amplitude of an arbitrary real number.

6. The data reproducing system as claimed in claim 4, wherein a limited number of the predetermined error signal patterns further include

"+A,+A,0,0,0,0,−A,−A"

and

"−A,−A,0,0,0,0,+A,+A"

where "A" is a signal amplitude of an arbitrary real number.

7. The data reproducing system as claimed in claim 4, wherein said data conversion means further includes bit pattern detection means for determining whether or not the quadripartite reproduction data output from said Viterbi detection means matches any of bit patterns of the quadripartite reproduction data predetermined in response to the error signal patterns detected by said error signal pattern detection means; and wherein said data correction means performs the reproduction data correction under a condition of detection of a match by said bit pattern detection means in addition to a match detection by said error signal pattern detection means.

8. The data reproducing system as claimed in claim 7, further including means for separating output of said equalization means into an even data sequence and an odd data sequence;

wherein said Viterbi detection means, said bit pattern detection means, and said data correction means are provided for each of the even and odd data sequences.

9. The data reproducing system as claimed in claim 8, wherein said error signal pattern detection means finds maximum and minimum values of the error signal within a predetermined time range in one of the even and odd data sequences and when a value obtained by subtracting the minimum value from the maximum value exceeds a predetermined threshold value and is greater than a value obtained by subtracting a minimum value from a maximum value of the error signal in the other of the even and odd data sequences in the predetermined time range, checks which of predetermined relations a timing relation between occurrences of the maximum and minimum values in one of the even and odd data sequences matches, and specifies any of the error signal patterns in response to which relation the timing relation matches.

10. The data reproducing system as claimed in claim 4, wherein when said error signal pattern detection means detects a match between the error signal patterns successively, said error signal pattern detection means determines the detection to be erroneous detection.

11. The data reproducing system as claimed in claim 4, further including means for separating output of said equalization means into an even data sequence and an odd data sequence;

wherein said Viterbi detection means and said data correction means are provided for each of the even and odd data sequences.

12. The data reproducing system as claimed in claim 4, wherein said error signal pattern detection means has means for performing pipeline processing.

13. A data reproducing integrated circuit formed on a single semiconductor substrate, comprising:

an input terminal for inputting an analog signal read from a recording medium on which signals are recorded using a partial response method;

analog-to-digital conversion means for converting the analog signal input to said input terminal into a corresponding digital signal at given time intervals;

means for equalizing the digital signal provided by said analog-to digital conversion means according to an equalization characteristic corresponding to the partial response method;

Viterbi detection means for performing Viterbi detection of an output signal received from said equalization means for generating quadripartite reproduction data;

data conversion means for converting the quadripartite reproduction data output from said Viterbi detection means into binary reproduction data according to a predetermined rule; and an output terminal for outputting the binary reproduction data.

14. The data reproducing integrated circuit as claimed in claim 13, wherein a class IV partial response method is used as said partial response method and an output $Y_k$ of said equalization means is serial data consisting of three values of "1", "0", and "1", where "k" denotes a point of time.

15. The data reproducing integrated circuit as claimed in claim 14, wherein, letting the quadripartite reproduction data output from said Viterbi detection means be $Z_k$, the $Z_k$ is determined by the following relations:

$Z_k=+1$ when $Y_k=+1$;

$Z_k=-1$ when $Y_k=-1$;

$Z_k=+0$ when $Y_k=0$ and ($Z_{k-2}=+1$ or $Z_{k-2}=+0$);

and $Z_k=-0$ when $Y_k=0$ and ($Z_{k-2}=-1$ or $Z_{k-2}=-0$).

16. The data reproducing integrated circuit as claimed in claim 15, wherein said data conversion means comprises:

means for assuming both "+0" and "−0" of the quadripartite reproduction data output from said Viterbi detection means to be "0" to regard the quadripartite data as ternary data of "1", "0", and "−1" and generating a difference signal between the ternary data and output of said equalization means;

means for performing a (1+D) process of adding a delayed signal resulting from delaying the difference signal and the difference signal, thereby generating an error signal;

error signal pattern detection means for determining whether or not a pattern of the error signals matches any of a limited number of predetermined error signal patterns; and data correction means, when a match is found by said error signal pattern detection means, for correcting an erroneous bit pattern of the quadripartite reproduction data output from said Viterbi detection means, corresponding to the error signal pattern, to a predetermined correct bit pattern in response to the error signal pattern, and converting the corrected reproduction data into binary reproduction data for output.

17. The data reproducing integrated circuit as claimed in claim 16, wherein said data conversion means further includes bit pattern detection means for determining whether or not the quadripartite reproduction data output from said Viterbi detection means matches any of bit patterns of the quadripartite reproduction data predetermined in response to the error signal patterns detected by said error signal pattern detection means; and wherein said data correction means performs the reproduction data correction under a condition of detection of a match by said bit pattern detection means in addition to a match detection by said error signal pattern detection means.

18. A data reproducing method using a partial response method for reproducing data recorded on a recording medium, said method comprising the steps of:

reading data recorded on the recording medium through a head;

converting the read analog signal into a corresponding digital signal;

filtering the digital signal according to an equalization characteristic corresponding to the partial response method;

performing Viterbi detection of the filtered signal for generating quadripartite reproduction data;

detecting one of a limited number of predetermined reproduction data patterns having a high probability of being erroneously reproduced from among data patterns contained in the quadripartite reproduction data;

correcting the detected reproduction data pattern to a correct reproduction data pattern predetermined corresponding to the reproduction data pattern; and providing final binary reproduction data from the quadripartite reproduction data containing the corrected reproduction data pattern.

* * * * *